United States Patent
Saha et al.

(10) Patent No.: US 12,381,505 B2
(45) Date of Patent: Aug. 5, 2025

(54) ROTATING ELECTRICAL MACHINE CONTROL DEVICE

(71) Applicants: AISIN CORPORATION, Aichi (JP); NAGOYA INSTITUTE OF TECHNOLOGY, Nagoya (JP)

(72) Inventors: Subrata Saha, Kariya (JP); Hiroki Iwai, Kariya (JP); Takashi Kosaka, Nagoya (JP); Hiroaki Matsumori, Nagoya (JP)

(73) Assignees: AISIN CORPORATION, Aichi (JP); NAGOYA INSTITUTE OF TECHNOLOGY, Nagoya (JP)

( * ) Notice: Subject to any disclaimer, the term of this patent is extended or adjusted under 35 U.S.C. 154(b) by 239 days.

(21) Appl. No.: 18/010,575

(22) PCT Filed: Mar. 26, 2021

(86) PCT No.: PCT/JP2021/013071
§ 371 (c)(1),
(2) Date: Dec. 15, 2022

(87) PCT Pub. No.: WO2021/256045
PCT Pub. Date: Dec. 23, 2021

(65) Prior Publication Data
US 2023/0261604 A1  Aug. 17, 2023

(30) Foreign Application Priority Data

Jun. 18, 2020  (JP) .................................. 2020-105403
Jun. 18, 2020  (JP) .................................. 2020-105404

(51) Int. Cl.
*H02P 27/08*  (2006.01)
*H02P 29/028*  (2016.01)

(52) U.S. Cl.
CPC .......... *H02P 27/085* (2013.01); *H02P 29/028* (2013.01)

(58) Field of Classification Search
CPC ...... H02P 27/085; H02P 29/028; H02P 27/06; H02M 1/325
See application file for complete search history.

(56) References Cited

U.S. PATENT DOCUMENTS

| 2014/0368150 A1* | 12/2014 | Furukawa | B62D 5/046 318/564 |
| 2019/0296663 A1* | 9/2019 | Oka | H02P 21/0003 |
| 2020/0389115 A1* | 12/2020 | Saha | H02M 7/501 |

FOREIGN PATENT DOCUMENTS

| JP | 2010-268555 A | 11/2010 |
| JP | 2014-192950 A | 10/2014 |

OTHER PUBLICATIONS

Hiroaki "Open Device Fault Detection and Fail Safe Action Strategy for a Premium Class Electric Vehicle with a Dual Inverter fed Open Winding Motor", 2021, IEEE, 1527-1533 (Year: 2021).*

(Continued)

*Primary Examiner* — Bickey Dhakal
(74) *Attorney, Agent, or Firm* — Sughrue Mion, PLLC

(57) ABSTRACT

In a first control state, it is determined which one of a first failure pattern (FP1) and a second failure pattern (FP2) is a failure pattern (FT), and in a second control state, it is determined which one of a first lower-stage-side failure pattern (LF1) and a second lower-stage-side failure pattern (LF2) is a lower-stage-side failure pattern (LF), and it is determined which one of a set of upper-stage-side arms of a first inverter (11), a set of lower-stage-side arms of the first inverter (12), a set of upper-stage-side arms of a second inverter (12), and a set of lower-stage-side arms of the second inverter (12) is failure-side arms, based on a result of (Continued)

the determination in the first control state and a result of the determination in the second control state.

8 Claims, 47 Drawing Sheets

(56) References Cited

OTHER PUBLICATIONS

Hiroaki "Optimum PWM Switching Mode Selection of Dual Inverter-fed Open Winding IPMSM Drive System for High-power Premium Class EV", 2020, IEEE, 6318-6342 (Year: 2020).*
International Search Report for PCT/JP2021/013071 dated Jun. 22, 2021.

* cited by examiner

FIG. 16

| | Inv1 PWR | | SUPER LOW SPEED |
|---|---|---|---|
| | RS1 | RS2 (RS1<RS2<RS3) | RS3 |
| HIGH-SIDE | Iu Iv Iw | Iu Iv Iw | Iu Iv Iw |
| LOW-SIDE | Iu Iv Iw | Iu Iv Iw | Iu Iv Iw |

ROTATING ELECTRICAL MACHINE CONTROL DEVICE

This application is a National Stage of International Application No. PCT/JP2021/013071 filed Mar. 26, 2021, claiming priority based on Japanese Patent Application No. 2020-105403 filed Jun. 18, 2020 and Japanese Patent Application No. 2020-105404 filed Jun. 18, 2020, the contents of which are incorporated in their entirety.

TECHNICAL FIELD

The present disclosure relates to a rotating electrical machine control device that controls, through two inverters, drive of a rotating electrical machine having open-end windings.

BACKGROUND ART

There is known a control device that controls drive of a rotating electrical machine of a three-phase alternating current type by performing switching control on inverters each provided at each end of three-phase open-end windings included in the rotating electrical machine. JP 2014-192950 A discloses a technique in which even if a failure has occurred in a switching element in such an inverter that drives the three-phase open-end windings, drive of the rotating electrical machine can be continued. According to the disclosure, when a failure has occurred in a switching element in either one of the two inverters, all of upper-stage-side switching elements or all of lower-stage-side switching elements in the inverter including the failed switching element are brought into on state and all switching elements on the other side are brought into off state so that the inverter serves as a neutral point, by which the rotating electrical machine is driven by the other inverter having no failure.

CITATIONS LIST

Patent Literature

Patent Literature 1: JP 2014-192950 A

SUMMARY OF INVENTION

Technical Problems

Here, detection of a failed switching element is possible by disposing a sensor, etc., in each switching element. However, it is costly to dispose sensors for failure detection in all switching elements. Hence, existing parameters used for control may be used to detect a failure. Namely, when a failure has occurred in one switching element, each phase current and voltage in alternating current, etc., change, and thus, it may be possible to detect whether there is a failure, based on each phase current, voltage, etc. However, since the two inverters are connected to the open-end windings, regardless of which one of the inverters has caused a failure, current or phase-to-phase voltage that flows through the open-end windings is influenced, and it is difficult to simply identify a failed switching element.

The above-described literature does not mention a specific technique for identifying a failed switching element. In addition, failures of a switching element include a short-circuit failure in which the switching element is always in a conduction state, and an open-circuit failure in which the switching element is always in an open-circuit state, and a phenomenon occurring due to a failure varies depending on the failure and a method of identifying a failure also varies depending on the failure. However, the above-described literature does not mention a specific technique for distinguishing between failures and identifying a failure, either.

In view of the above-described background, it is desired to provide a technique for identifying a failure location when a failure has occurred in one of switching elements included in two inverters provided at respective both ends of open-end windings.

Solutions to Problems

In one aspect, in a rotating electrical machine control device that considers the above description and that controls, through a first inverter and a second inverter, drive of a rotating electrical machine having open-end windings of a plurality of phases that are independent of each other, the first inverter is connected to a one-end side of the open-end windings of a plurality of phases to convert electric power between direct current and alternating currents of a plurality of phases, the second inverter is connected to an other-end side of the open-end windings of a plurality of phases to convert electric power between direct current and alternating currents of a plurality of phases, in the first inverter and the second inverter, each arm for one alternating-current phase includes a series circuit of an upper-stage-side switching element and a lower-stage-side switching element, the first inverter and the second inverter can be controlled independently of each other, when an open-circuit failure in which one switching element is always in an open-circuit state has occurred in either one of inverters, the first inverter or the second inverter, each of alternating currents of a plurality of phases is added up to compute current integrated values for the respective phases, and occurrence of the open-circuit failure is detected based on positive and negative polarities of each of the current integrated values, and a location where the open-circuit failure has occurred is determined, and when occurrence of the open-circuit failure has been detected upon controlling both of the inverters, the first inverter and the second inverter, by mixed pulse width modulation control in which control is performed such that a plurality of pulses with different patterns are outputted during a first period and an inactive state continues during a second period, the first period being a ½ cycle of electrical angle and the second period being an other ½ cycle, it is determined which one of a first failure pattern and a second failure pattern is a failure pattern, based on positive and negative polarities of each of the current integrated values in a first control state, the first failure pattern being a pattern in which one of a set of upper-stage-side arms of the first inverter and a set of lower-stage-side arms of the second inverter is failure-side arms in which the open-circuit failure has occurred, and the second failure pattern being a pattern in which one of a set of lower-stage-side arms of the first inverter and a set of upper-stage-side arms of the second inverter is the failure-side arms, it is determined which one of a first lower-stage-side failure pattern and a second lower-stage-side failure pattern is a lower-stage-side failure pattern, based on each of the current integrated values in a second control state different from the first control state, the first lower-stage-side failure pattern being a pattern in which the lower-stage-side arms of the second inverter are the failure-side arms, and the second lower-stage-side failure pattern being a pattern in which the lower-stage-side arms of the first inverter are the failure-side arms, and it is determined which one of a set of the upper-stage-side arms of the first inverter, a set of the lower-stage-side arms of the first inverter, a set of the upper-stage-side arms of the second inverter, and a set of the lower-stage-side arms of the second inverter is the failure-side arms, based on a result of the determination in the first control state and a result of the determination in the second control state.

According to experiments and simulations performed by the inventors, it has been confirmed that when an open-circuit failure of a switching element has occurred in either one of the two inverters, the waveforms of three-phase currents are asymmetrical and distorted. For example, the waveform of an alternating current of a given phase is greatly biased toward the positive side, and the waveform of an alternating current of another phase is greatly biased toward the negative side. When alternating currents are added up over a predetermined period of time, these bias trends appear more remarkably. A bias direction varies depending on the location of a switching element having an open-circuit failure. Thus, on the basis of the positive and negative polarities of current integrated values, it can be determined that an open-circuit failure has occurred and determined in which one of a set of upper-stage-side arms and a set of lower-stage-side arms and in which one of the inverters the open-circuit failure has occurred. In addition, according to experiments and simulations performed by the inventors, in the second control state, when an open-circuit failure has occurred in upper-stage-side arms, detection of the open-circuit failure itself is difficult, but when an open-circuit failure has occurred in lower-stage-side arms, it is possible to detect the open-circuit failure and to determine which one of the inverters has the failure. In the first control state, regardless of which one of a set of upper-stage-side arms and a set of lower-stage-side arms has an open-circuit failure, it is possible to detect the open-circuit failure. However, in the first control state, although it can be determined whether a failure pattern is the first failure pattern or the second failure pattern, it cannot be determined which one of the inverters has the open-circuit failure. According to this configuration, when an open-circuit failure has occurred in lower-stage-side arms, failure-side arms can be determined based on at least a result of determination in the second control state. In addition, regardless of which one of a set of upper-stage-side arms and a set of lower-stage-side arms has an open-circuit failure, failure-side arms can be determined on the basis of both a result of determination in the first control state and a result of determination in the second control state. As such, according to this configuration, when an open-circuit failure has occurred in one of the switching elements included in the two inverters that are provided at respective both ends of the open-end windings, a failure location can be identified.

In addition, in one aspect, in a rotating electrical machine control device that controls, through a first inverter and a second inverter, drive of a rotating electrical machine having open-end windings of a plurality of phases that are independent of each other, the first inverter is connected to a one-end side of the open-end windings of a plurality of phases to convert electric power between direct current and alternating currents of a plurality of phases, the second inverter is connected to an other-end side of the open-end windings of a plurality of phases to convert electric power between direct current and alternating currents of a plurality of phases, in the first inverter and the second inverter, each arm for one alternating-current phase includes a series circuit of an upper-stage-side switching element and a lower-stage-side switching element, the first inverter and the second inverter can be controlled independently of each other, when an open-circuit failure in which one switching element is always in an open-circuit state has occurred in either one of inverters, the first inverter or the second inverter, each of alternating currents of a plurality of phases is added up to compute current integrated values for the respective phases, and occurrence of the open-circuit failure is detected based on positive and negative polarities of each of the current integrated values, and a location where the open-circuit failure has occurred is determined, and when occurrence of the open-circuit failure has been detected, it is determined which one of a first failure pattern and a second failure pattern is a failure pattern, based on positive and negative polarities of each of the current integrated values, the first failure pattern being a pattern in which the open-circuit failure has occurred in one of a set of upper-stage-side arms of the first inverter and a set of lower-stage-side arms of the second inverter, and the second failure pattern being a pattern in which the open-circuit failure has occurred in one of a set of lower-stage-side arms of the first inverter and a set of upper-stage-side arms of the second inverter, and thereafter, either one of the inverters, the first inverter or the second inverter, is assumed to be a failed inverter in which the open-circuit failure has occurred, and is determined to be an assumed failed inverter, and active short-circuit control is performed by bringing all of the switching elements in assumed failure-side arms that are assumed, based on the determined failure pattern, to be failure-side arms in which the open-circuit failure has occurred out of the upper-stage-side arms and the lower-stage-side arms of the assumed failed inverter into on state, and bringing all of the switching elements in assumed non-failure-side arms that are on an other side into on state, and switching control is performed on one of the inverters that is different from the assumed failed inverter, and thereafter, when the open-circuit failure has not been detected based on positive and negative polarities of each of the current integrated values, the assumed failed inverter is determined to be the failed inverter, and the assumed failure-side arms are determined to be the failure-side arms, and when the open-circuit failure has been detected, the one of the inverters that is different from the assumed failed inverter is determined to be the failed inverter, and the failure-side arms of the failed inverter are determined based on the failure pattern.

According to this configuration, when occurrence of an open-circuit failure has been detected, failure-side arms are assumed and determined to be assumed failure-side arms, and switching control is performed on the inverters in a mode that can be used even if an open-circuit failure occurs in the assumed failure-side arms. If, in this state, an open-circuit failure has not been detected again, then it is found that the assumption is right, and if, in this state, an open-circuit failure has been detected again, then it is found that the assumption is wrong. Thus, according to this configuration, failure-side arms can be identified.

In addition, in one aspect, in a rotating electrical machine control device that considers the above description and that controls, through a first inverter and a second inverter, drive of a rotating electrical machine having open-end windings of a plurality of phases that are independent of each other, the first inverter is connected to a one-end side of the open-end windings of a plurality of phases to convert electric power between direct current and alternating currents of a plurality of phases, the second inverter is connected to an other-end side of the open-end windings of a plurality of phases to convert electric power between direct current and alternating currents of a plurality of phases, in the first inverter and the second inverter, each arm for one alternating-current phase includes a series circuit of an upper-stage-side switching element and a lower-stage-side switching element, the first inverter and the second inverter can be controlled independently of each other, and when a short-circuit failure in which one switching element is short-circuited has occurred in either one of inverters, the first inverter or the second inverter, with the inverter in which the short-circuit failure has occurred being a failed inverter, each of alternating currents of a plurality of phases is added up to compute current integrated values for the respective phases, and it is determined which one of a set of upper-stage-side arms and a set of lower-stage-side arms of the failed inverter has the short-circuit failure, based on positive and negative polarities of each of the current integrated values.

According to experiments and simulations performed by the inventors, it has been confirmed that when a short-circuit failure of a switching element has occurred in either one of the two inverters, the waveforms of three-phase currents are asymmetrical and distorted. For example, the waveform of an alternating current of a given phase is greatly biased toward the positive side, and the waveform of an alternating current of another phase is greatly biased toward the negative side. When alternating currents are added up over a predetermined period of time, these bias trends appear more remarkably. A bias direction varies depending on the location of a switching element having a short-circuit failure. Thus, on the basis of the positive and negative polarities of current integrated values, it can be determined which one of a set of upper-stage-side arms and a set of lower-stage-side arms of a failed inverter has the short-circuit failure. By identifying a failure location, the two inverters are controlled so as not to be influenced by the failure location, by which drive of the rotating electrical machine can be continued. As such, according to this configuration, when a short-circuit failure has occurred in one of the switching elements included in the two inverters that are provided at respective both ends of the open-end windings, a failure location can be identified.

Further features and advantages of the rotating electrical machine control device will become apparent from the following description of an embodiment which will be described with reference to drawings.

BRIEF DESCRIPTION OF DRAWINGS

FIG. 16 is a waveform diagram showing an example of waveforms of three-phase alternating currents for a case in which an open-circuit failure has occurred in a first inverter upon powering at a super low rotational speed.

DESCRIPTION OF EMBODIMENTS

Figure 1:
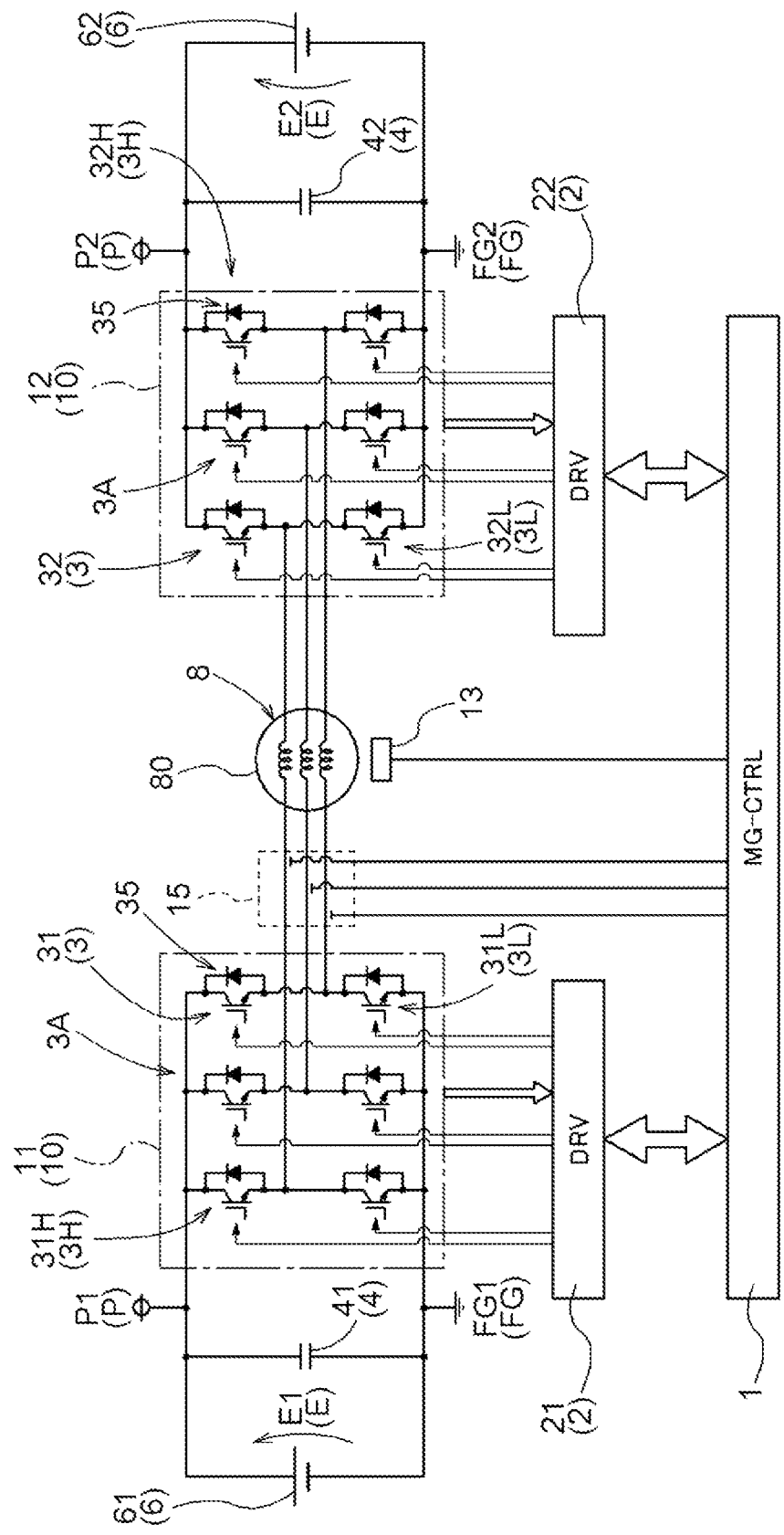
FIG. 1 is a schematic block diagram of a rotating electrical machine drive system.

An embodiment of a rotating electrical machine control device that controls, through two inverters, drive of a rotating electrical machine having open-end windings of a plurality of phases that are independent of each other will be described below based on the drawings. FIG. 1 is a schematic block diagram of a rotating electrical machine drive system including a rotating electrical machine control device 1 (MG-CTRL). A rotating electrical machine 80 serves as, for example, a drive power source for wheels of a vehicle such as an electric vehicle or a hybrid vehicle. The rotating electrical machine 80 is an open-end winding type rotating electrical machine having stator coils 8 (open-end windings) of a plurality of phases (three phases in the present embodiments) that are independent of each other. Inverters 10 that are controlled independently of each other to convert electric power between direct current and alternating currents of a plurality of phases (here, three phases) are connected to respective both ends of the stator coils 8. That is, a first inverter 11 (INV1) is connected to a one-end side of the stator coils 8, and a second inverter 12 (INV2) is connected to an other-end side of the stator coils 8. When the first inverter 11 and the second inverter 12 do not need to be distinguished from each other, they will be described, hereinafter simply referred to as the inverters 10.

The inverters 10 each are configured to include a plurality of switching elements 3. The first inverter 11 is configured to include a plurality of first switching elements 31, and the second inverter 12 is configured to include a plurality of second switching elements 32. When the first switching elements 31 and the second switching elements 32 do not need to be distinguished from each other, they will be described, simply referred to as the switching elements 3. For the switching elements 3, insulated gate bipolar transistors (IGBTs) or power metal oxide semiconductor field effect transistors (MOSFETs) are used. FIG. 1 exemplifies a mode in which IGBTs are used as the switching elements 3. In the present embodiment, the first inverter 11 and the second inverter 12 are the inverters 10 that use the switching elements 3 of the same type and that have the same circuit configuration.

In the two inverters 10, each arm 3A for one alternating-current phase includes a series circuit of an upper-stage-side switching element 3H and a lower-stage-side switching element 3L. Each switching element 3 has a freewheeling diode 35 provided in parallel thereto, with a direction going from a negative polarity FG to a positive polarity P (a direction going from a lower-stage side to an upper-stage side) being a forward direction. Note that one side of arms 3A of a plurality of phases that includes upper-stage-side switching elements 3H is referred to as upper-stage-side arms, and one side of the arms 3A of a plurality of phases that includes lower-stage-side switching elements 3L is referred to as lower-stage-side arms.

In addition, in the present embodiment, the two inverters 10 are connected to direct-current power supplies 6 that are independent of each other. That is, a first floating ground FG1 which is the negative polarity FG of the first inverter 11 and a second floating ground FG2 which is the negative polarity FG of the second inverter 12 are independent of each other. In addition, a direct-current link capacitor 4 (smoothing capacitor) that smooths direct-current voltage is provided between each inverter 10 and a corresponding direct-current power supply 6.

Specifically, the first inverter 11 in which an arm 3A for one alternating-current phase includes a series circuit of a first upper-stage-side switching element 31H and a first lower-stage-side switching element 31L has a first direct-current link capacitor 41 (first smoothing capacitor) connected to a direct-current side thereof, and is connected to a first direct-current power supply 61 on the direct-current side thereof and connected to a one-end side of the stator coils 8 of a plurality of phases on an alternating-current side thereof, to convert electric power between direct current and alternating currents of a plurality of phases. The second inverter 12 in which an arm 3A for one alternating-current phase includes a series circuit of a second upper-stage-side switching element 32H and a second lower-stage-side switching element 32L has a second direct-current link capacitor 42 (second smoothing capacitor) connected to a direct-current side thereof, and is connected to a second direct-current power supply 62 on the direct-current side thereof and connected to an other-end side of the stator coils 8 of a plurality of phases on an alternating-current side thereof, to convert electric power between direct current and alternating currents of a plurality of phases.

In the present embodiment, the first direct-current power supply 61 and the second direct-current power supply 62 are direct-current power supplies having equal ratings of voltage, etc., and the first direct-current link capacitor 41 and the second direct-current link capacitor 42 are capacitors also having equal ratings of capacitance, etc. The rated voltage of the direct-current power supplies 6 is about 48 volts to 400 volts. The direct-current power supplies 6 include, for example, secondary batteries (batteries) such as nickel-hydrogen batteries or lithium-ion batteries, or electric energy storage devices such as electric double-layer capacitors. The rotating electrical machine 80 can function as both an electric motor and a generator. The rotating electrical machine 80 converts electric power from the direct-current power supplies 6 into mechanical power through the inverters 10 (powering). Alternatively, the rotating electrical machine 80 converts rotary drive power transmitted from the wheels, etc., into electric power to charge the direct-current power supplies 6 through the inverters 10 (regeneration).

As shown in FIG. 1, the inverters 10 are controlled by the rotating electrical machine control device 1. The rotating electrical machine control device 1 can control the first inverter 11 and the second inverter 12 using control schemes that are independent of each other (details of the control schemes will be described later). The rotating electrical machine control device 1 is constructed using a logic circuit such as a microcomputer, as a core member. For example, the rotating electrical machine control device 1 controls the rotating electrical machine 80 through the inverters 10 by performing current feedback control that uses a vector control method, based on target torque (torque instruction) of the rotating electrical machine 80 that is provided from other control devices, etc., such as a vehicle control device which is not shown.

An actual current flowing through the stator coil 8 of each phase of the rotating electrical machine 80 is detected by a current sensor 15, and a magnetic pole position at each time point of a rotor of the rotating electrical machine 80 is detected by a rotation sensor 13 such as a resolver. The rotating electrical machine control device 1 performs current feedback control using results of detection by the current sensor 15 and the rotation sensor 13. The rotating electrical machine control device 1 is configured to include various functional parts for current feedback control, and each functional part is implemented by cooperation of hardware such as a microcomputer and software (program).

Figure 2:
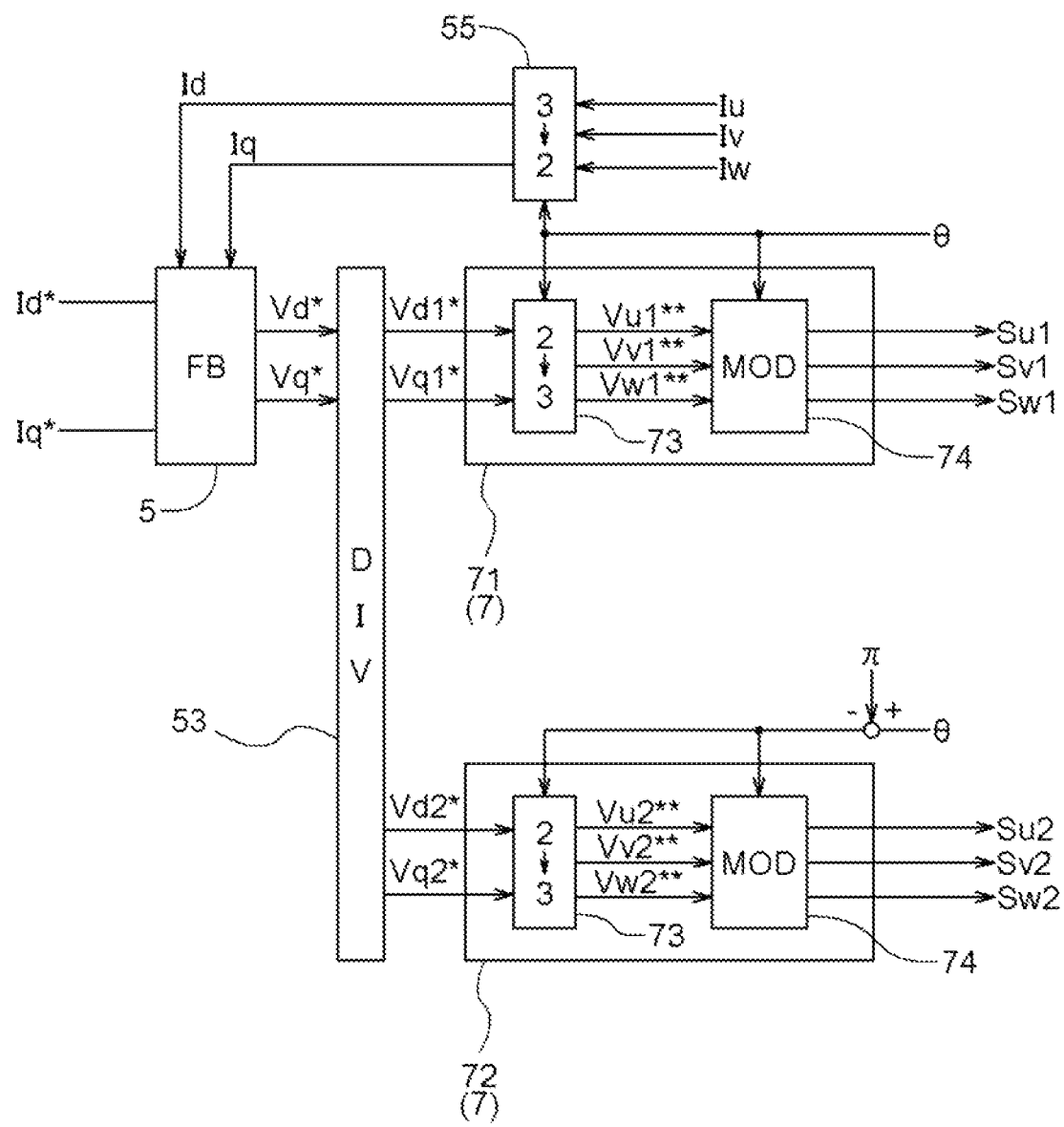
FIG. 2 is a simplified partial block diagram of a rotating electrical machine control device.

A block diagram of FIG. 2 shows some functional parts of the rotating electrical machine control device 1 in a simplified manner. In a vector control method, feedback control is performed by coordinate-transforming actual currents (a U-phase current Iu, a V-phase current Iv, and a W-phase current Iw) flowing through the rotating electrical machine 80 into vector components (a d-axis current Id and a q-axis current Iq) on a d-axis indicating a direction of a magnetic field (magnetic flux) generated by permanent magnets disposed in the rotor of the rotating electrical machine 80 and a q-axis indicating a direction orthogonal to the d-axis (a direction advanced by an electrical angle of $\pi/2$ relative to the direction of the magnetic field). In the rotating electrical machine control device 1, a three-to-two phase coordinate-transforming part 55 performs coordinate transformation, based on a result of detection ($\theta$: a magnetic pole position and an electrical angle) by the rotation sensor 13.

A current feedback control part 5 (FB) performs feedback control on the rotating electrical machine 80 based on deviation between current instructions (a d-axis current instruction Id* and a q-axis current instruction Iq*) issued based on a torque instruction for the rotating electrical machine 80 and the actual currents (the d-axis current Id and the q-axis current Iq) in a d-q-axis orthogonal vector coordinate system, thereby computing voltage instructions (a d-axis voltage instruction Vd* and a q-axis voltage instruction Vq*). The rotating electrical machine 80 is driven through the two inverters 10, the first inverter 11 and the second inverter 12. Hence, the d-axis voltage instruction Vd* and the q-axis voltage instruction Vq* each are divided, by a dividing part 53 (DIV), into a first d-axis voltage instruction Vd1* and a first q-axis voltage instruction Vq1* for the first inverter 11 and a second d-axis voltage instruction Vd2* and a second q-axis voltage instruction Vq2* for the second inverter 12.

As described above, the rotating electrical machine control device 1 can control the first inverter 11 and the second inverter 12 using control schemes that are independent of each other, and includes two voltage control parts 7 each including a three-phase voltage instruction computing part 73 and a modulating part 74 (MOD). Namely, the rotating electrical machine control device 1 includes a first voltage control part 71 that generates switching control signals (Su1, Sv1, and Sw1) for the respective U-phase, V-phase, and W-phase of the first inverter 11; and a second voltage control part 72 that generates switching control signals (Su2, Sv2, and Sw2) for the respective U-phase, V-phase, and W-phase of the second inverter 12. Though details will be described later with reference to FIGS. 6 and 7, etc., voltage instructions (Vu1, Vv1, and Vw1) for the first inverter 11 and voltage instructions (Vu2, Vv2, and Vw2) for the second inverter 12 differ in phase by "π" from each other. Hence, a value obtained by subtracting "π" from a result of detection (θ) by the rotation sensor 13 is inputted to the second voltage control part 72.

Note that as will be described later, modulation schemes include synchronous modulation that is synchronized with rotation of the rotating electrical machine 80; and asynchronous modulation that is independent of rotation of the rotating electrical machine 80. In general, a generation block (a generation flow in a case of software) for switching control signals by synchronous modulation differs from a generation block for switching control signals by asynchronous modulation. The above-described voltage control parts 7 generate switching control signals based on voltage instructions and a carrier that is not synchronized with rotation of the rotating electrical machine 80, but in the present embodiment, for simplification of description, description will be made assuming that switching control signals by synchronous modulation (e.g., switching control signals in a case of rectangular-wave control which will be described later) are also generated by the voltage control parts 7.

Note that as described above, each arm 3A of the inverters 10 includes a series circuit of an upper-stage-side switching element 3H and a lower-stage-side switching element 3L. A switching control signal for each phase is outputted as two types of signals, an upper-stage switching control signal and a lower-stage switching control signal, though not distinguished in FIG. 2. For example, a first U-phase switching control signal Su1 for performing switching control of the U-phase of the first inverter 11 is outputted as two signals, a first U-phase upper-stage-side switching control signal Su1+ which is added with "+" at the end and a first U-phase lower-stage-side switching control signal Su1− which is added with "−" at the end. Note that when an upper-stage-side switching element 3H and a lower-stage-side switching element 3L that are included in each arm 3A simultaneously go into on state, the arm 3A goes into a short-circuited state. To prevent this short circuit, there is provided dead time during which both of an upper-stage-side switching control signal and a lower-stage-side switching control signal for each arm 3A go into an inactive state. The dead time is also added by the voltage control parts 7.

As shown in FIG. 1, a control terminal (a gate terminal in a case of an IGBT or a FET) of each switching element 3 included in the inverters 10 is connected to the rotating electrical machine control device 1 through a corresponding drive circuit 2 (DRV), and switching control is individually performed on the switching elements 3. High-voltage system circuits (systems connected to the direct-current power supplies 6) for driving the rotating electrical machine 80, such as the inverters 10, and low-voltage system circuits (systems with an operating voltage of about 3.3 volts to 5 volts) such as the rotating electrical machine control device 1 that uses a microcomputer, etc., as a core greatly differ from each other in operating voltage (the power supply voltage of the circuits). The drive circuits 2 increase each of drive capabilities (e.g., capabilities to allow a circuit at a subsequent stage to operate, such as voltage amplitude and output current) of a drive signal (switching control signal) for each switching element 3, and relay the drive signal. A first drive circuit 21 relays switching control signals to the first inverter 11, and a second drive circuit 22 relays switching control signals to the second inverter 12.

Note that the inverters 10 each include a circuit that detects abnormalities of the inverter 10, e.g., the temperature of the switching elements 3 and whether an overcurrent has occurred, and such pieces of information are provided to the rotating electrical machine control device 1 through a corresponding drive circuit 2. The pieces of information do not necessarily need to identify a specific switching element 3, and it is sufficient that the pieces of information be able to detect an abnormality in the first inverter 11 or an abnormality in the second inverter 12.

As switching pattern modes (modes of voltage waveform control) of the switching elements 3 included in the first inverter 11 and the second inverter 12, the rotating electrical machine control device 1 can perform, for example, two types of control, pulse width modulation (PWM) control in which a plurality of pulses with different patterns are outputted in one cycle of electrical angle, and rectangular-wave control (single-pulse control (1-Pulse)) in which one pulse is outputted in one cycle of electrical angle. Namely, the rotating electrical machine control device 1 can perform pulse width modulation control and rectangular-wave control as control schemes for the first inverter 11 and the second inverter 12. Note that as described above, the rotating electrical machine control device 1 can control the first inverter 11 and the second inverter 12 using control schemes that are independent of each other.

In addition, pulse width modulation has schemes such as continuous pulse width modulation (CPWM: continuous PWM), e.g., sinusoidal pulse width modulation (SPWM: sinusoidal PWM) and space vector pulse width modulation (SVPWM: space vector PWM), and discontinuous pulse width modulation (DPWM: discontinuous PWM). Thus, pulse width modulation control that can be performed by the rotating electrical machine control device 1 includes, as control schemes, continuous pulse width modulation control and discontinuous pulse width modulation control.

The continuous pulse width modulation is a modulation scheme in which pulse width modulation is continuously performed for all of the arms 3A of a plurality of phases, and the discontinuous pulse width modulation is a modulation scheme in which pulse width modulation is performed including a period during which switching elements in an arm 3A of one of the plurality of phases are fixed to on state or off state. Specifically, in the discontinuous pulse width modulation, for example, the signal levels of switching control signals for an inverter that correspond to one phase out of alternating-current electric power of three phases are sequentially fixed, and the signal levels of switching control signals corresponding to the other two phases are changed. In the continuous pulse width modulation, all phases are modulated without thus fixing switching control signals corresponding to any of the phases. These modulation schemes are determined based on operating conditions such as rotational speed and torque that are required for the rotating electrical machine 80, and a modulation index (a ratio of the root-mean-square value of three-phase alternating current line-to-line voltage to direct-current voltage) required to satisfy the operating conditions.

Figure 7:
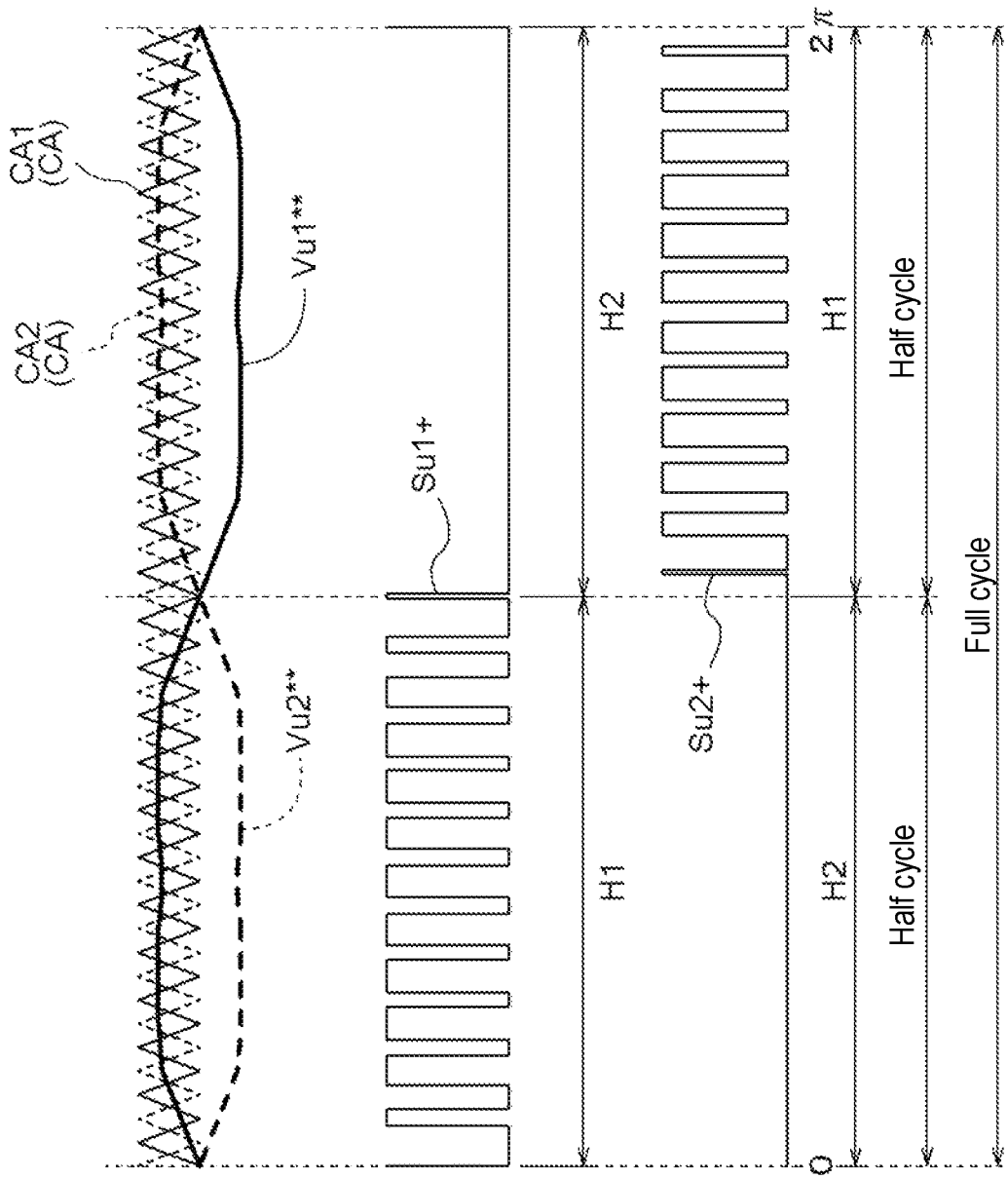
FIG. 7 is a waveform diagram showing another example of voltage instructions and switching control signals for mixed continuous pulse width modulation control (half-cycle continuous pulses).

In pulse width modulation, pulses are generated based on a magnitude relationship between the amplitude of an alternating-current waveform which is a voltage instruction and the amplitude of a waveform of a triangle wave (including sawtooth wave) carrier (CA) (see FIG. 7, etc.). There is also a case in which a PWM waveform is directly generated by digital computation instead of comparison with the carrier, but in that case, too, the amplitude of an alternating-current waveform which is an instruction value and the amplitude of a virtual carrier waveform have a correlation.

In pulse width modulation by digital computation, a carrier is determined based on, for example, a control cycle of the rotating electrical machine control device 1 such as a computation cycle of the microcomputer or a duty cycle of an electronic circuit. That is, even when alternating-current electric power of a plurality of phases is used to drive the alternating-current rotating electrical machine 80, a carrier has a cycle that is not constrained by (a cycle that is not synchronized with) the rotational speed or rotational angle (electrical angle) of the rotating electrical machine 80. Thus, both the carrier and each pulse generated based on the carrier are not synchronized with the rotation of the rotating electrical machine 80. Thus, modulation schemes such as sinusoidal pulse width modulation and space vector pulse width modulation may be referred to as asynchronous modulation. On the other hand, a modulation scheme in which pulses are generated in synchronization with the rotation of the rotating electrical machine 80 is referred to as synchronous modulation. For example, in rectangular-wave control (rectangular-wave modulation), one pulse is outputted per electrical angle cycle of the rotating electrical machine 80, and thus, the rectangular-wave modulation is synchronous modulation.

As described above, as an index indicating a conversion ratio from direct-current voltage to alternating-current voltage, there is a modulation index indicating a ratio of the root-mean-square value of line-to-line voltage of alternating-current voltages of a plurality of phases to direct-current voltage. In general, the maximum modulation index for sinusoidal pulse width modulation control is about 0.61 ($\approx 0.612$) and the maximum modulation index for space vector pulse width modulation control is about 0.71 ($\approx 0.707$). A modulation scheme having a modulation index exceeding about 0.71 is a modulation scheme whose modulation index is higher than normal, and thus is referred to as "overmodulation pulse width modulation". The maximum modulation index for the "overmodulation pulse width modulation" is about 0.78. The modulation index "0.78" is a physical (mathematical) limit value for electric power conversion from direct current to alternating current. In the overmodulation pulse width modulation, when the modulation index reaches 0.78, rectangular-wave modulation (single-pulse modulation) in which one pulse is outputted in one cycle of electrical angle is performed. In the rectangular-wave modulation, the modulation index is fixed to about 0.78 which is a physical limit value. Note that the values of modulation indices exemplified here are physical (mathematical) values that do not take into account dead time.

Overmodulation pulse width modulation whose modulation index is less than 0.78 can be implemented by using a principle of any of a synchronous modulation scheme and an asynchronous modulation scheme. A representative modulation scheme for the overmodulation pulse width modulation is discontinuous pulse width modulation. The discontinuous pulse width modulation can be implemented by using a principle of any of a synchronous modulation scheme and an asynchronous modulation scheme. For example, when the synchronous modulation scheme is used, in rectangular-wave modulation, one pulse is outputted in one cycle of electrical angle, whereas in discontinuous pulse width modulation, a plurality of pulses are outputted in one cycle of electrical angle. When there are a plurality of pulses in one cycle of electrical angle, a pulse active period decreases correspondingly, reducing the modulation index. Thus, not only a modulation index that is fixed to about 0.78, but also any modulation index less than 0.78 can be implemented by the synchronous modulation scheme. For example, it is also possible to perform multi-pulse modulation (Multi-Pulses) such as 9-pulse modulation (9-Pulses) in which nine pulses are outputted in one cycle of electrical angle or 5-pulse modulation (5-Pulses) in which five pulses are outputted in one cycle of electrical angle.

In addition, the rotating electrical machine control device 1 can perform shutdown control (SDN) or active short-circuit control (ASC) as fail-safe control performed when an abnormality has been detected in the inverters 10 or the rotating electrical machine 80. The shutdown control is control that brings the inverters 10 into off state by bringing switching control signals for all switching elements 3 included in the inverters 10 into an inactive state. The active short-circuit control is control that brings either one of a set of the upper-stage-side switching elements 3H in the arms 3A of all of the plurality of phases and a set of the lower-stage-side switching elements 3L in the arms 3A of all of the plurality of phases into on state and brings the other one into off state. Note that a case in which the upper-stage-side switching elements 3H in the arms 3A of all of the plurality of phases are brought into on state and the lower-stage-side switching elements 3L in the arms 3A of all of the plurality of phases are brought into off state is referred to as upper-stage-side active short-circuit control (ASC-H). Note also that a case in which the lower-stage-side switching elements 3L in the arms 3A of all of the plurality of phases are brought into on state and the upper-stage-side switching elements 3H in the arms 3A of all of the plurality of phases are brought into off state is referred to as lower-stage-side active short-circuit control (ASC-L).

As in the present embodiment, in a case in which the inverters 10 are connected to respective both ends of the stator coils 8, when one inverter 10 is short-circuited by active short-circuit control, the stator coils 8 of a plurality of phases are short-circuited in the one inverter 10. That is, the one inverter 10 serves as a neutral point and the stator coils 8 are Y-connected. Hence, the rotating electrical machine control device 1 can implement a mode in which the open-end winding type rotating electrical machine 80 is controlled through the two inverters 10 and a mode in which the Y-connected rotating electrical machine 80 is controlled through one inverter 10 (an inverter 10 that is not subjected to active short-circuit control).

Figure 3:
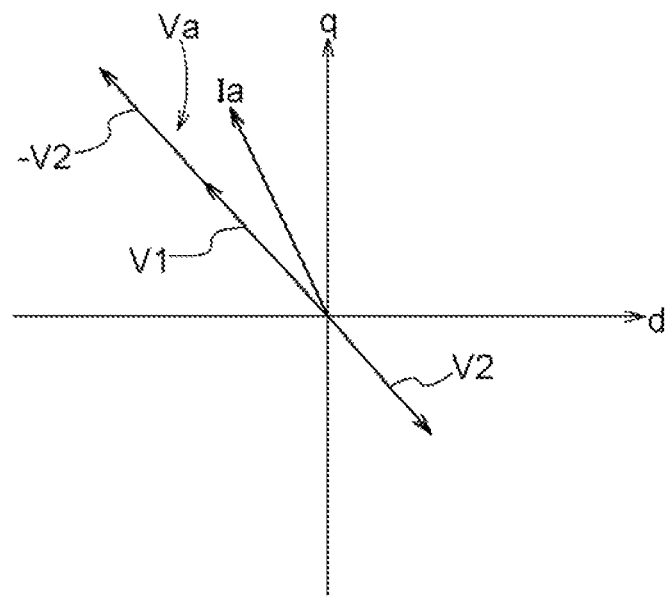
FIG. 3 is a schematic voltage vector diagram of a rotating electrical machine in an orthogonal vector space.

FIG. 3 exemplifies a vector diagram for one operating point of the rotating electrical machine 80 in a d-q-axis vector coordinate system. In the drawing, "V1" represents a first voltage vector indicating voltage of the first inverter 11 and "V2" represents a second voltage vector indicating voltage of the second inverter 12. Voltage that appears in the stator coils 8 which are open-end windings through the two inverters 10 corresponds to the difference "V1–V2" between the first voltage vector V1 and the second voltage vector V2. "Va" in the drawing represents a combined voltage vector that appears in the stator coils 8. In addition, "Ia" represents current flowing through the stator coils 8 of the rotating electrical machine 80. As shown in FIG. 3, when the first inverter 11 and the second inverter 12 are controlled such that the vector directions of the first voltage vector V1 and the second voltage vector V2 differ from each other by 180 degrees, the combined voltage vector Va is a vector obtained by adding the magnitude of the second voltage vector V2 to the direction of the first voltage vector V1.

A technique for identifying a failure location when a failure has occurred in one of the switching elements 3 included in the two inverters 10 that are provided at respective both ends of the open-end windings (stator coils 8) will be described below for different cases: a case in which the failure is an open-circuit failure and a case in which the failure is a short-circuit failure. First, a technique for identifying a failure location when an open-circuit failure has occurred in one of the switching elements 3 included in the two inverters 10 that are provided at respective both ends of the open-end windings (stator coils 8) will be described.

Figure 4:
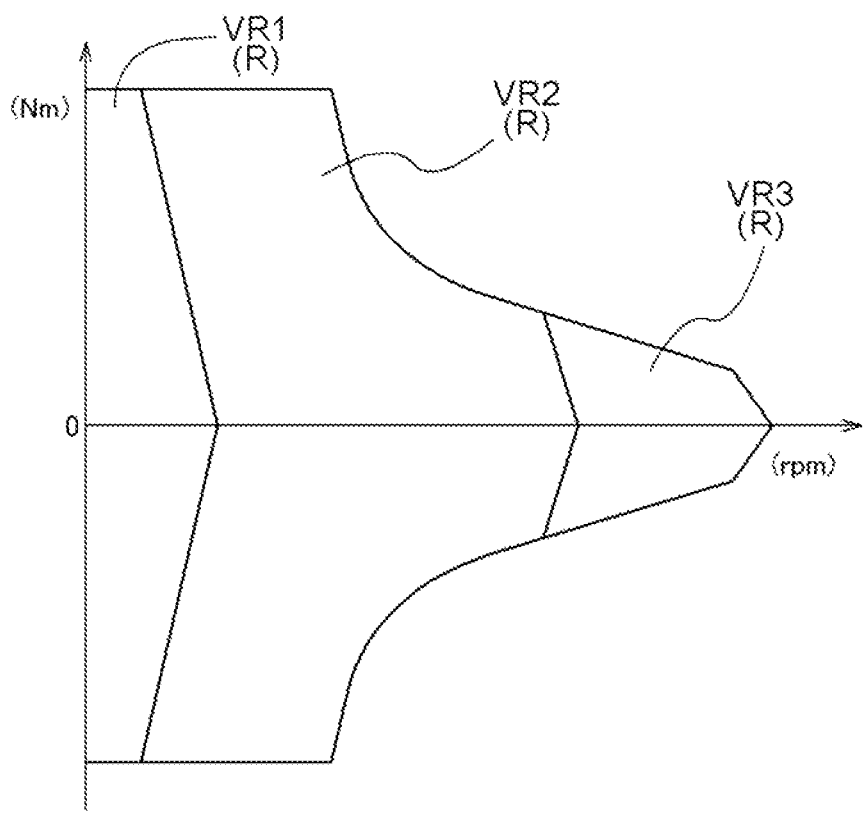
FIG. 4 is a diagram showing an example of control regions of the rotating electrical machine.

In the present embodiment, a plurality of control regions R based on the operating conditions of the rotating electrical machine 80 (see FIG. 4) are set, and the rotating electrical machine control device 1 controls the inverters 10 using control schemes set for each control region R. FIG. 4 shows an example of a relationship between the rotational speed and torque of the rotating electrical machine 80. For example, as shown in FIG. 4, as the control regions R of the rotating electrical machine 80, there are set a first speed region VR1, a second speed region VR2 in which the rotational speed of the rotating electrical machine 80 is higher than that in the first speed region VR1 for the same torque, and a third speed region VR3 in which the rotational speed of the rotating electrical machine 80 is higher than that in the second speed region VR2 for the same torque.

As described above, the rotating electrical machine control device 1 can control each of the first inverter 11 and the second inverter 12 using a plurality of control schemes with different switching patterns. The control schemes include pulse width modulation control (PWM) in which a plurality of pulses with different patterns are outputted in one cycle of electrical angle; and mixed pulse width modulation control (MX-PWM) in which control is performed such that a plurality of pulses with different patterns are outputted during a first period H1 (see FIG. 5, etc.) which is a ½ cycle (half cycle) of electrical angle (full cycle) and an inactive state continues during a second period H2 (see FIG. 5, etc.) which is the other ½ cycle (half cycle) (described later with reference to FIGS. 5 to 8). In the first speed region VR1 and the second speed region VR2, the rotating electrical machine control device 1 controls both inverters, the first inverter 11 and the second inverter 12, by mixed pulse width modulation control.

The mixed pulse width modulation control (MX-PWM) includes mixed continuous pulse width modulation control (MX-CPWM) and mixed discontinuous pulse width modulation control (MX-DPWM). Though details will be described later, in the mixed continuous pulse width modulation control, control is performed such that an inactive state continues during a second period H2, and pulse width modulation is continuously performed for all of the arms 3A of a plurality of phases during a first period H1 (described later with reference to FIGS. 5 and 7.). Likewise, though details will be described later, in the mixed discontinuous pulse width modulation control, control is performed such that an inactive state continues during a second period H2, and during a first period H1, pulse width modulation is performed including a period during which switching elements 3 in an arm 3A of one of the plurality of phases are fixed to on state or off state (described later with reference to FIGS. 6 and 8.).

In the mixed pulse width modulation control, since switching control signals are in an inactive state during the second period H2, too, loss in the inverters 10 decreases, and harmonic current resulting from switching also decreases and thus loss (iron loss) in the rotating electrical machine 80 also decreases. That is, by performing the mixed pulse width modulation control, system loss can be reduced.

For example, as shown in the following table 1, in the first speed region VR1, the rotating electrical machine control device 1 controls both inverters 10, the first inverter 11 and the second inverter 12, by mixed continuous pulse width modulation control (MX-CPWM) which will be described later. In addition, in the second speed region VR2, the rotating electrical machine control device 1 controls both inverters 10, the first inverter 11 and the second inverter 12, by mixed discontinuous pulse width modulation control (MX-DPWM) which will be described later. In addition, in the third speed region VR3, the rotating electrical machine control device 1 controls both inverters 10, the first inverter 11 and the second inverter 12, by rectangular-wave control. $Mi\_sys$, $Mi\_inv1$, and $Mi\_inv2$ in the table will be described later.

TABLE 1

| R | $Mi\_sys$ | INV1 | $Mi\_inv1$ | INV2 | $Mi\_inv2$ |
|---|---|---|---|---|---|
| VR1 | M < a | MX-CPWM | M < a | MX-CPWM | M < a |
| VR2 | a ≤ M < 0.78 | MX-DPWM | a ≤ M < 0.78 | MX-DPWM | a ≤ M < 0.78 |
| VR3 | M = 0.78 | 1-Pulse | M = 0.78 | 1-Pulse | M = 0.78 |

It is preferred that boundaries between the control regions R (boundaries between the first speed region VR1, the second speed region VR2, and the third speed region VR3) be set based on at least one of the rotational speed of the rotating electrical machine 80 based on the torque of the rotating electrical machine 80 and a ratio of the root-mean-square value of line-to-line voltage of alternating-current voltages of a plurality of phases to direct-current voltage (which may be an instruction value or may be an equivalent from output voltage).

As exemplified in FIG. 4, the operating conditions of the rotating electrical machine 80 are often defined by a relationship between rotational speed and torque. The control regions R may be set based on rotational speed which is one parameter. Here, the rotational speed that defines boundaries between the control regions R can be set to be constant regardless of torque, but it is further preferred that the rotational speed that defines boundaries between the control regions R be set to a value that varies depending on the torque. By doing so, drive of the rotating electrical machine 80 can be controlled with high efficiency, based on the operating conditions of the rotating electrical machine 80.

In addition, for example, when the rotating electrical machine 80 requires high output (high rotational speed or high torque), a voltage-type inverter implements the requirement by increasing direct-current voltage or increasing a ratio at which direct-current voltage is converted into alternating-current voltage. When direct-current voltage is constant, the ratio at which direct-current voltage is converted into alternating-current voltage is increased, by which the requirement can be implemented. This ratio can be represented as a ratio of the root-mean-square value of three-phase alternating-current electric power to direct-current electric power (in a case of a voltage-type inverter, it is equivalent to a ratio of the root-mean-square value of three-phase alternating-current voltage to direct-current voltage). As described above, control schemes for controlling the inverters 10 include various schemes from a scheme in which the ratio is low to a scheme in which the ratio is high.

As shown in table 1, when the control regions R are set based on the ratio of the root-mean-square value of three-phase alternating-current electric power to direct-current electric power which is determined based on a requirement for the rotating electrical machine 80, drive of the rotating electrical machine 80 can be controlled with high efficiency, based on the operating conditions of the rotating electrical machine 80. Note that in the table, "Mi_inv1" represents the modulation index of the first inverter 11, "Mi_inv2" represents the modulation index of the second inverter 12, and "Mi_sys" represents the modulation index of the entire system.

The above-described table 1 exemplifies modulation indices for each control region R. In the present embodiment, the terminal-to-terminal voltage "E1" of the first direct-current power supply 61 and the terminal-to-terminal voltage "E2" of the second direct-current power supply 62 are identical (both are the voltage "E"). When the root-mean-square value on the alternating-current side of the first inverter 11 is "Va_inv1" and the root-mean-square value on the alternating-current side of the second inverter 12 is "Va_inv2", the modulation index "Mi_inv1" of the first inverter 11 and the modulation index "Mi_inv2" of the second inverter 12 are as shown in the following equations (1) and (2). In addition, the modulation index "Mi_sys" of the entire system is as shown in the following equation (3).

$$\mathrm{Mi\_inv1} = \mathrm{Va\_inv1}/E1 = \mathrm{Va\_inv1}/E \quad (1)$$

$$\mathrm{Mi\_inv2} = \mathrm{Va\_inv2}/E2 = \mathrm{Va\_inv2}/E \quad (2)$$

$$\mathrm{Mi\_sys} = (\mathrm{Va\_inv1} + \mathrm{Va\_inv2})/(E1 + E2) \quad (3)$$

$$= (\mathrm{Va\_inv1} + \mathrm{Va\_inv2})/2E$$

For the instantaneous value of voltage, an instantaneous vector needs to be considered, but when only the modulation index is simply considered, the modulation index "Mi_sys" of the entire system is "(Mi_inv1+Mi_inv2)/2" from equations (1) to (3). Note that table 1 shows, as rated values, modulation indices for each control region R. Hence, upon actual control, taking into account hunting occurring when a control scheme changes between control regions R, etc., modulation indices for each control region R may include an overlapping range.

Note that the modulation index "a" shown in table 1 and the modulation index "b" shown in table 2 which will be described later are set based on a theoretical upper limit value of a modulation index for each modulation scheme, and further taking into account dead time. For example, "a" is about 0.5 to 0.6, and "b" is about 0.25 to 0.3.

Figure 5:
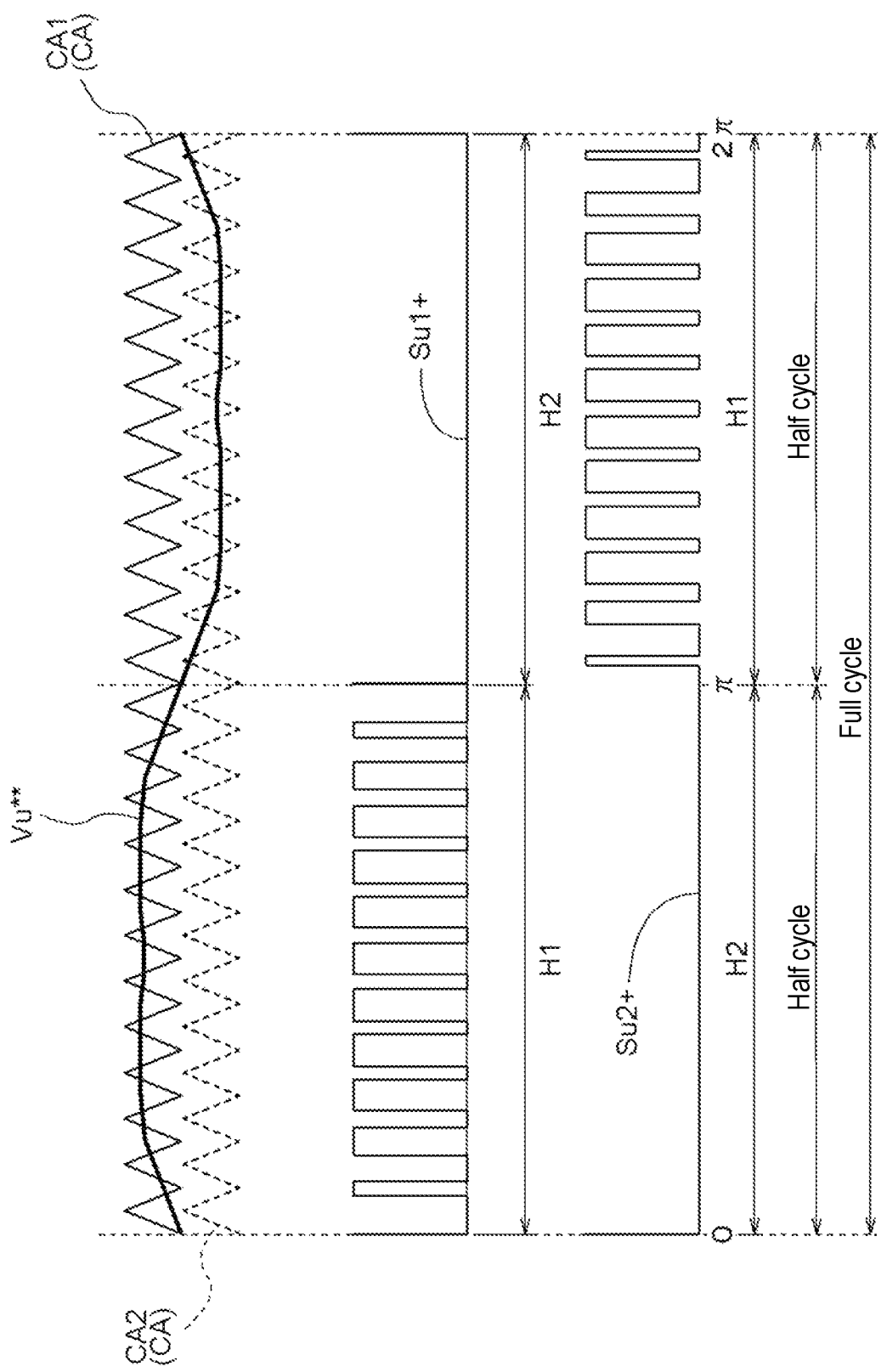
FIG. 5 is a waveform diagram showing an example of a voltage instruction and switching control signals for mixed continuous pulse width modulation control (half-cycle continuous pulses).
Figure 8:
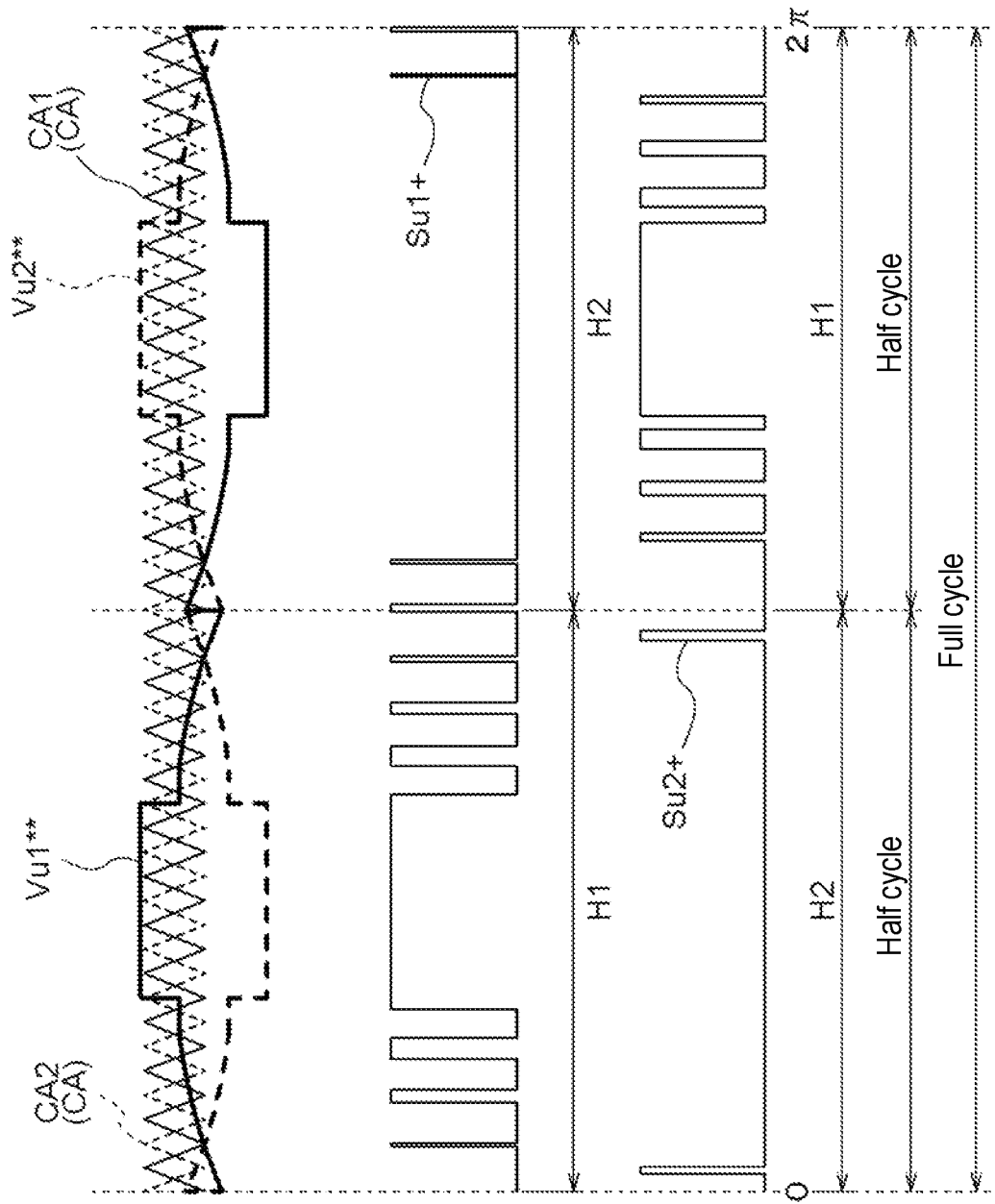
FIG. 8 is a waveform diagram showing another example of voltage instructions and switching control signals for mixed discontinuous pulse width modulation control (half-cycle discontinuous pulses).

Now, with reference to FIGS. 5 to 8, mixed pulse width modulation control (MX-PWM) which is characteristic in the present embodiment will be described by showing exemplary waveforms of U-phase voltage instructions (Vu1 and Vu2) and U-phase upper-stage-side switching control signals (Su1+ and Su2+). Note that depiction of a second U-phase lower-stage-side switching control signal Su2- and the V-phase and the W-phase is omitted. FIGS. 5 and 7 show exemplary waveforms for mixed continuous pulse width modulation control (MX-CPWM) and FIGS. 6 and 8 show exemplary waveforms for mixed discontinuous pulse width modulation control (MX-DPWM).

Figure 6:
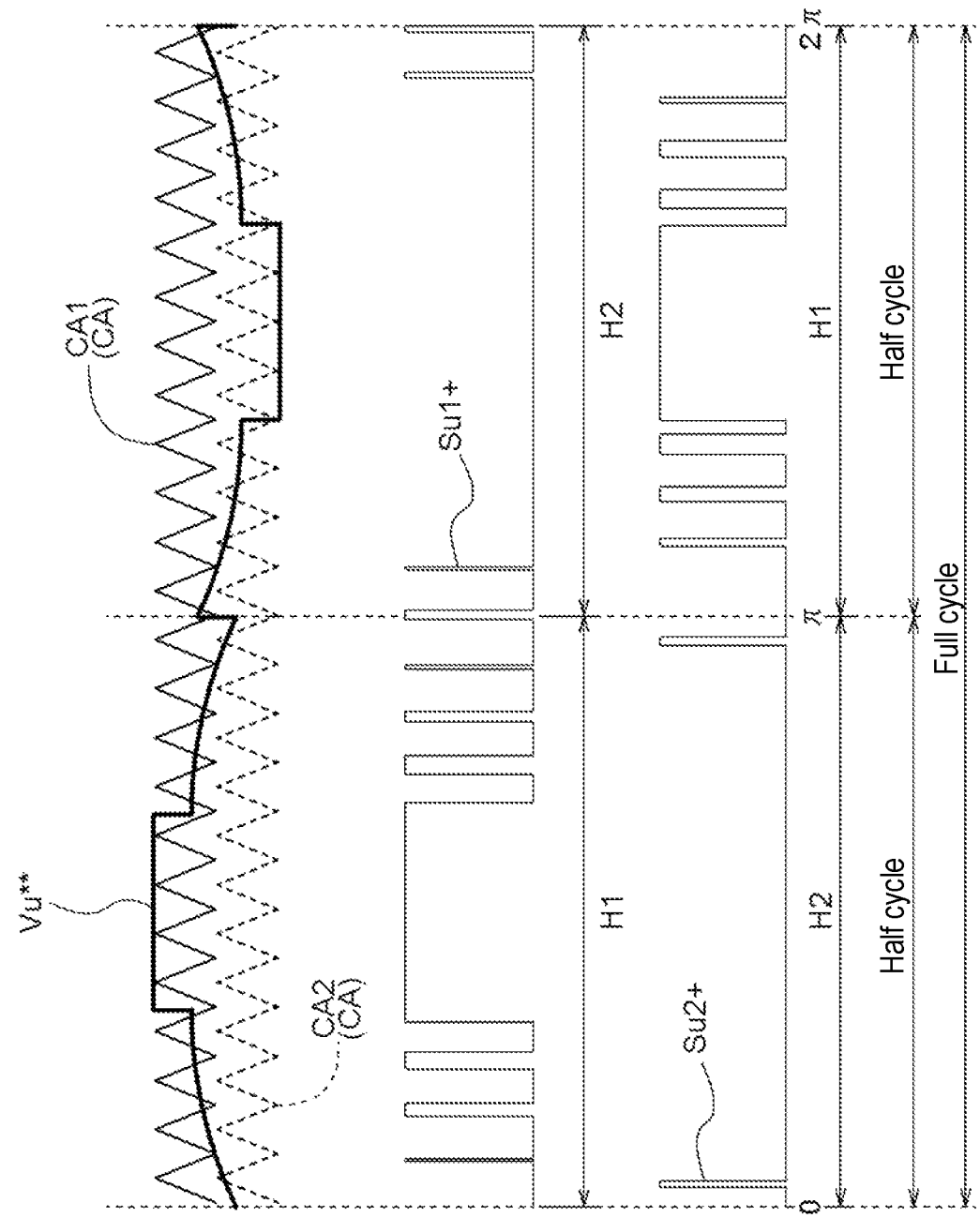
FIG. 6 is a waveform diagram showing an example of a voltage instruction and switching control signals for mixed discontinuous pulse width modulation control (half-cycle discontinuous pulses).

FIGS. 5 and 6 show examples of a first carrier CA1 which is a carrier CA for the first inverter 11, a second carrier CA2 which is a carrier CA for the second inverter 12, a common U-phase voltage instruction Vu** which is a U-phase voltage instruction common to the first inverter 11 and the second inverter 12, a first U-phase upper-stage-side switching control signal Su1+, and a second U-phase upper-stage-side switching control signal Su2+. Depiction of a first U-phase lower-stage-side switching control signal Su1- and a second U-phase lower-stage-side switching control signal Su2-, and the V-phase and the W-phase is omitted (the same also applies to other control schemes).

For example, the first carrier CA1 can change between "0.5<CA1<1", the second carrier CA2 can change between "0<CA2<0.5", and the voltage instruction (V) can change between "0≤V<1". When the voltage instruction is greater than or equal to the carrier CA (the first carrier CA1 and the second carrier CA2) as a result of comparison of the carrier CA with the voltage instruction (V), the switching control signal is "1", and when the voltage instruction is less than the carrier CA, the switching control signal is "0". Comparative logic between the carrier CA and the voltage instruction (V) is also the same in the following description.

As shown in FIGS. 5 and 6, the amplitudes of the first carrier CA1 and the second carrier CA2 are half of an amplitude allowed for the voltage instruction (V). In general pulse width modulation, the amplitude of the carrier CA is equal to an amplitude allowed for the voltage instruction, and the carrier CA for mixed pulse width modulation can be referred to as half carrier. By using such a half carrier, during a first period H1 (half cycle) which is a ½ cycle of electrical angle (full cycle), such a half carrier crosses the voltage instruction (V), and thus, a plurality of pulses with different patterns are outputted as a switching control signal. During a second period H2 (half cycle) which is the other ½ cycle, the half carrier does not cross the voltage instruction (V**), and thus, the switching control signal is outputted such that an inactive state continues.

Note that in mixed discontinuous pulse width modulation control, as shown in FIG. 6, during the second period H2, too, pulses that are partially in an active state are outputted as a switching control signal. This results from the fact that the modulation index for discontinuous pulse width modulation which is a base modulation index is large compared to that for continuous pulse width modulation. Locations where the pulses in an active state are outputted during the second period H2 are near the center of the amplitude of the voltage instruction (V) and in the neighborhood of inflection points of the voltage instruction (V). As shown in FIG. 6, it can be said that in mixed discontinuous pulse width modulation control, too, an inactive state is continuously outputted during the second period H2. In addition, when the second period H2 is set to be only a period during which the switching control signal is in an inactive state (a period less than a ½ cycle), and the first period H1 is set to be a period in one cycle other than the second period H2 (a period greater than or equal to a ½ cycle), mixed pulse width modulation can also be defined as follows. It can also be said that mixed pulse width modulation control performs control such that a plurality of pulses with different patterns are outputted during the first period H1 which is a ½ cycle or more of electrical angle, and an inactive state continues during the second period H2 which is the other period of one cycle of electrical angle.

FIGS. 7 and 8 exemplify a different mode of mixed continuous pulse width modulation control and mixed discontinuous pulse width modulation control than that of FIGS. 5 and 6. Switching control signals to be generated are the same. FIGS. 7 and 8 show examples of a first carrier CA1 which is a carrier CA for the first inverter 11, a second carrier CA2 which is a carrier CA for the second inverter 12, a first U-phase voltage instruction Vu1 which is a U-phase voltage instruction for the first inverter 11, a second U-phase voltage instruction Vu2 which is a U-phase voltage instruction for the second inverter 12, a first U-phase upper-stage-side switching control signal Su1+, and a second U-phase upper-stage-side switching control signal Su2+. For example, the first carrier CA1 and the second carrier CA2 can change between "0.5<CA<1" and the voltage instructions (V) can change between "0 V<1". The first carrier CA1 and the second carrier CA2 differ in phase by 180 degrees (71) from each other. In addition, the first U-phase voltage instruction Vu1 and the second U-phase voltage instruction Vu2 also differ in phase by 180 degrees ($\pi$) from each other.

As shown in FIGS. 7 and 8, the amplitudes of the first carrier CA1 and the second carrier CA2 are half of an amplitude allowed for the voltage instructions (V). Thus, the carrier CA in the mode shown in FIGS. 7 and 8 is also a half carrier. By using such a half carrier, during a first period H1 which is a ½ cycle (or a ½ cycle or more) of electrical angle, such a half carrier crosses the voltage instruction (V), and thus, a plurality of pulses with different patterns are outputted as a switching control signal. During a second period H2 which is the other period of the cycle, the half carrier does not cross the voltage instruction (V**), and thus, the switching control signal is outputted such that an inactive state continues.

The mode exemplified in FIGS. 5 and 6 is a scheme in which modulation is performed using two half carriers and one common reference voltage instruction (V), and thus can be said to be a double half-carrier and single reference scheme. On the other hand, the mode exemplified in FIGS. 7 and 8 is a scheme in which modulation is performed using two half carriers and two voltage instructions (V), and thus can be said to be a double half-carrier and double reference scheme.

As described above with reference to FIGS. 5 to 8, in mixed pulse width modulation control, a plurality of pulses are generated based on a half carrier (the first carrier CA1 and the second carrier CA2) which is a carrier CA with the ½ wave height of a variable range of an instruction value (a voltage instruction; in the above-described examples, the U-phase voltage instruction (Vu (Vu=Vu1=Vu2), Vu1, and Vu2)), and the instruction value. In the present embodiment, as schemes for mixed pulse width modulation control, two schemes are exemplified: the double half-carrier and single reference scheme and the double half-carrier and double reference scheme.

In the double half-carrier and single reference scheme, as described with reference to FIGS. 5 and 6, pulses for the first inverter 11 are generated based on a first half carrier (first carrier CA1) that is set, as a half carrier, on one of a higher voltage side and a lower voltage side (here, the higher voltage side) than the center of the amplitude of an instruction value (common U-phase voltage instruction Vu), and the instruction value (common U-phase voltage instruction Vu) common to the first inverter 11 and the second inverter 12. In addition, in this scheme, pulses for the second inverter 12 are generated based on a second half carrier (second carrier CA2) that has the same phase as the first half carrier (first carrier CAT) and that is set on the other one of the higher voltage side and the lower voltage side (here, the lower voltage side) than the center of the amplitude of the instruction value (common U-phase voltage instruction Vu), and the instruction value (common U-phase voltage instruction Vu).

In the double half-carrier and double reference scheme, as described with reference to FIGS. 7 and 8, pulses for the first inverter 11 are generated based on a first half carrier (first carrier CAT) that is set, as a half carrier, on one of a higher voltage side and a lower voltage side (here, the higher voltage side) than the centers of the amplitudes of instruction values (the first U-phase voltage instruction Vu1 and the second U-phase voltage instruction Vu2), and a first instruction value for the first inverter 11 (first U-phase voltage instruction Vu1). In addition, in this scheme, pulses for the second inverter 12 are generated based on a second half carrier (second carrier CA2) that differs in phase by 180 degrees from the first half carrier (first carrier CAT) and that is set on the same side (the higher voltage side) as the first half carrier (first carrier CAT), and a second instruction value for the second inverter 12 (second U-phase voltage instruction Vu2) that differs in phase by 180 degrees from the first instruction value (first U-phase voltage instruction Vu1**).

Figure 9:
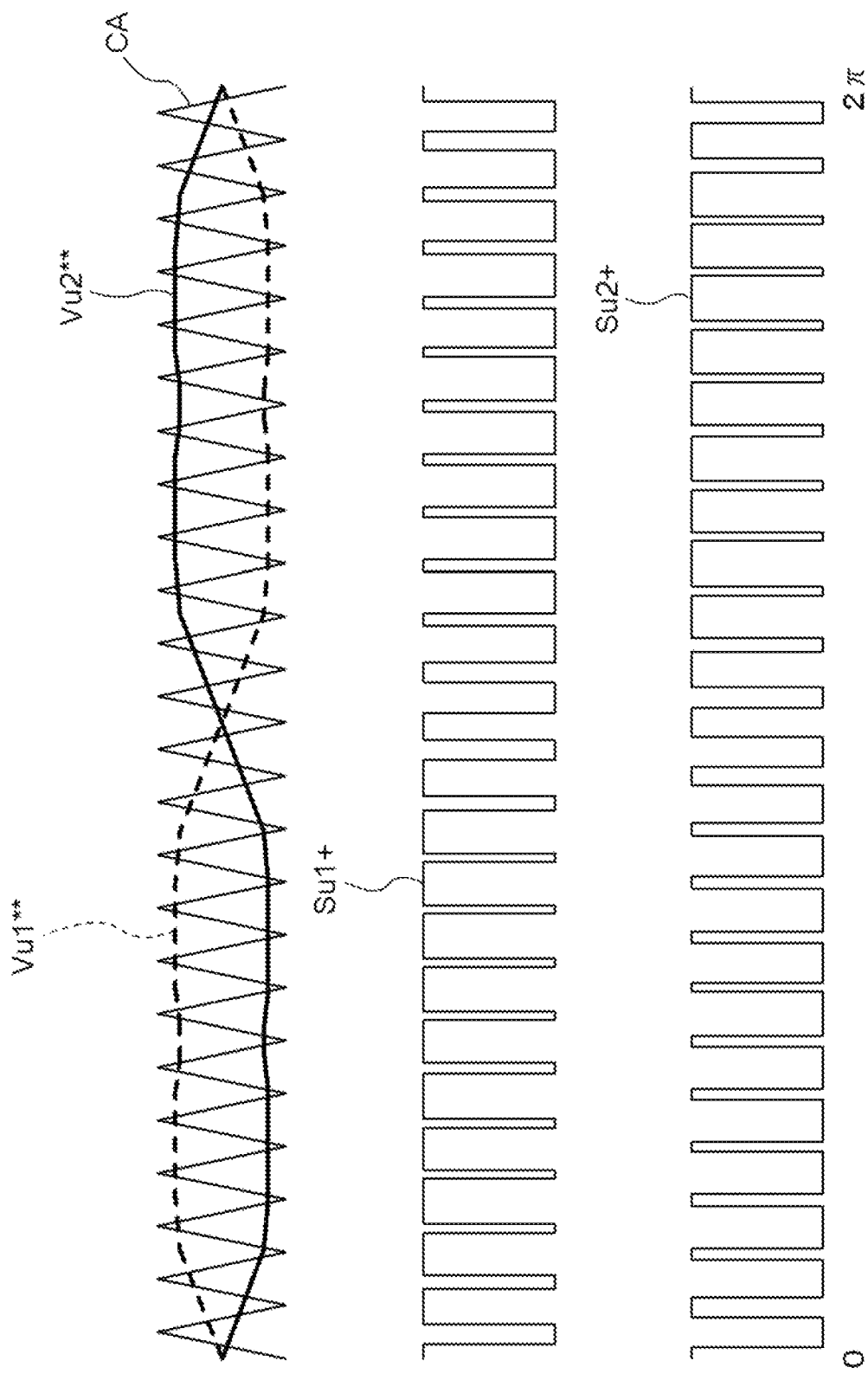
FIG. 9 is a waveform diagram showing an example of voltage instructions and switching control signals for continuous pulse width modulation control.
Figure 10:
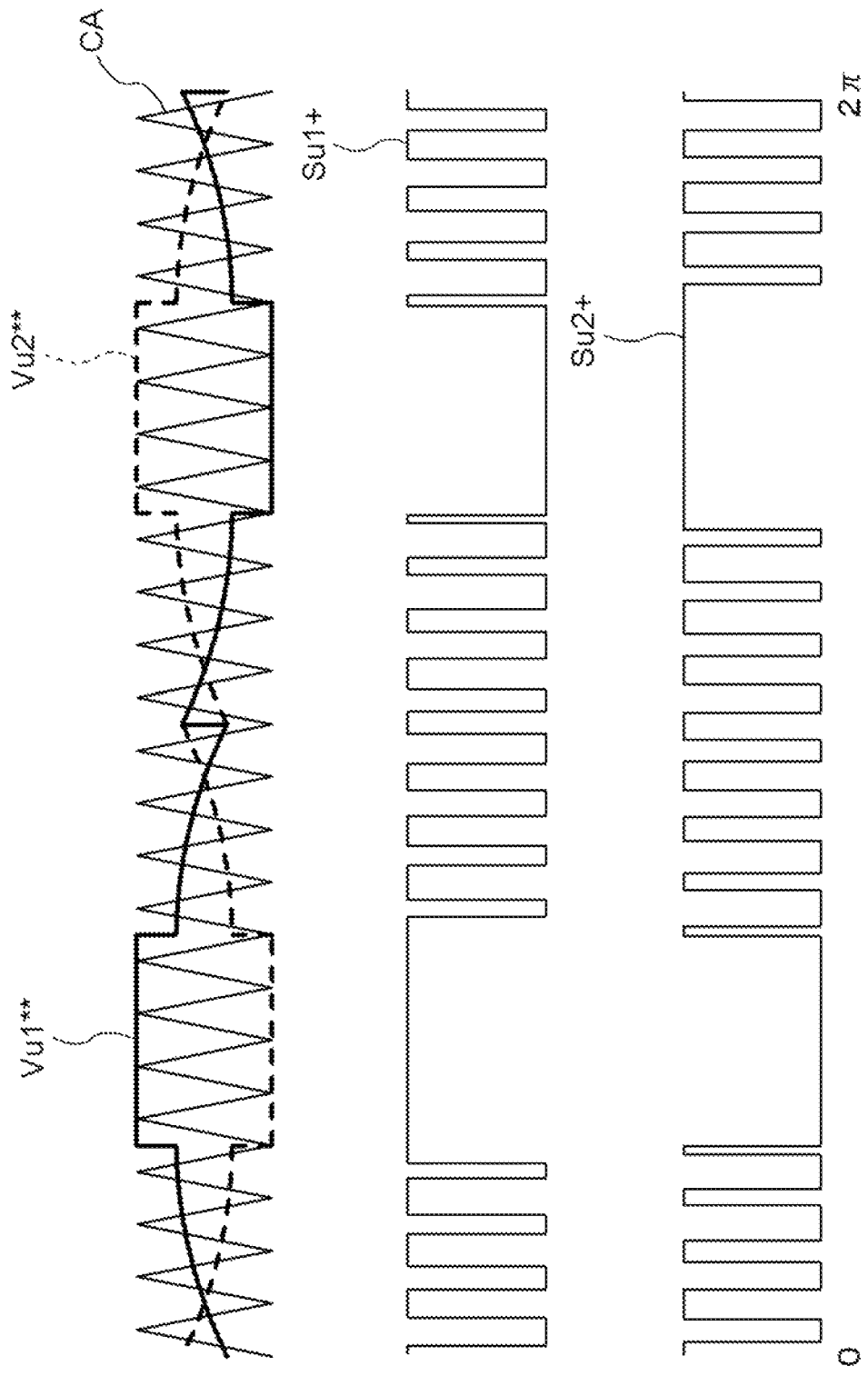
FIG. 10 is a waveform diagram showing an example of voltage instructions and switching control signals for discontinuous pulse width modulation control.

Note that as will be described later with reference to table 2, in the first speed region VR1 and the second speed region VR2, the inverters 10 may be controlled by pulse width modulation control instead of mixed pulse width modulation control. FIG. 9 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for a case in which in the first speed region VR1, the first inverter 11 and the second inverter 12 both are controlled by continuous pulse width modulation control. In addition, FIG. 10 shows an example of a first U-phase voltage instruction Vu1, a second U-phase voltage instruction Vu2, a carrier CA, a first U-phase upper-stage-side switching control signal Su1+, and a second U-phase upper-stage-side switching control signal Su2+ for a case in which in the second speed region VR2, the first inverter 11 and the second inverter 12 both are controlled by discontinuous pulse width modulation control.

When switching control is performed on both of the first inverter 11 and the second inverter 12, the first U-phase voltage instruction Vu1 and the second U-phase voltage instruction Vu2 have phases differing by approximately 180 degrees. For example, the maximum amplitude of U-phase voltage is "(4/3)E" and the maximum amplitude of line-to-line voltage is "2E" (see also the vector diagram of FIG. 3). Note that the first direct-current power supply 61 and the second direct-current power supply 62 are independent of each other, and the first direct-current voltage E1 of the first direct-current power supply 61 and the second direct-current voltage E2 of the second direct-current power supply 62 may have different values. For example, to be precise, the maximum amplitude of U-phase voltage is "((2/3)E1)+(2/3)E2", but for easy understanding, in this specification, "E1=E2=E". To the rotating electrical machine 80 is supplied equal electric power from the two inverters 10. At this time, identical voltage instructions (V) with phases differing by 180 degrees ($\pi$) are provided to both inverters 10**.

Meanwhile, when switching control is performed on the inverters 10, ripple components superimposed on an alternating-current fundamental may generate noise in an audio frequency band. When the two inverters 10 are controlled by pulses having different modes, a ripple based on each pulse occurs, which may increase noise in the audio frequency band. Particularly, when the rotational speed of the rotating electrical machine 80 is low, the possibility of inclusion of the frequency of ripple components (or sideband frequencies thereof) in the audio frequency band increases. It is desirable to appropriately set control schemes for the rotating electrical machine 80, i.e., control schemes for the inverters 10, based on operating conditions so that both of operation with high system efficiency and a reduction in audible noise can be achieved.

The rotating electrical machine control device 1 of the present embodiment has, as control modes of the rotating electrical machine 80, a loss reduction priority mode (efficiency priority mode) and a noise reduction priority mode in a switchable manner. In the loss reduction priority mode, the rotating electrical machine control device 1 performs switching control on the inverters 10 using mixed pulse width modulation control, as described above with reference to table 1. In the noise reduction priority mode, the rotating electrical machine control device 1 performs switching control on the inverters 10 using pulse width modulation control, as exemplified in the following table 2:

TABLE 2

| R | Mi_sys | INV1 | Mi_inv1 | INV2 | Mi_inv2 |
|---|---|---|---|---|---|
| VR1 | M < b | CPWM | M < b | CPWM | M < b |
| VR2-2 | b ≤ M < 0.78 | DPWM | b ≤ M < 0.78 | DPWM | b ≤ M < 0.78 |
| VR3 | M = 0.78 | 1-Pulse | M = 0.78 | 1-Pulse | M = 0.78 |

When switching control is performed on the inverters 10, ripple components superimposed on an alternating-current fundamental may generate noise in the audio frequency band. Particularly, when the rotational speed of the rotating electrical machine 80 is low, the possibility of inclusion of the frequency of ripple components (or sideband frequencies thereof) in the audio frequency band increases. In mixed pulse width modulation, as shown in FIGS. 5 to 8, during a half cycle of electrical angle, the two inverters 10 are controlled using different modes of pulses, and thus, a ripple based on each pulse occurs, and there is a possibility of increase in noise in the audio frequency band. In the first speed region VR1 and the second speed region VR2 in which the rotational speed of the rotating electrical machine 80 is relatively low, sound associated with traveling of the vehicle (traveling sound such as sound of tires contacting a road surface) is also small, and thus, when noise outputted from one inverter 10 to be driven is noise in the audio frequency band, there is a possibility that the noise is likely to be audible to a user.

For example, it is preferred that upon the start of the vehicle or upon deceleration to make a stop, taking into account the fact that noise in the audio frequency band is likely to be audible to the user, the noise reduction priority mode be selected, and upon steady-state driving where the vehicle travels in a steady state, the loss reduction priority mode be selected. Note that these modes may be selected by a user's operation (a setting switch (also including input from a touch panel, etc.)).

In the noise reduction priority mode, in the first speed region VR1 and the second speed region VR2 in which the rotational speed of the rotating electrical machine 80 is relatively low, the first inverter 11 and the second inverter 12 are controlled by pulse width modulation control instead of mixed pulse width modulation control. The two inverters 10 that allow currents to flow through the stator coils 8 have phases of currents differing by substantially 180 degrees, and thus, the phases of currents including ripple components differ by substantially 180 degrees from each other. Thus, at least some of the ripple components can cancel each other out, enabling a reduction in noise in the audio frequency band.

Meanwhile, a switching element 3 included in the inverters 10 may cause a short-circuit failure in which the switching element 3 is always in on state, or an open-circuit failure in which the switching element 3 is always in off state. For example, in a case in which a general rotating electrical machine including Y-connected stator coils is driven by one inverter, when a short-circuit failure or an open-circuit failure has occurred, shutdown control in which all switching elements in the inverter are brought into off state, or active short-circuit control in which upper-stage-side switching elements in arms of all of a plurality of phases are brought into on state or lower-stage-side switching elements in the arms of all of the plurality of phases are brought into on state is performed, by which the vehicle stops.

However, when, as in the present embodiment, drive of the rotating electrical machine 80 having, as the stator coils 8, open-end windings of a plurality of phases that are independent of each other is controlled through the first inverter 11 and the second inverter 12, it is possible to control drive of the rotating electrical machine 80 through one of the inverters 10, the first inverter 11 or the second inverter 12. As described above, when one inverter 10 is short-circuited by active short-circuit control, the stator coils 8 of a plurality of phases are short-circuited in the one inverter 10, and the one inverter 10 serves as a neutral point and the stator coils 8 are Y-connected. Hence, the rotating electrical machine control device 1 can implement a mode in which the Y-connected rotating electrical machine 80 is controlled through one inverter 10 (an inverter 10 that is not subjected to active short-circuit control).

In a case in which a rotating electrical machine is driven by one inverter, when a short-circuit failure or an open-circuit failure has occurred, there is a need to stop a vehicle that uses the rotating electrical machine as a drive power source. However, when, as in the present embodiment, the rotating electrical machine 80 is driven by the two inverters 10, even if a short-circuit failure or an open-circuit failure has occurred, traveling of the vehicle that uses the rotating electrical machine 80 as a drive power source can be continued in a certain limited range without stopping the vehicle. For example, the vehicle can travel to a destination for the time being, such as a driver's home, a repair shop, etc.

For example, when a short-circuit failure has occurred in one inverter 10, active short-circuit control may be performed by bringing all switching elements 3 in one side of the arms, upper-stage-side arms or lower-stage-side arms, that includes a switching element 3 having the short-circuit failure into on state, and bringing all switching elements 3 in the other side of the arms into off state. By bringing all switching elements 3 in one side of the arms that includes a switching element 3 having the short-circuit failure into on state, the switching element 3 having the short-circuit failure can be used as a switching element 3 that has no failure.

In addition, when an open-circuit failure has occurred in one inverter 10, active short-circuit control may be performed by bringing all switching elements 3 in one side of the arms, upper-stage-side arms or lower-stage-side arms, that does not include a switching element 3 having the open-circuit failure into on state, and bringing all switching elements 3 in one side of the arms that includes the switching element 3 having the open-circuit failure into off state. By bringing all switching elements 3 in one side of the arms that includes a switching element 3 having the open-circuit failure into off state, the switching element 3 having the open-circuit failure can be used as a switching element 3 that has no failure.

Hence, there is a need to identify at least which one of the first inverter 11 and the second inverter 12 a failed switching element 3 belongs to, and which one of a set of upper-stage-side arms and a set of lower-stage-side arms the failed switching element 3 belongs to. It is more preferable to also identify which one of the plurality of phases the failed switching element 3 is of.

A mode will be described below in which when an open-circuit failure has occurred in any one of the switching elements 3 included in the first inverter 11 and the second inverter 12 (when a one-phase open-circuit failure has occurred), the switching element 3 having the open-circuit failure is identified, and the rotating electrical machine 80 is driven by fail-safe control so that traveling of the vehicle can be continued after the identification.

Figure 11:
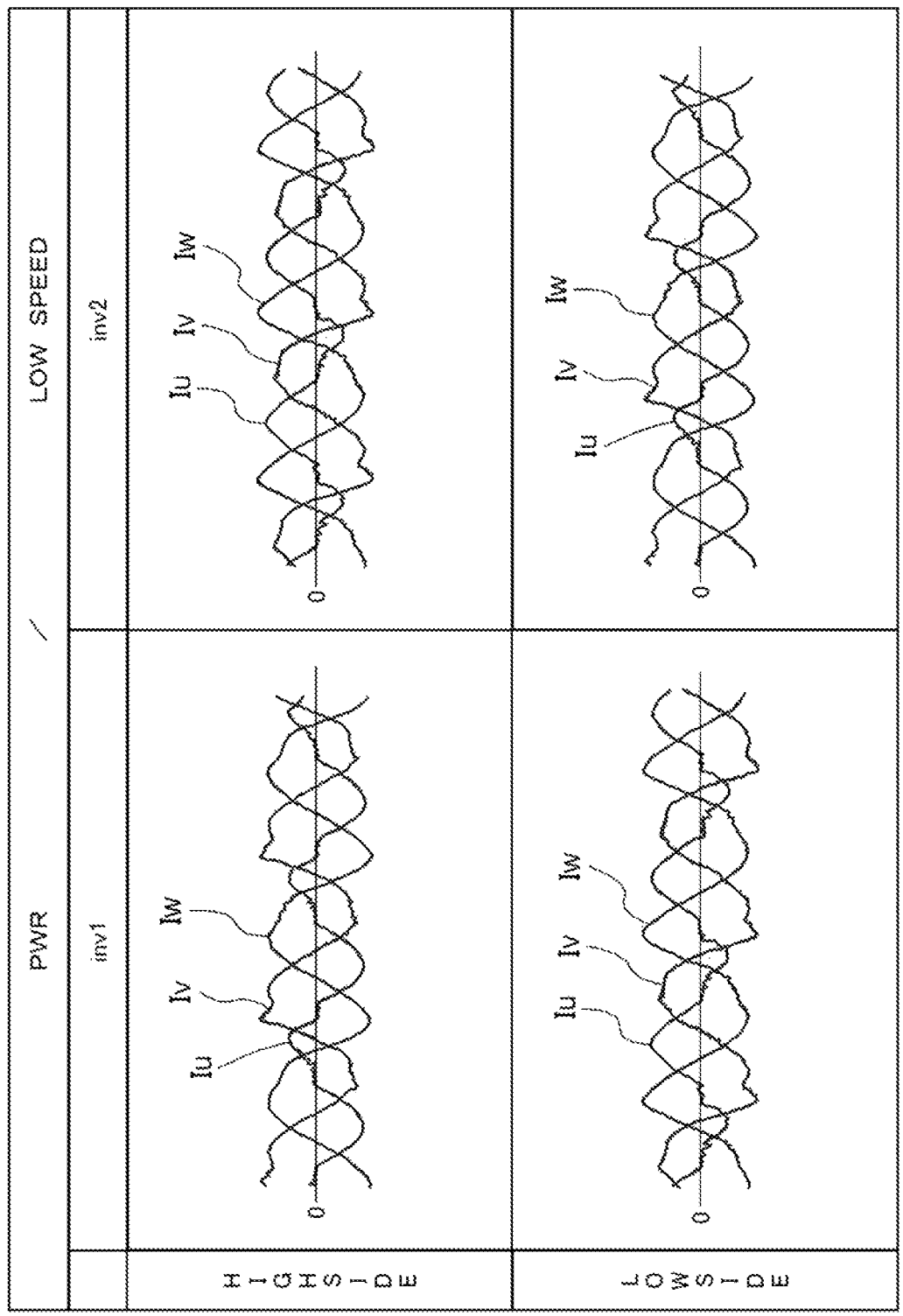
FIG. 11 is a waveform diagram showing an example of waveforms of three-phase alternating currents for a case in which an open-circuit failure has occurred upon powering (low speed).
Figure 12:
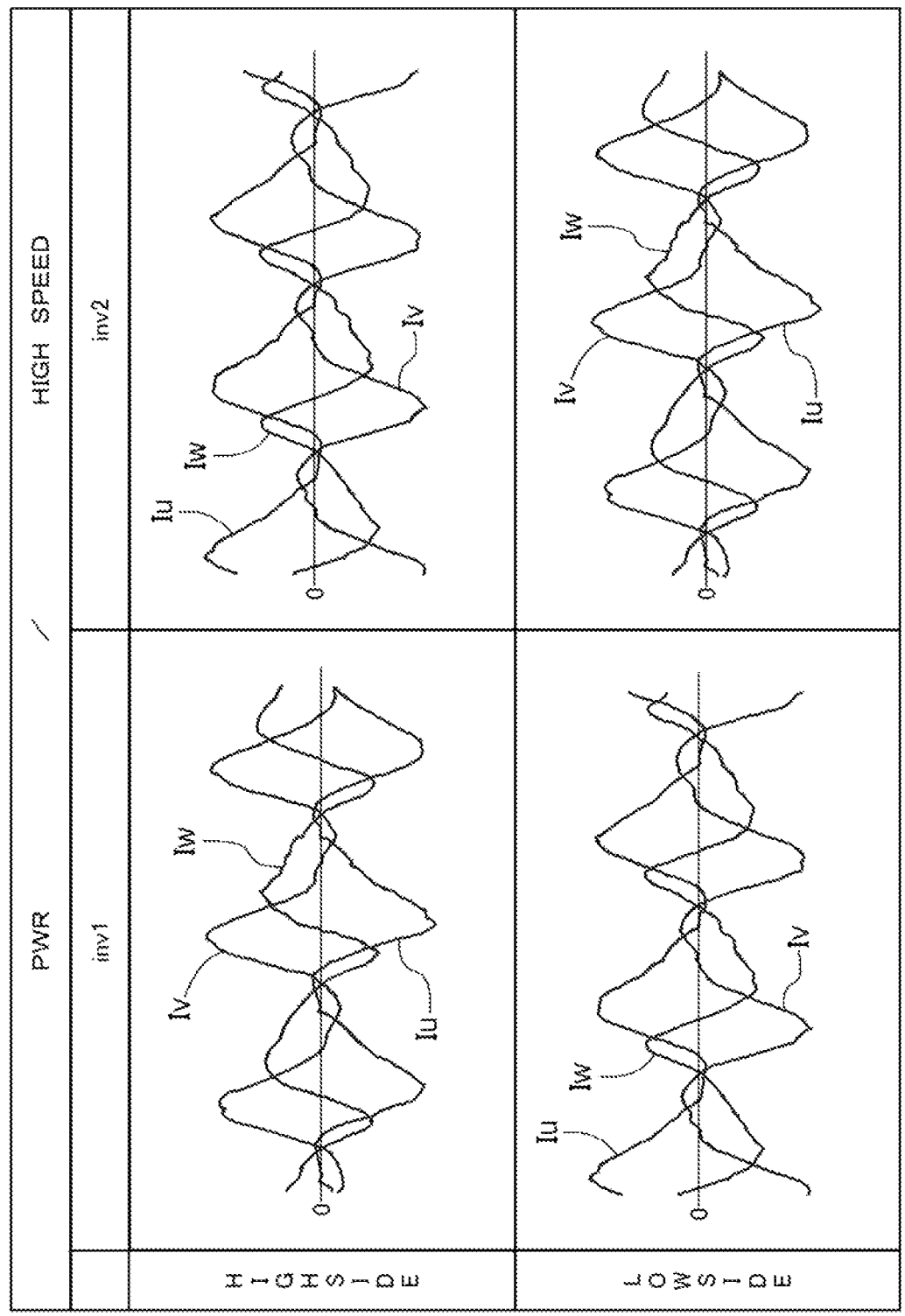
FIG. 12 is a waveform diagram showing an example of waveforms of three-phase alternating currents for a case in which an open-circuit failure has occurred upon powering (high speed).

FIGS. 11 to 14 (and FIGS. 36 to 39 which will be described later) are waveform diagrams showing examples of waveforms of three-phase alternating currents (a U-phase current Iu, a V-phase current Iv, and a W-phase current Iw) for a case in which an open-circuit failure has occurred. FIGS. 11 and 12 (and FIGS. 36 and 37) show waveforms of three-phase alternating currents for a case in which an open-circuit failure has occurred upon powering, and FIGS. 13 and 14 (and FIGS. 38 and 39) show waveforms of three-phase alternating currents for a case in which an open-circuit failure has occurred upon regeneration. FIGS. 11 to 14 (and FIGS. 36 to 39 which will be described later) show, in common, waveforms for a case in which a U-phase switching element 3 has an open-circuit failure. In addition, FIGS. 11 to 14 (and FIGS. 36 to 39 which will be described later) show, in common and in matrix form, waveforms for a case in which a switching element 3 on the upper-stage side (HIGHSIDE) of the first inverter 11 has an open-circuit failure, waveforms for a case in which a switching element 3 on the lower-stage side (LOWSIDE) of the first inverter 11 has an open-circuit failure, waveforms for a case in which a switching element 3 on the upper-stage side (HIGHSIDE) of the second inverter 12 has an open-circuit failure, and waveforms for a case in which a switching element 3 on the lower-stage side (LOWSIDE) of the second inverter 12 has an open-circuit failure. In addition, FIG. 12 in comparison with FIG. 11 (and FIG. 37 in comparison with FIG. 36) shows a case in which the rotational speed of the rotating electrical machine 80 is high for the same torque, and FIG. 14 in comparison with FIG. 13 (and FIG. 39 in comparison with FIG. 38) shows a case in which the rotational speed of the rotating electrical machine 80 is high for the same torque.

As shown in FIGS. 11 and 12, when an open-circuit failure has occurred upon powering, regardless of which one of the upper-stage side and lower-stage side of the first inverter 11 or the second inverter 12 has the open-circuit failure, the waveforms of three-phase alternating currents are asymmetrical and distorted. In addition, the waveforms of three-phase alternating currents are the same between when the upper-stage side of the first inverter 11 has an open-circuit failure and when the lower-stage side of the second inverter 12 has an open-circuit failure, and are the same between when the lower-stage side of the first inverter 11 has an open-circuit failure and when the upper-stage side of the second inverter 12 has an open-circuit failure.

Figure 13:
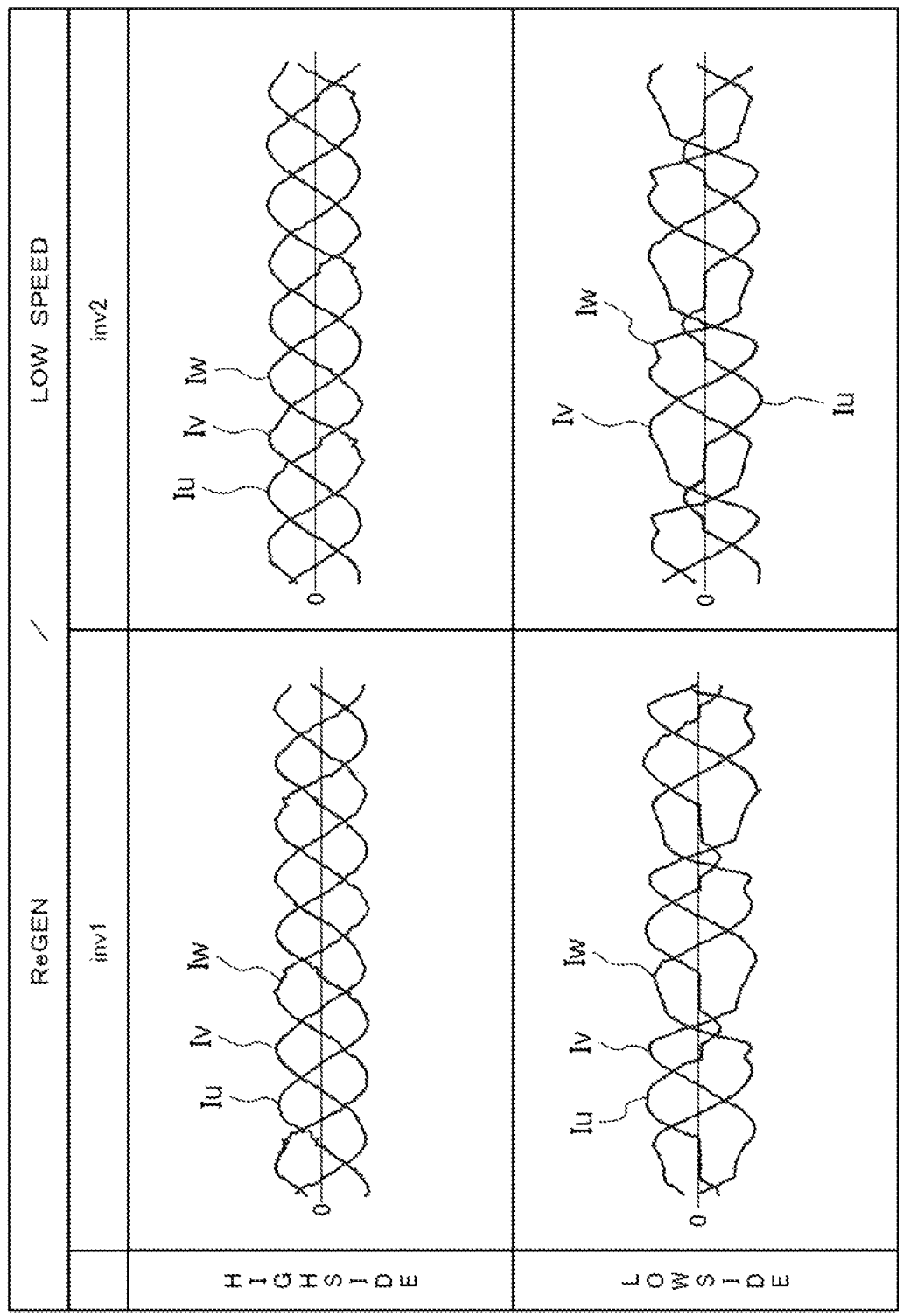
FIG. 13 is a waveform diagram showing an example of waveforms of three-phase alternating currents for a case in which an open-circuit failure has occurred upon regeneration (low speed).
Figure 14:
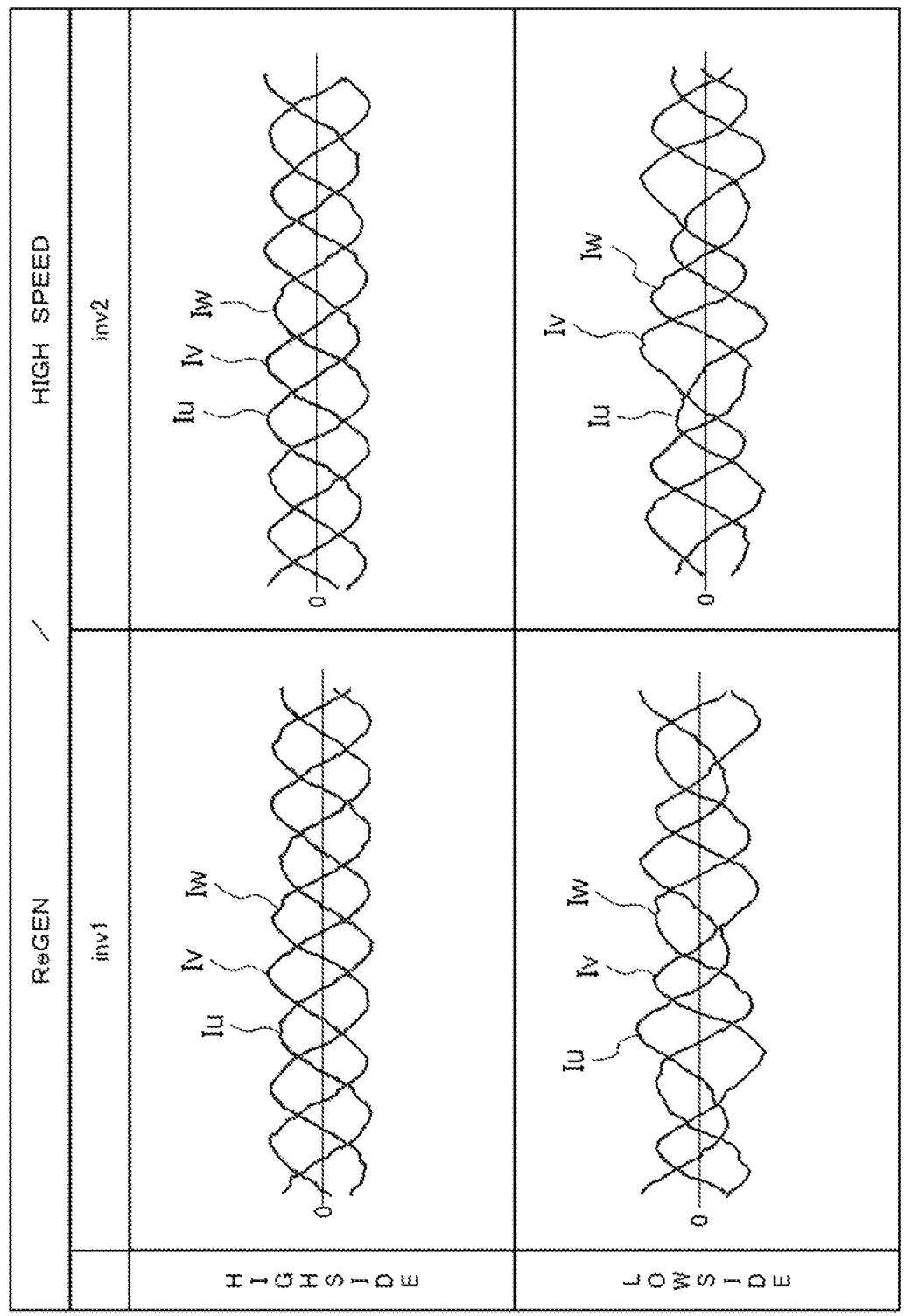
FIG. 14 is a waveform diagram showing an example of waveforms of three-phase alternating currents for a case in which an open-circuit failure has occurred upon regeneration (high speed).

On the other hand, as shown in FIGS. 13 and 14, upon regeneration, when an open-circuit failure has occurred on the lower-stage sides of the first inverter 11 and the second inverter 12, the waveforms of three-phase alternating currents are asymmetrical and distorted, but when an open-circuit failure has occurred on the upper-stage sides of the first inverter 11 and the second inverter 12, the waveforms of three-phase alternating currents are substantially symmetrical and have almost no distortion.

Figure 15:
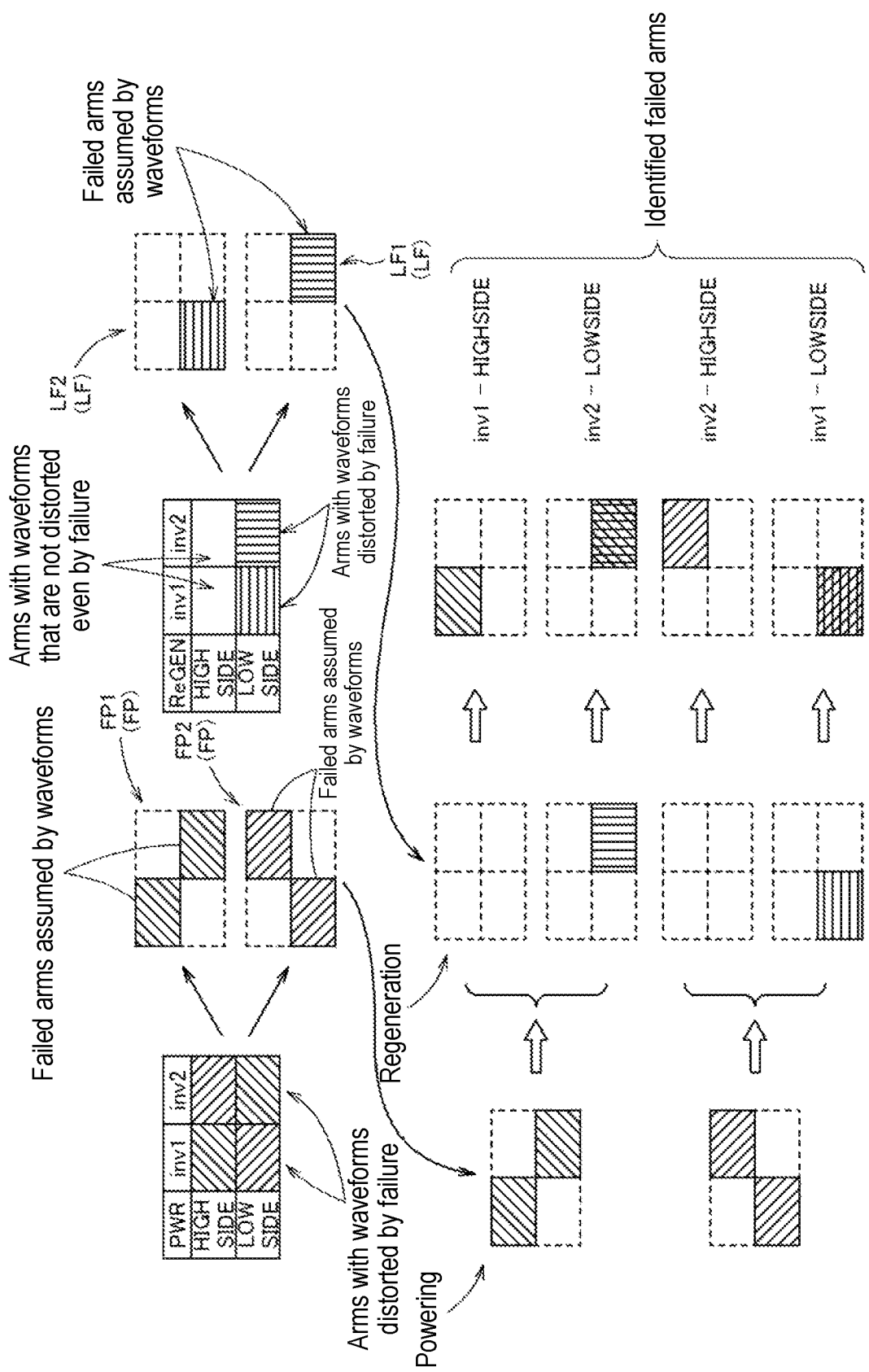
FIG. 15 is an illustrative diagram of a principle of determining an open-circuit failure location.

Namely, as shown in FIG. 15, upon powering (excluding powering at a super low speed which will be described later with reference to FIGS. 16 to 18), regardless of where an open-circuit failure has occurred, the waveforms of three-phase alternating currents show abnormalities, and a manner of the abnormalities can be roughly divided into two failure patterns FP, a first failure pattern FP1 and a second failure pattern FP2, shown in FIG. 15. Upon regeneration, only when an open-circuit failure has occurred on the lower-stage sides of the first inverter 11 and the second inverter 12, the waveforms of three-phase alternating currents show abnormalities. A manner of the abnormalities can be roughly divided into two lower-stage-side failure patterns LF, a first lower-stage-side failure pattern LF1 and a second lower-stage-side failure pattern LF2, shown in FIG. 15.

The first failure pattern FP1 is a failure pattern FP obtained when either one of a set of the upper-stage-side arms of the first inverter 11 and a set of the lower-stage-side arms of the second inverter 12 is failure-side arms in which an open-circuit failure has occurred. The second failure pattern FP2 is a failure pattern FP obtained when either one of a set of the lower-stage-side arms of the first inverter 11 and a set of the upper-stage-side arms of the second inverter 12 is failure-side arms. The first lower-stage-side failure pattern LF1 is a lower-stage-side failure pattern LF obtained when the lower-stage-side arms of the second inverter are failure-side arms. The second lower-stage-side failure pattern LF2 is a lower-stage-side failure pattern LF obtained when the lower-stage-side arms of the first inverter are failure-side arms.

As shown in FIG. 15, the forms of the failure patterns FP and the lower-stage-side failure patterns LF differ from each other while partially overlapping each other. Thus, by checking the state of waveforms of three-phase alternating currents upon powering against the state of waveforms of three-phase alternating currents upon regeneration, when an open-circuit failure has been detected, it is possible to determine on which one of the upper-stage side and the lower-stage side and in which one of the inverters 10 the open-circuit failure has occurred (where failure-side arms are).

Specifically, when the first failure pattern FP1 is detected upon powering and abnormalities have not been detected in waveforms of three-phase alternating currents upon regeneration, it can be determined that an open-circuit failure has occurred on the upper-stage side of the first inverter 11 (inv1-HIGHSIDE). When the first failure pattern FP1 is detected upon powering and the first lower-stage-side failure pattern LF1 is detected upon regeneration, it can be determined that an open-circuit failure has occurred on the lower-stage side of the second inverter 12 (inv2-LOWSIDE). In addition, when the second failure pattern FP2 is detected upon powering and abnormalities have not been detected in waveforms of three-phase alternating currents upon regeneration, it can be determined that an open-circuit failure has occurred on the upper-stage side of the second inverter 12 (inv2-HIGHSIDE). When the second failure pattern FP2 is detected upon powering and the second lower-stage-side failure pattern LF2 is detected upon regeneration, it can be determined that an open-circuit failure has occurred on the lower-stage side of the first inverter 11 (inv1-LOWSIDE).

Figure 17:
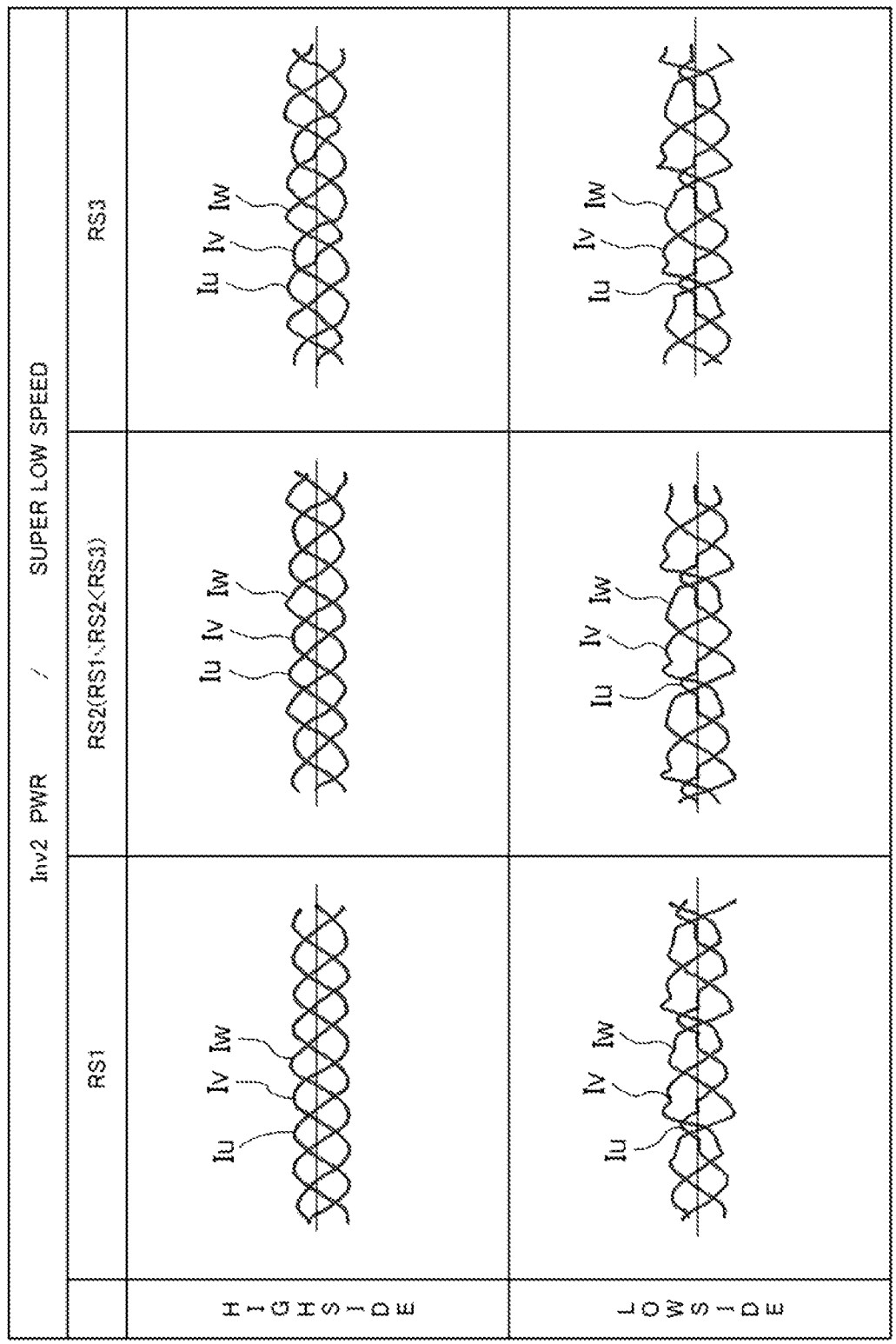
FIG. 17 is a waveform diagram showing an example of waveforms of three-phase alternating currents for a case in which an open-circuit failure has occurred in a second inverter upon powering at the super low rotational speed.
Figure 18:
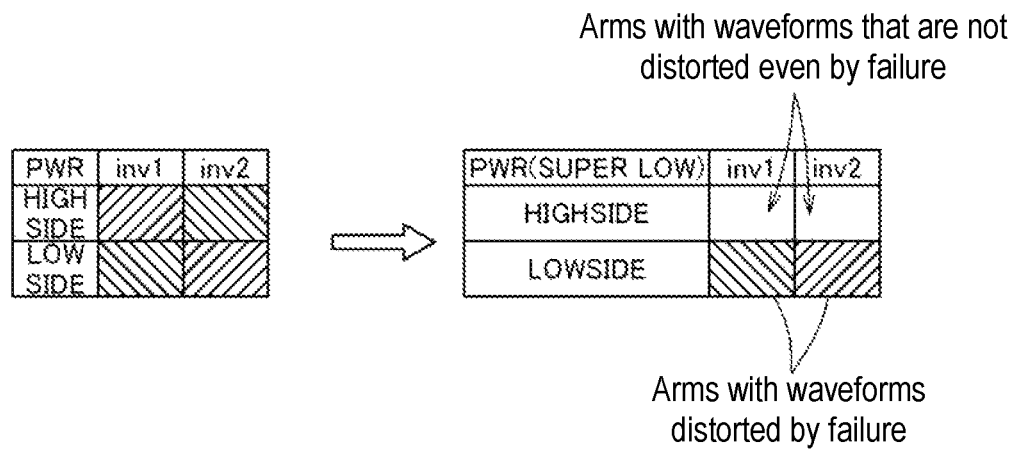
FIG. 18 is a diagram showing differences in the behavior of three-phase alternating currents between when an open-circuit failure has occurred upon powering at the super low rotational speed and when an open-circuit failure has occurred upon powering at a rotational speed higher than the super low rotational speed.

FIGS. 16 and 17 show waveforms of three-phase alternating currents for a case in which an open-circuit failure has occurred at a super low rotational speed that is lower in the rotational speed of the rotating electrical machine 80 than that in FIGS. 11 and 13. FIGS. 16 and 17 both show the waveforms of three-phase alternating currents for a case in which an open-circuit failure has occurred upon powering. FIG. 16 shows waveforms for a case in which a U-phase switching element 3 on the upper-stage side or lower-stage side of the first inverter 11 has an open-circuit failure, and FIG. 17 shows waveforms for a case in which a U-phase switching element 3 on the upper-stage side or lower-stage side of the second inverter 12 has an open-circuit failure. FIGS. 16 and 17 show, in common and in matrix form, waveforms at three different types of rotational speed (RS1, RS2, and RS3), waveforms for a case in which a switching element 3 on the upper-stage side (HIGHSIDE) has an open-circuit failure, and waveforms for a case in which a switching element 3 on the lower-stage side (LOWSIDE) has an open-circuit failure. Note that the rotational speed is "RS1<RS2<RS3", and "RS3" that is the highest rotational speed among the three rotational speeds is also a super low rotational speed that is lower in the rotational speed of the rotating electrical machine 80 than that in FIGS. 11 and 13.

As with the time of regeneration, as shown in FIGS. 16 and 17, when an open-circuit failure has occurred on the lower-stage sides of the first inverter 11 and the second inverter 12, the waveforms of three-phase alternating currents are asymmetrical and distorted, but when an open-circuit failure has occurred on the upper-stage sides of the first inverter 11 and the second inverter 12, the waveforms of three-phase alternating currents are substantially symmetrical and have almost no distortion. That is, as shown in FIG. 18, when the rotational speed is reduced to the super low rotational speed, the state of waveforms of three-phase alternating currents for a case of occurrence of an open-circuit failure changes. The behavior of waveforms of three-phase alternating currents at the super low rotational speed is the same as that for a case of regeneration, and thus, as described above with reference to FIG. 15, by checking the state of waveforms of three-phase alternating currents upon powering at the super low rotational speed against the state of waveforms of three-phase alternating currents upon powering at a higher speed than the super low rotational speed, when an open-circuit failure has been detected, it is possible to determine on which one of the upper-stage side and the lower-stage side and in which one of the inverters 10 the open-circuit failure has occurred.

Figure 19:
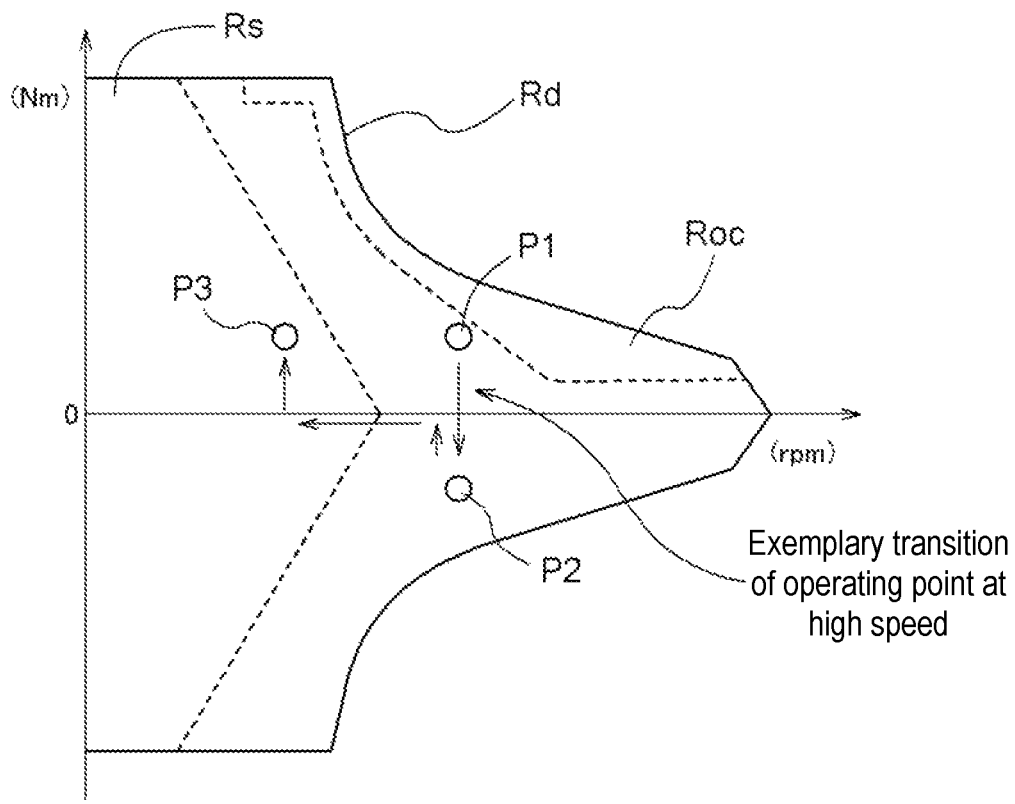
FIG. 19 is a diagram showing operating points in the control regions of the rotating electrical machine.

FIG. 19 shows operating points in control regions of the rotating electrical machine 80. Note that the control region "Rs" in FIG. 19 represents a single inverter control region Rs used when the rotating electrical machine 80 is controlled by one inverter 10, and "Rd" indicating the entire control region represents a dual inverter control region Rd used when the rotating electrical machine 80 is controlled by the two inverters 10.

Figure 20:
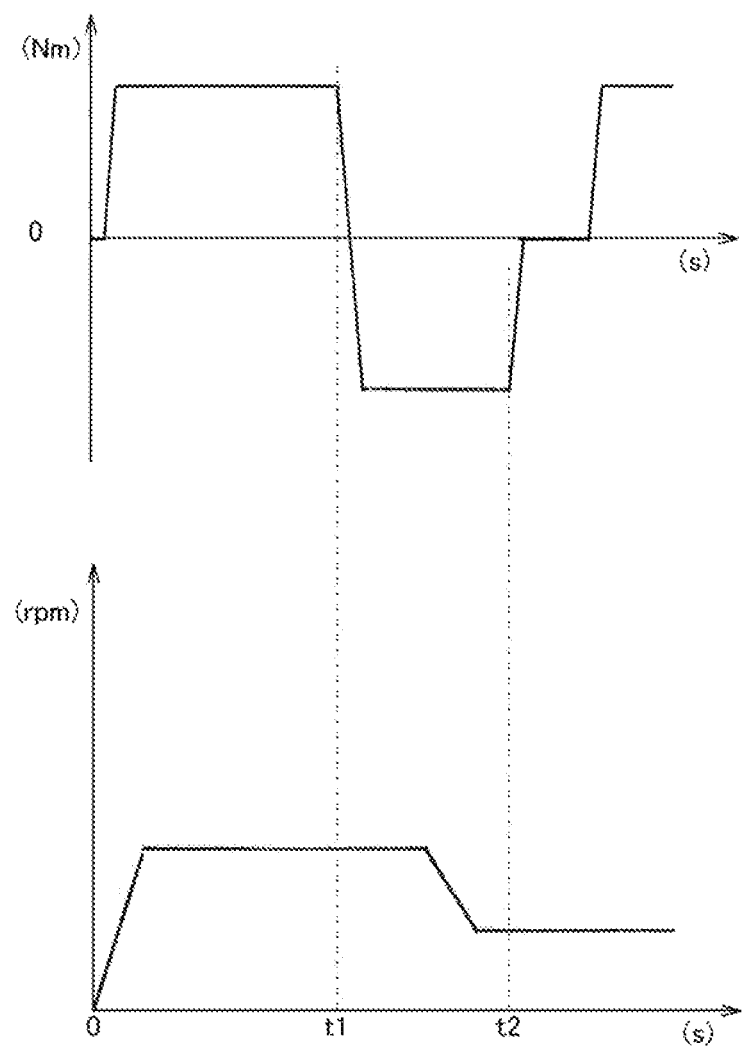
FIG. 20 is a diagram showing a relationship between the torque instruction and rotational speed of the rotating electrical machine upon determining a failure location.

For example, when an open-circuit failure is detected during powering at a first operating point P1 outside the single inverter control region Rs, by moving the operating point to a second operating point P2 on a regeneration side, as described above with reference to FIG. 15, a location where the open-circuit failure has occurred can be determined. FIG. 20 shows a relationship between the torque instruction and rotational speed of the rotating electrical machine 80, and at time t1 at which an open-circuit failure is detected during powering at the first operating point P1, the torque instruction is changed from powering torque to regenerative torque. By regenerative control, the rotational speed of the rotating electrical machine 80 decreases between time t1 and t2, and at time t2, the rotational speed of the rotating electrical machine 80 decreases to a rotational speed in the single inverter control region Rs.

When a location where the open-circuit failure has occurred is identified, in the single inverter control region Rs, active short-circuit control is performed on one of the inverters 10 that has the failure, by which drive of the rotating electrical machine 80 can be controlled through the other inverter 10 that has no failure. A third operating point P3 is low in rotational speed compared to the original first operating point P1, but equal torque can be outputted, enabling continuation of traveling of the vehicle in a certain limited range.

Although here a detailed description is omitted, when an open-circuit failure is detected during powering, instead of moving the operating point to the regeneration side as described above, for example, the rotational speed may be reduced to the super low rotational speed by shutdown control, etc., to identify a location where the open-circuit failure has occurred. Details will be described later with reference to FIG. 34.

Meanwhile, as described above, in a case in which an open-circuit failure is detected during powering at the first operating point P1 outside the single inverter control region Rs, when the operating point is moved to the second operating point P2 on the regeneration side to reduce the rotational speed of the rotating electrical machine 80 by regenerative operation, if a failure location is on the lower-stage side, then the waveforms of three-phase alternating currents are in a distorted state. When the waveforms are distorted, harmonic content may appear, which may exhaust the direct-current power supplies 6, the direct-current link capacitors 4, etc., or affect other devices by electromagnetic noise, or cause audible noise. Hence, it is preferable to suppress distortion of current waveforms occurring upon regeneration.

Figure 21:
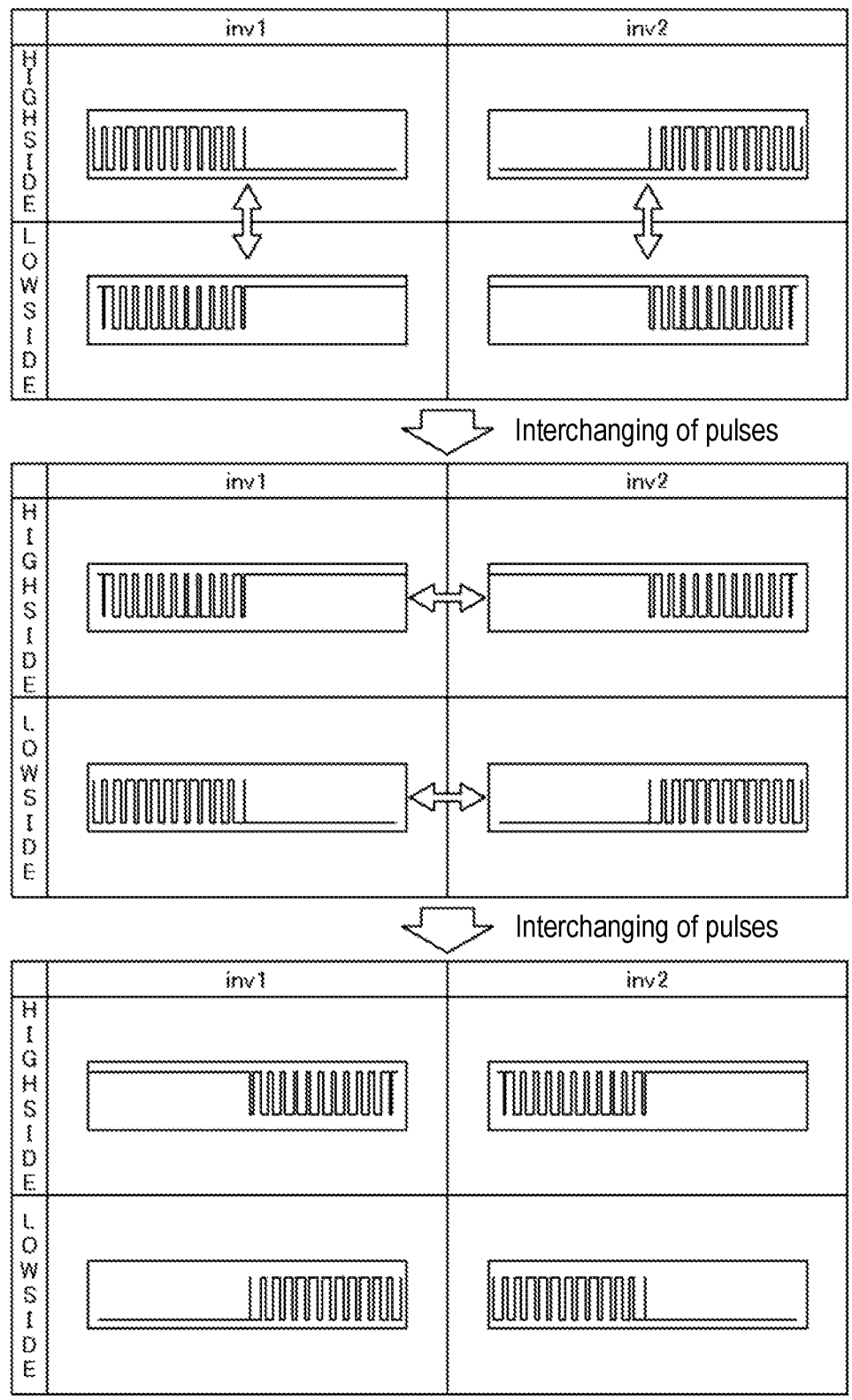
FIG. 21 is a diagram showing an example of regeneration failure action (interchanging of pulses) for eliminating distortion of waveforms of three-phase currents occurring upon regeneration in a state in which an open-circuit failure has occurred on a lower-stage side.
Figure 22:
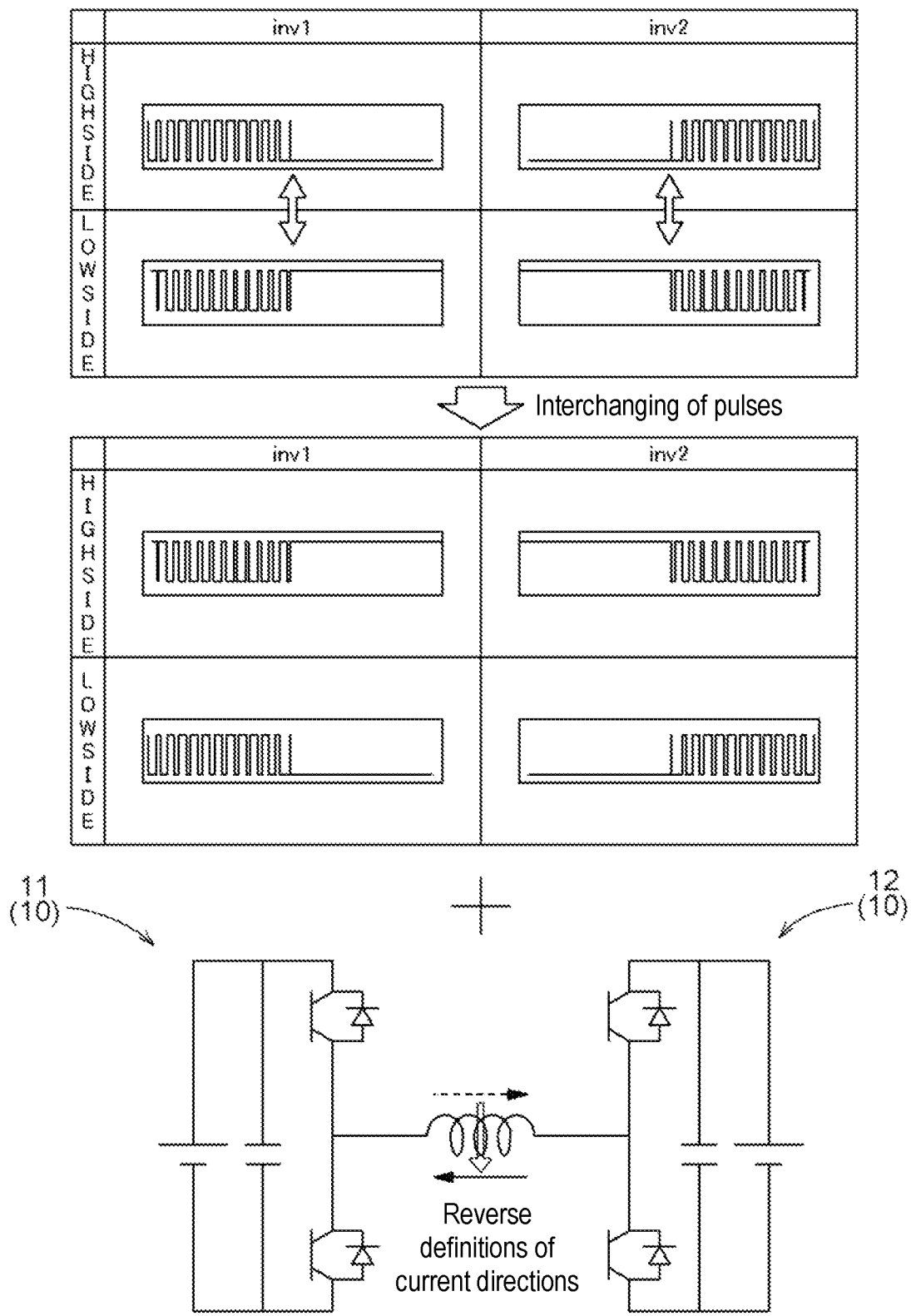
FIG. 22 is a diagram showing another example of regeneration failure action (interchanging of pulses and a reversal of definitions of alternating-current directions) for eliminating distortion of waveforms of three-phase currents occurring upon regeneration in a state in which an open-circuit failure has occurred on the lower-stage side.

As described above, when an open-circuit failure has occurred on the upper-stage side, there is almost no distortion in three-phase alternating currents upon regeneration. Hence, in the present embodiment, by changing switching patterns, distortion of three-phase alternating currents is eliminated. FIGS. 21 and 22 show switching control signals for eliminating distortion of waveforms of three-phase currents occurring upon regeneration in a state in which an open-circuit failure has occurred. FIG. 21 shows switching control signals for case 1 and FIG. 22 shows switching control signals for case 2.

In case 1, first, a switching control signal for the upper-stage side of the first inverter 11 and a switching control signal for the lower-stage side are interchanged, and a switching control signal for the upper-stage side of the second inverter 12 and a switching control signal for the lower-stage side are interchanged. Furthermore, the switching control signals for the first inverter 11 and the switching control signals for the second inverter 12 are interchanged. Namely, in case 1, a switching pattern for the upper-stage-side arms of the first inverter 11 and a switching pattern for the lower-stage-side arms of the second inverter 12 are interchanged, and a switching pattern for the lower-stage-side arms of the first inverter 11 and a switching pattern for the upper-stage-side arms of the second inverter 12 are interchanged.

In case 2, as with case 1, first, a switching control signal for the upper-stage side of the first inverter 11 and a switching control signal for the lower-stage side are interchanged. Then, the direction of current flowing through the stator coils 8 is reversed. For example, the three-to-two phase coordinate-transforming part 55 shown in FIG. 2 reverses the positive and negative polarities of three-phase currents. Namely, in case 2, a switching pattern for the upper-stage-side arms of the first inverter 11 and a switching pattern for the lower-stage-side arms are interchanged, and a switching pattern for the upper-stage-side arms of the second inverter 12 and a switching pattern for the lower-stage-side arms are interchanged, and furthermore, the positive and negative polarities of each of alternating currents of a plurality of phases (Iu, Iv, and Iw) are reversed.

Figure 23:
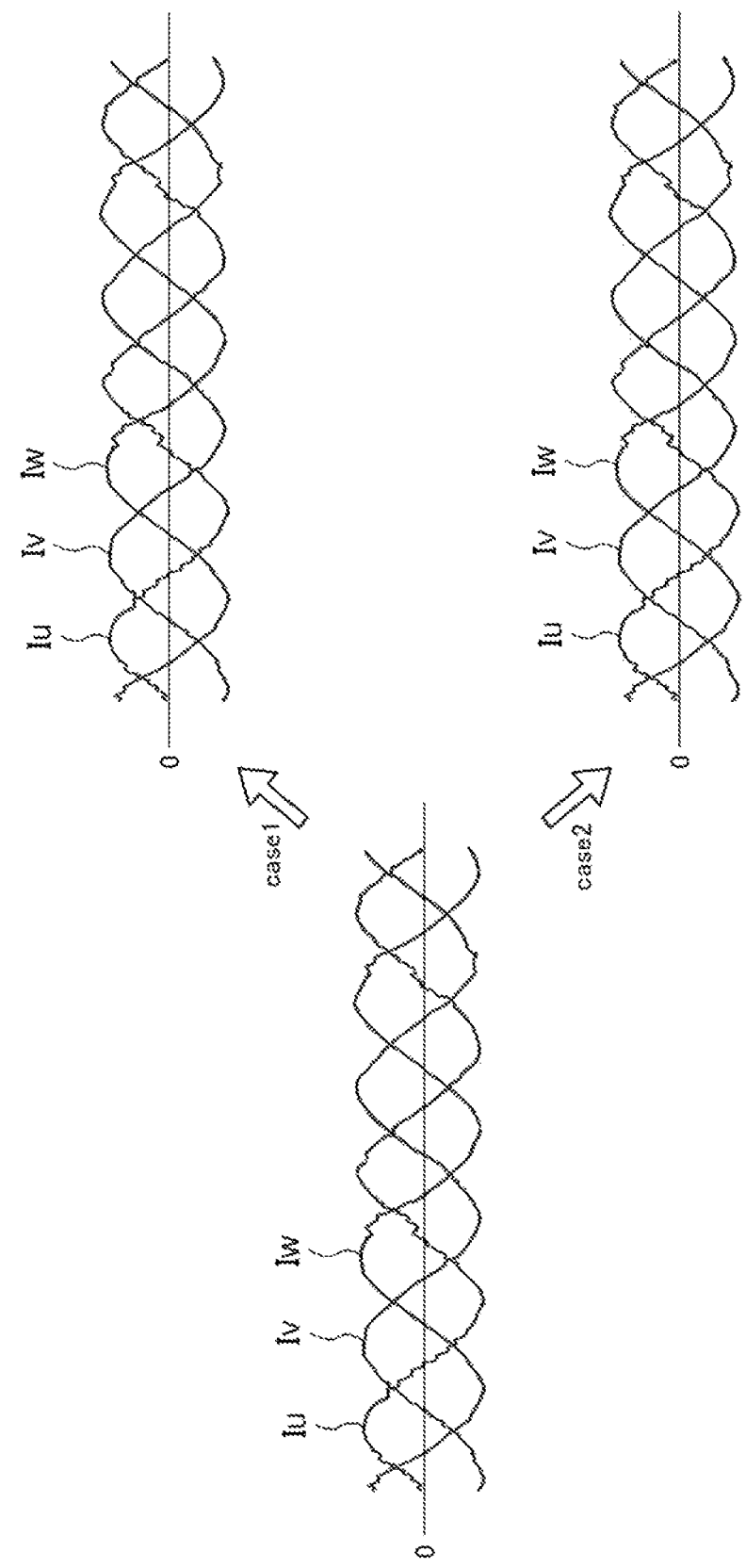
FIG. 23 is a diagram showing waveforms of three-phase currents whose distortion has been eliminated by switching control signals of FIGS. 21 and 22.

FIG. 23 shows waveforms of three-phase currents upon regeneration in a state in which an open-circuit failure has occurred on the upper-stage side (left), and waveforms of three-phase currents whose distortion is eliminated by switching control signals for case 1 and switching control signals for case 2 upon regeneration in a state in which an open-circuit failure has occurred on the lower-stage side (top and bottom on the right). As shown in FIG. 23, even if an open-circuit failure has occurred on the lower-stage side, as in a case in which an open-circuit failure has occurred on the upper-stage side, the waveforms of three-phase alternating currents have almost no distortion. As such, control for adjusting waveforms obtained upon regeneration is referred to as regeneration failure action.

Figure 24:
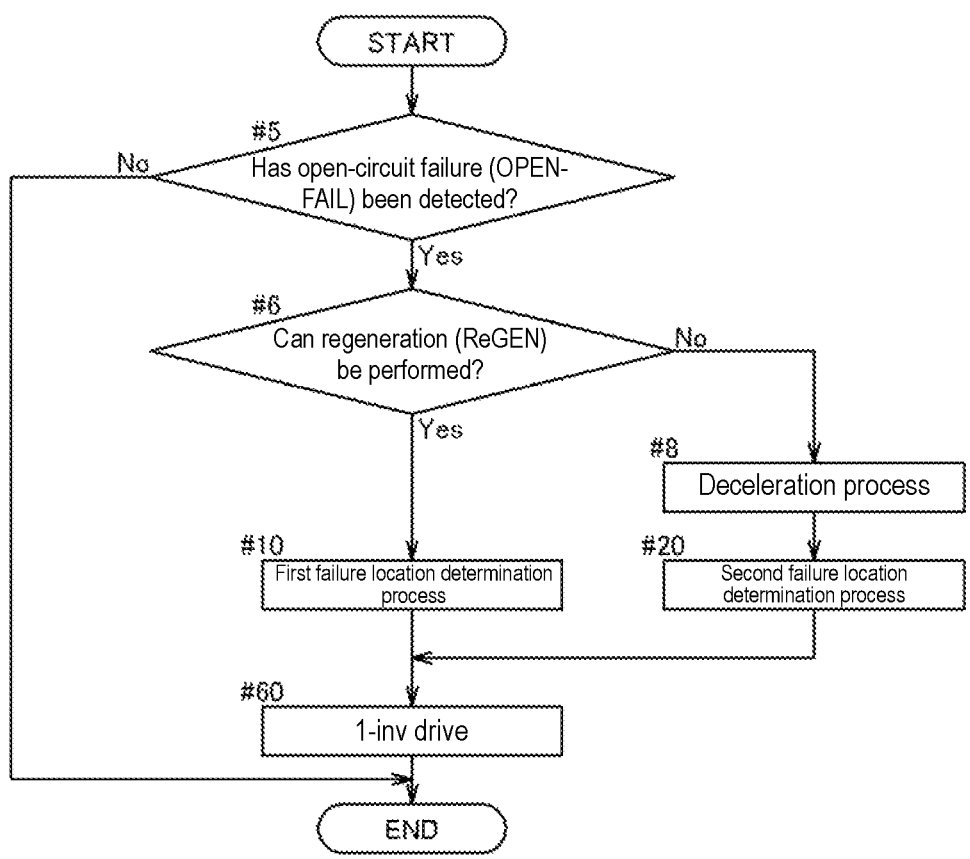
FIG. 24 is a flowchart showing an example of a schematic procedure for determining a location where an open-circuit failure has occurred.

FIG. 24 shows an example of a schematic procedure for determining a location where an open-circuit failure has occurred. When the rotating electrical machine control device 1 has detected occurrence of an open-circuit failure (OPEN-FAIL) (#5), the rotating electrical machine control device 1 determines whether the rotational speed of the rotating electrical machine 80 is a rotational speed at which regeneration (ReGEN) can be performed (#6). As described above, in the present embodiment, after identifying a location of an open-circuit failure, control of drive of the rotating electrical machine 80 is continued through one inverter 10 that has no failure. When regeneration is performed, the rotational speed of the rotating electrical machine 80 is reduced, and thus, when the rotational speed of the rotating electrical machine 80 is low, the rotating electrical machine 80 may decelerate to a speed at which the rotating electrical machine 80 stops.

Hence, the rotating electrical machine control device 1 determines, at step #6, whether the rotational speed of the rotating electrical machine 80 is a rotational speed at which regeneration can be performed, and if regeneration can be performed, then the rotating electrical machine control device 1 performs a first failure location determination process involving regeneration (#10). On the other hand, if regeneration cannot be performed, then the rotating electrical machine control device 1 performs a deceleration process (#8) in which the rotational speed of the rotating electrical machine 80 is decelerated to the above-described super low rotational speed, and then performs a second failure location determination process that does not involve regeneration (#20). Note that when the rotational speed of the rotating electrical machine 80 is already the super low rotational speed at the time of step #6, further deceleration is not required. As will be described later with reference to FIG. 34, the deceleration process at step #8 includes a rotational speed determination process (#81). Thus, the deceleration process at step #8 does not necessarily involve deceleration.

When a location of the open-circuit failure has been determined in the first failure location determination process (#10) or the second failure location determination process (#20), as described above, the rotating electrical machine control device 1 controls drive of the rotating electrical machine 80 through an inverter 10 that has no failure in the single inverter control region Rs (#60: 1-inv drive). Note that as will be described later with reference to FIGS. 32 and 35, a location of the open-circuit failure may be determined in a third failure location determination process (#30).

With reference to FIGS. 25 to 31, a principle of determining a location where an open-circuit failure has occurred, based on waveforms of three-phase currents will be described below, and with reference to flowcharts of FIGS. 32 to 35, a procedure for determining a location where an open-circuit failure has occurred will be described below.

As shown in FIGS. 11 to 14, 16, and 17, when an open-circuit failure has occurred, waveforms of three-phase alternating currents cause distortion and become asymmetrical. For example, when an open-circuit failure has occurred on the upper-stage side of the first inverter 11 (or the lower-stage side of the second inverter 12), as shown in FIG. 11, waveforms are such that a U-phase current Iu is biased toward the negative side and a V-phase current Iv and a W-phase current Iw are biased toward the positive side. Here, when the three-phase currents (the U-phase current Iu, the V-phase current Iv, and the W-phase current Iw) are added up over a predetermined period of time (e.g., 200 [ms]), as will be described later with reference to FIG. 25, etc., a U-phase integrated current $\Sigma Iu$, a V-phase integrated current $\Sigma Iv$, and a W-phase integrated current $\Sigma Iw$ can be obtained.

The U-phase integrated current $\Sigma Iu$, the V-phase integrated current $\Sigma Iv$, and the W-phase integrated current $\Sigma Iw$ remarkably show distortion of waveforms of three-phase alternating currents, and by using the waveforms, a location of an open-circuit failure can be determined. Note that upon adding up the currents, by starting the adding up from a peak value of each alternating current, integrated values are offset, enabling suppression of occurrence of errors.

Figure 25:
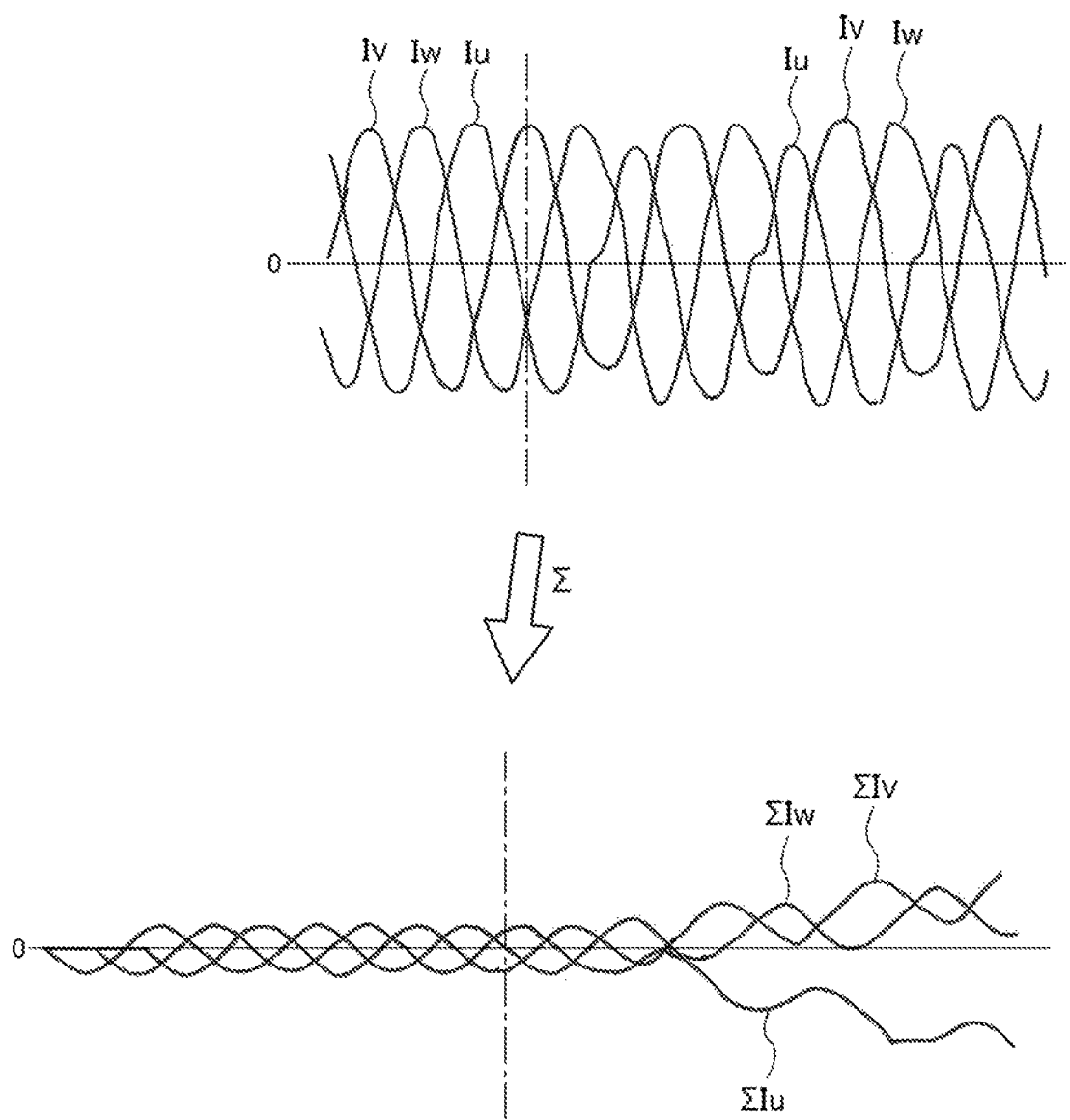
FIG. 25 is a diagram showing an example of waveforms of three-phase alternating currents and integrated currents with which a failure location can be determined.
Figure 26:
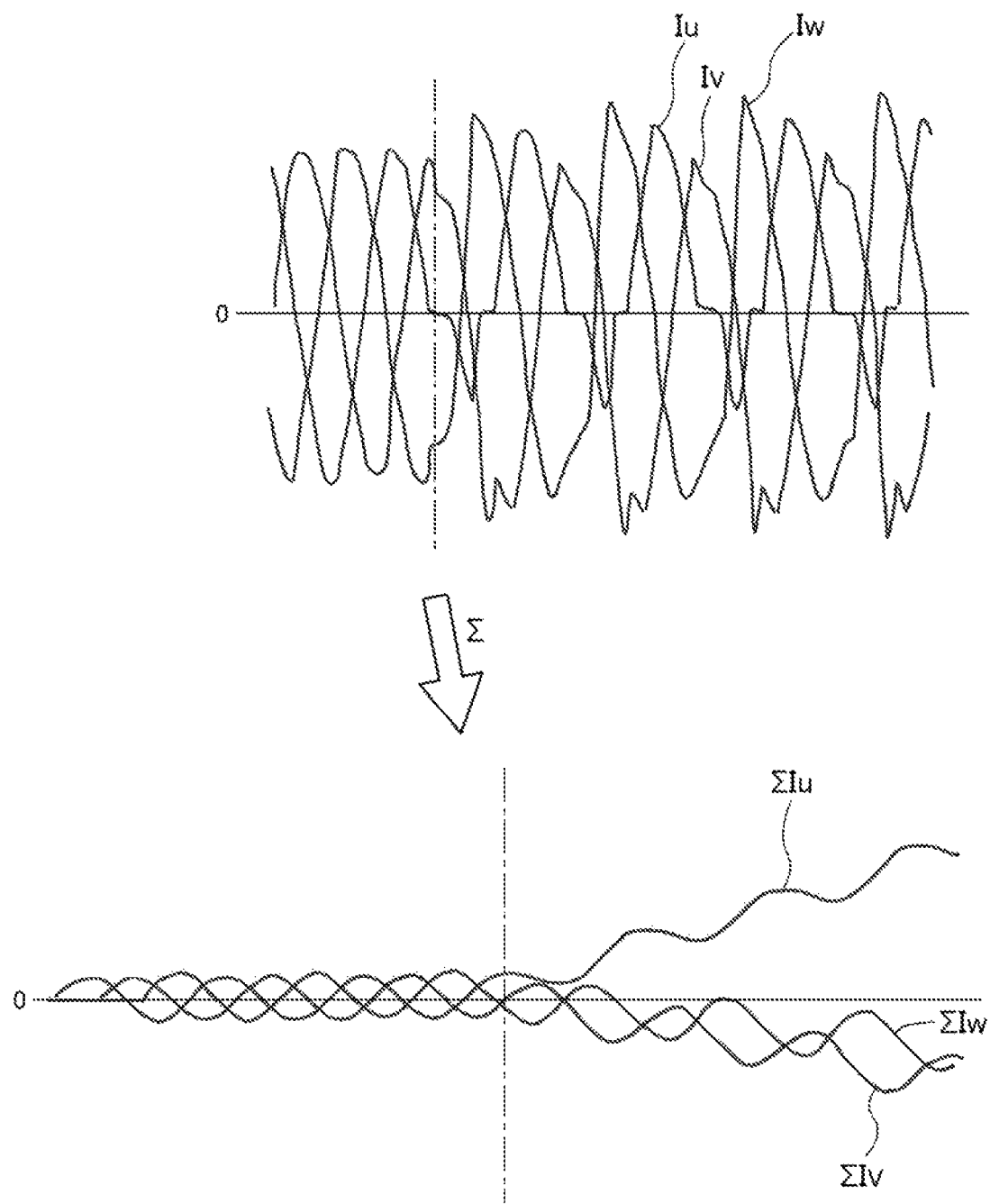
FIG. 26 is a diagram showing an example of waveforms of three-phase alternating currents and integrated currents with which a failure location can be determined.
Figure 27:
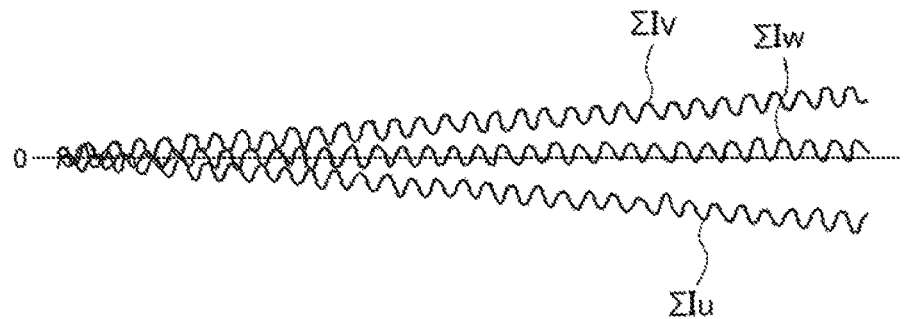
FIG. 27 is a diagram showing an example of waveforms of three-phase alternating currents and integrated currents with which it is difficult to determine a failure location.
Figure 28:
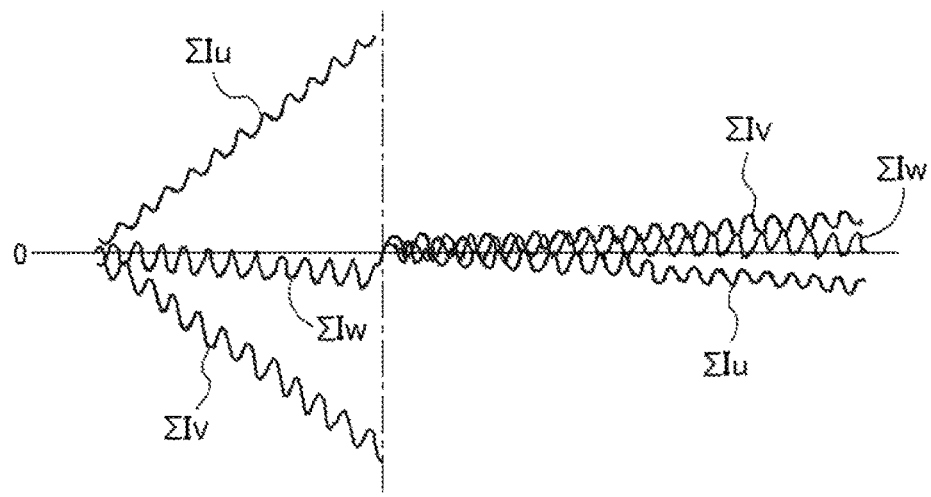
FIG. 28 is a diagram showing an example of integrated currents before elimination of distortion of alternating currents and integrated currents after elimination of the distortion.
Figure 29:
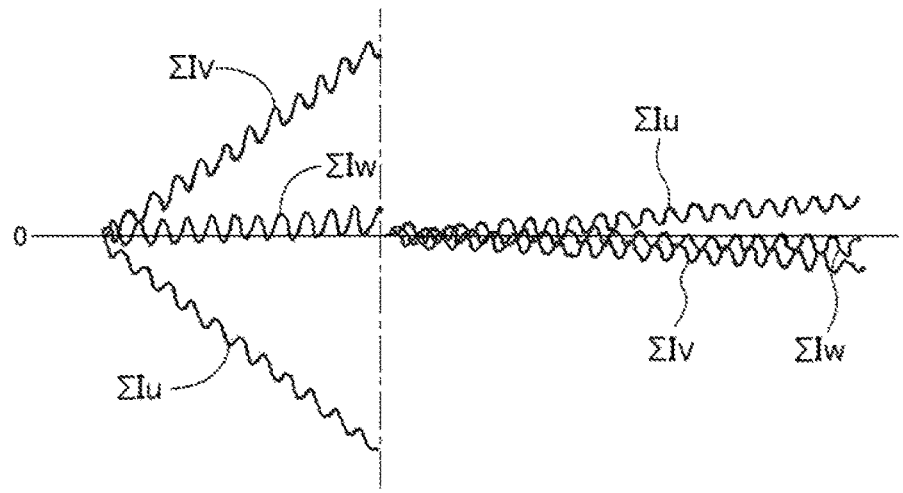
FIG. 29 is a diagram showing an example of integrated currents before elimination of distortion of alternating currents and integrated currents after elimination of the distortion.
Figure 30:
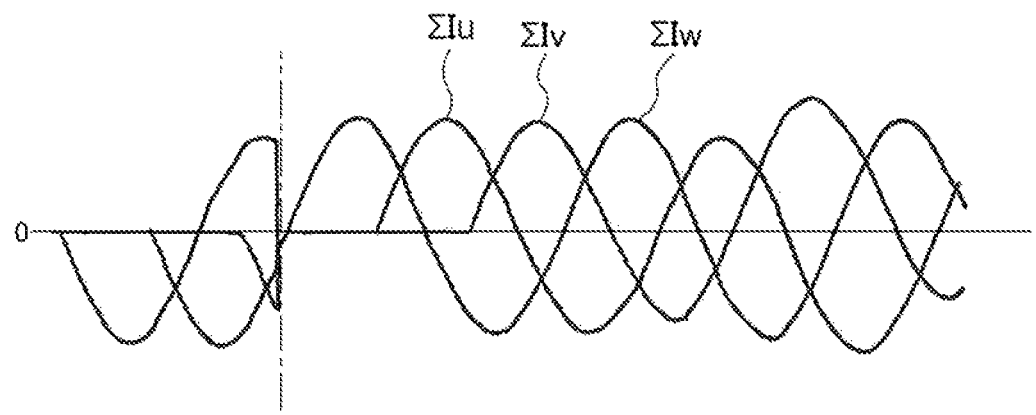
FIG. 30 is a diagram showing an example of integrated currents with which it is difficult to determine a failure location for a case in which an open-circuit failure has occurred upon powering at the super low rotational speed.
Figure 31:
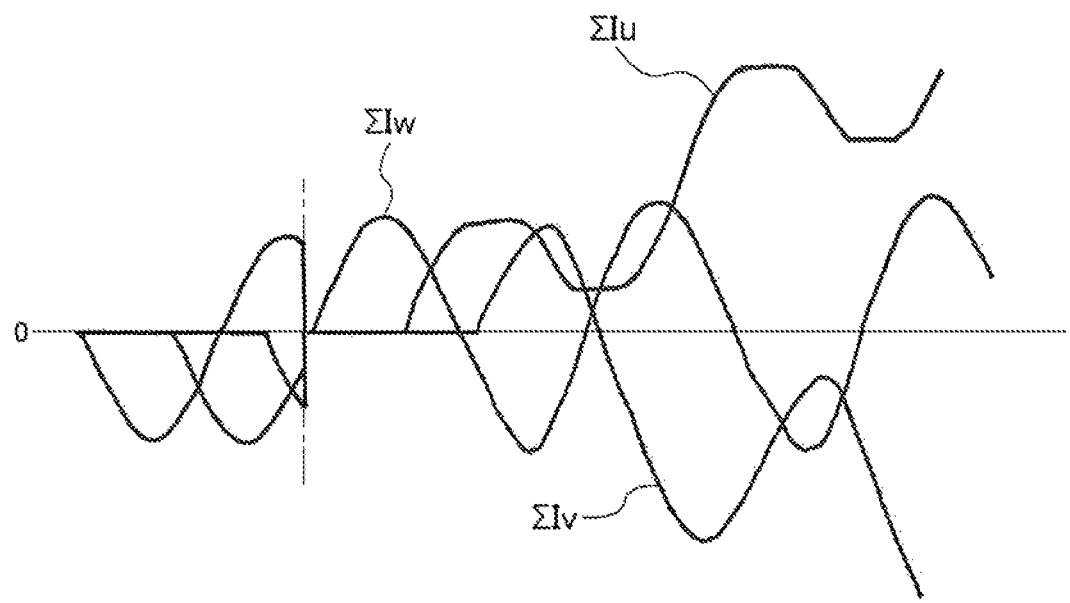
FIG. 31 is a diagram showing an example of integrated currents with which a failure location can be determined for a case in which an open-circuit failure has occurred upon powering at the super low rotational speed.

FIGS. 25 and 26 show examples of waveforms of three-phase alternating currents and integrated currents with which a location of an open-circuit failure can be determined, and FIG. 27 shows an example of waveforms of three-phase alternating currents and integrated currents with which it is difficult to determine a failure location. In addition, FIGS. 28 and 29 show integrated currents before elimination of distortion of alternating currents and integrated currents after elimination of the distortion upon regeneration, as described above. In addition, FIGS. 30 and 31 show examples of integrated currents for a case in which an open-circuit failure has occurred upon powering at the super low rotational speed. FIG. 30 shows an example of integrated currents with which it is difficult to determine a failure location, and FIG. 31 shows an example of integrated currents with which a failure location can be determined.

In addition, FIGS. 25, 27, and 30 show an example of a case in which the upper-stage-side switching element 3H of the U-phase in the first inverter 11 has an open-circuit failure, and FIGS. 26, 28, and 31 show an example of a case in which the lower-stage-side switching element 3L of the U-phase in the first inverter 11 has an open-circuit failure. In addition, FIG. 29 shows an example of a case in which the lower-stage-side switching element 3L of the U-phase in the second inverter 12 has an open-circuit failure. FIGS. 25, 26, 30, and 31 show waveforms upon powering, and FIGS. 27 to 29 show waveforms upon regeneration. Note that dash-dotted lines in FIGS. 25, 26, 30, and 31 represent a time at which an open-circuit failure has occurred, and dash-dotted lines in FIGS. 28 and 29 represent a time at which switching control signals are switched to eliminate distortion.

As shown in FIG. 25, when powering is performed by mixed pulse width modulation control in a state in which the upper-stage-side switching element 3H of the U-phase in the first inverter 11 has an open-circuit failure, waveforms of three-phase currents are asymmetrical and distorted. The waveforms are such that a U-phase current Iu is biased toward the negative side and a V-phase current Iv and a W-phase current Iw are biased toward the positive side. Here, the rotating electrical machine control device 1 adds up the three-phase currents (the U-phase current Iu, the V-phase current Iv, and the W-phase current Iw) over a predetermined period of time (e.g., 200 [ms]). As shown in FIG. 25, a U-phase integrated current ΣIu obtained by adding up the U-phase current Iu that is biased toward the negative side increases toward the negative side (the value decreases and the waveform drops). In addition, a V-phase integrated current ΣIv and a W-phase integrated current ΣIw that are obtained by adding up the V-phase current Iv and the W-phase current Iw that are biased toward the positive side increase toward the positive side (the waveforms rise).

The rotating electrical machine control device 1 sets a predefined integration threshold value for the positive side and the negative side, and when a current has exceeded the integration threshold value toward the positive side or the negative side, the rotating electrical machine control device 1 determines that an open-circuit failure has occurred, and can identify an open-circuit failure occurrence pattern. Here, a positive-side integration threshold value is "Ith+" and a negative-side integration threshold value is "Ith−". In a mode exemplified in FIG. 25, when the following condition holds true, it is determined that an open-circuit failure has occurred. This condition is a first pattern.

(ΣIu<Ith−)&&(ΣIv>Ith+)&&(ΣIw>Ith+)

Note that this condition also holds true when the lower-stage-side switching element 3L of the U-phase in the second inverter 12 has an open-circuit failure, in addition to when the upper-stage-side switching element 3H of the U-phase in the first inverter 11 has an open-circuit failure.

When, as shown in FIG. 26, powering is performed by mixed pulse width modulation control in a state in which the lower-stage-side switching element 3L of the U-phase in the first inverter 11 has an open-circuit failure, too, waveforms of three-phase currents are asymmetrical and distorted. The waveforms are such that a U-phase current Iu is biased toward the positive side and a V-phase current Iv and a W-phase current Iw are biased toward the negative side. As shown in FIG. 26, a U-phase integrated current Iu obtained by adding up the U-phase current Iu that is biased toward the positive side increases toward the positive side (the waveform rises). In addition, a V-phase integrated current ΣIv and a W-phase integrated current Iw that are obtained by adding up the V-phase current Iv and the W-phase current Iw that are biased toward the negative side increase toward the negative side (the values decrease and the waveforms drop). In a mode exemplified in FIG. 26, when the following condition holds true, it is determined that an open-circuit failure has occurred.

This condition is a second pattern.

(ΣIu>Ith+)&&(ΣIv<Ith−)&&(ΣIw<Ith−)

Note that this condition also holds true when the upper-stage-side switching element 3H of the U-phase in the second inverter 12 has an open-circuit failure, in addition to when the lower-stage-side switching element 3L of the U-phase in the first inverter 11 has an open-circuit failure.

As shown in the following table 3, there are six types of conditions, from the first pattern to a sixth pattern, that hold true when 12 switching elements 3 included in the first inverter 11 and the second inverter 12 have an open-circuit failure. In the following description, each switching element 3 is represented using identification symbols for three phases (U, V, and W), identification numbers for the first inverter 11 and the second inverter 12 (1 and 2), and identification symbols for an upper-stage-side switching element 3H and a lower-stage-side switching element 3L (H and L). For example, the upper-stage-side switching element 3H of the U-phase in the first inverter 11 is represented as "U1H", and the lower-stage-side switching element 3L of the W-phase in the second inverter 12 is represented as "W2L".

TABLE 3

| Pattern | Condition for determination | Failure location |
|---|---|---|
| 1 | (ΣIu < Ith−) && (ΣIv > Ith+) && (Σ Iw > Ith+) | U1H, U2L |
| 2 | (ΣIu > Ith+) && (ΣIv < Ith−) && (Σ Iw < Ith−) | U1L, U2H |
| 3 | (ΣIu > Ith+) && (ΣIv < Ith−) && (Σ Iw > Ith+) | V1H, V2L |
| 4 | (ΣIu < Ith−) && (ΣIv > Ith+) && (Σ Iw < Ith−) | V1L, V2H |
| 5 | (ΣIu > Ith+) && (ΣIv > Ith+) && (Σ Iw < Ith−) | W1H, W2L |
| 6 | (ΣIu < Ith−) && (ΣIv < Ith−) && (Σ Iw > Ith+) | W1L, W2H |

FIG. 27 shows integrated currents for a case in which regeneration is performed by mixed pulse width modulation control in a state in which the upper-stage-side switching element 3H of the U-phase in the first inverter 11 has an open-circuit failure. As shown in FIG. 14, etc., the waveforms of three-phase alternating currents have only a slight distortion. A U-phase current Iu is slightly biased toward the negative side and a V-phase current Iv is slightly biased toward the positive side, whereas a W-phase current Iw is not biased almost at all. Hence, as shown in FIG. 27, a U-phase integrated current ΣIu shows a tendency to increase toward the negative side (the value decreases and the waveform drops) and a V-phase integrated current ΣIv shows a tendency to increase toward the positive side (the waveform rises), whereas a W-phase integrated current ΣIw has almost no increase or decrease toward both the positive side and the negative side. Thus, even if time has passed, the W-phase integrated current ΣIw does not satisfy any of the conditions of patterns 1 to 6 shown in table 3, and does not satisfy a condition for detection of an open-circuit failure. Thus, when the upper-stage-side switching element 3H has an open-circuit failure, upon regeneration, an abnormality is not detected (see FIG. 15, etc.).

FIG. 28 shows integrated currents for a case in which regeneration is performed by mixed pulse width modulation control in a state in which the lower-stage-side switching element 3L of the U-phase in the first inverter 11 has an open-circuit failure. As shown in FIGS. 13 and 14, waveforms are such that a U-phase current Iu is biased toward the positive side and a V-phase current Iv and a W-phase current Iw are biased toward the negative side. As shown in FIG. 28, a U-phase integrated current ΣIu obtained by adding up the U-phase current Iu that is biased toward the positive side increases toward the positive side (the waveform rises). In addition, a V-phase integrated current ΣIv and a W-phase integrated current $\Sigma Iw$ that are obtained by adding up the V-phase current Iv and the W-phase current Iw that are biased toward the negative side increase toward the negative side (the values decrease and the waveforms drop). As with the second pattern used upon powering, the following holds true and it is determined that an open-circuit failure has occurred.

$$(\Sigma Iu > Ith+) \&\& (\Sigma Iv < Ith-) \&\& (\Sigma Iw < Ith-)$$

Thereafter, as described above with reference to FIGS. 21 and 22, when regeneration failure action is performed by interchanging switching control signals to eliminate distortion, a state becomes equivalent to a state in which the upper-stage-side switching element 3H of the U-phase in the first inverter 11 has an open-circuit failure upon regeneration (the same trends as those of FIG. 27 are shown.). Hence, the increases of the integrated currents toward the positive side and the negative side are also eliminated.

FIG. 29 shows integrated currents for a case in which regeneration is performed by mixed pulse width modulation control in a state in which the lower-stage-side switching element 3L of the U-phase in the second inverter 12 has an open-circuit failure. As shown in FIGS. 13 and 14, waveforms are such that a U-phase current Iu is biased toward the negative side and a V-phase current Iv and a W-phase current Iw are biased toward the positive side. As shown in FIG. 29, a U-phase integrated current $\Sigma Iu$ obtained by adding up the U-phase current Iu that is biased toward the negative side increases toward the negative side (the value decreases and the waveform drops). In addition, a V-phase integrated current $\Sigma Iv$ and a W-phase integrated current $\Sigma Iw$ that are obtained by adding up the V-phase current Iv and the W-phase current Iw that are biased toward the positive side increase toward the positive side (the waveforms rise). Thus, as with the first pattern used upon powering, the following holds true and it is determined that an open-circuit failure has occurred.

$$(\Sigma Iu < Ith-) \&\& (\Sigma Iv > Ith+) \&\& (\Sigma Iw > Ith+)$$

Thereafter, as described above with reference to FIGS. 21 and 22, when regeneration failure action is performed by interchanging switching control signals to eliminate distortion, a state becomes equivalent to a state in which the upper-stage-side switching element 3H of the U-phase in the second inverter 12 has an open-circuit failure upon regeneration. Hence, the increases of the integrated currents toward the positive side and the negative side are also eliminated.

As shown in the following table 4, there are six types of conditions, from a first pattern to a sixth pattern, that hold true when six switching elements 3 on the lower-stage sides of the first inverter 11 and the second inverter 12 have an open-circuit failure upon regeneration. Each pattern number and each logical expression are the same as those in table 3.

TABLE 4

| Pattern | Condition for determination | Failure location |
|---|---|---|
| 1 | ($\Sigma$Iu < Ith−) && ($\Sigma$Iv > Ith+) && ($\Sigma$ Iw > Ith+) | U2L |
| 2 | ($\Sigma$Iu > Ith+) && ($\Sigma$Iv < Ith−) && ($\Sigma$ Iw < Ith−) | U1L |
| 3 | ($\Sigma$Iu > Ith+) && ($\Sigma$Iv < Ith−) && ($\Sigma$ Iw > Ith+) | V2L |
| 4 | ($\Sigma$Iu < Ith−) && ($\Sigma$Iv > Ith+) && ($\Sigma$ Iw < Ith−) | V1L |
| 5 | ($\Sigma$Iu > Ith+) && ($\Sigma$Iv > Ith+) && ($\Sigma$ Iw < Ith−) | W2L |
| 6 | ($\Sigma$Iu < Ith−) && ($\Sigma$Iv < Ith−) && ($\Sigma$ Iw > Ith+) | W1L |

By combining tables 3 and 4 together, as shown in the following table 5, which one of the 12 switching elements has an open-circuit failure can be identified.

TABLE 5

| Powering | Regeneration | Failure location |
|---|---|---|
| Condition of pattern 1 holds true | Condition does not hold true | U1H |
| | Condition of pattern 1 holds true | U2L |
| Condition of pattern 2 holds true | Condition does not hold true | U2H |
| | Condition of pattern 2 holds true | U1L |
| Condition of pattern 3 holds true | Condition does not hold true | V1H |
| | Condition of pattern 3 holds true | V2L |
| Condition of pattern 4 holds true | Condition does not hold true | V2H |
| | Condition of pattern 4 holds true | V1L |
| Condition of pattern 5 holds true | Condition does not hold true | W1H |
| | Condition of pattern 5 holds true | W2L |
| Condition of pattern 6 holds true | Condition does not hold true | W2H |
| | Condition of pattern 6 holds true | W1L |

FIG. 30 shows integrated currents for a case in which powering is performed at the super low rotational speed by mixed pulse width modulation control in a state in which the upper-stage-side switching element 3H of the U-phase in the first inverter 11 has an open-circuit failure. As shown in FIGS. 16 and 17, there is almost no distortion in waveforms of three-phase alternating currents. Hence, as shown in FIG. 30, a U-phase integrated current $\Sigma Iu$, a V-phase integrated current $\Sigma Iv$, and a W-phase integrated current $\Sigma Iw$ have almost no increase or decrease toward both the positive side and the negative side. Thus, even if time has passed, the W-phase integrated current $\Sigma Iw$ does not satisfy any of the conditions of patterns 1 to 6 shown in tables 3 and 4, and does not satisfy a condition for detection of an open-circuit failure.

FIG. 31 shows integrated currents for a case in which powering is performed at the super low rotational speed by mixed pulse width modulation control in a state in which the lower-stage-side switching element 3L of the U-phase in the first inverter 11 has an open-circuit failure. As shown in FIGS. 16 and 17, waveforms of three-phase currents are asymmetrical and distorted. The waveforms are such that a U-phase current Iu is biased toward the positive side and a V-phase current Iv and a W-phase current Iw are biased toward the negative side. As shown in FIG. 31, a U-phase integrated current $\Sigma Iu$ obtained by adding up the U-phase current Iu that is biased toward the positive side increases toward the positive side (the waveform rises). In addition, a V-phase integrated current $\Sigma Iv$ and a W-phase integrated current $\Sigma Iw$ that are obtained by adding up the V-phase current Iv and the W-phase current Iw that are biased toward the negative side increase toward the negative side (the values decrease and the waveforms drop). In a mode exemplified in FIG. 31, when the following condition holds true, it is determined that an open-circuit failure has occurred. This condition is the same as the second pattern in tables 3 and 4.

$$(\Sigma Iu > Ith+) \&\& (\Sigma Iv < Ith-) \&\& (\Sigma Iw < Ith-)$$

As shown in the following table 6, there are six types of conditions, from a first pattern to a sixth pattern, that hold true when six switching elements 3 on the lower-stage sides of the first inverter 11 and the second inverter 12 have an open-circuit failure upon powering at the super low rotational speed. Each pattern number and each logical expression are the same as those in tables 3 and 4, and table 6 is the same as table 4.

TABLE 6

| Pattern | Condition for determination | Failure location |
|---|---|---|
| 1 | ($\Sigma$Iu < Ith−) && ($\Sigma$Iv > Ith+) && ($\Sigma$ Iw > Ith+) | U2L |
| 2 | ($\Sigma$Iu > Ith+) && ($\Sigma$Iv < Ith−) && ($\Sigma$ Iw < Ith−) | U1L |
| 3 | ($\Sigma$Iu > Ith+) && ($\Sigma$Iv < Ith−) && ($\Sigma$ Iw > Ith+) | V2L |
| 4 | ($\Sigma$Iu < Ith−) && ($\Sigma$Iv > Ith+) && ($\Sigma$ Iw < Ith−) | V1L |
| 5 | ($\Sigma$Iu > Ith+) && ($\Sigma$Iv > Ith+) && ($\Sigma$ Iw < Ith−) | W2L |
| 6 | ($\Sigma$Iu < Ith−) && ($\Sigma$Iv < Ith−) && ($\Sigma$ Iw > Ith+) | W1L |

By combining tables 3 and 6 together, as shown in the following table 7, which one of the 12 switching elements has an open-circuit failure can be identified, which is the same as in table 5.

TABLE 7

| Powering | Regeneration | Failure location |
|---|---|---|
| Condition of pattern 1 holds true | Condition does not hold true | U1H |
| | Condition of pattern 1 holds true | U2L |
| Condition of pattern 2 holds true | Condition does not hold true | U2H |
| | Condition of pattern 2 holds true | U1L |
| Condition of pattern 3 holds true | Condition does not hold true | V1H |
| | Condition of pattern 3 holds true | V2L |
| Condition of pattern 4 holds true | Condition does not hold true | V2H |
| | Condition of pattern 4 holds true | V1L |
| Condition of pattern 5 holds true | Condition does not hold true | W1H |
| | Condition of pattern 5 holds true | W2L |
| Condition of pattern 6 holds true | Condition does not hold true | W2H |
| | Condition of pattern 6 holds true | W1L |

Figure 32:
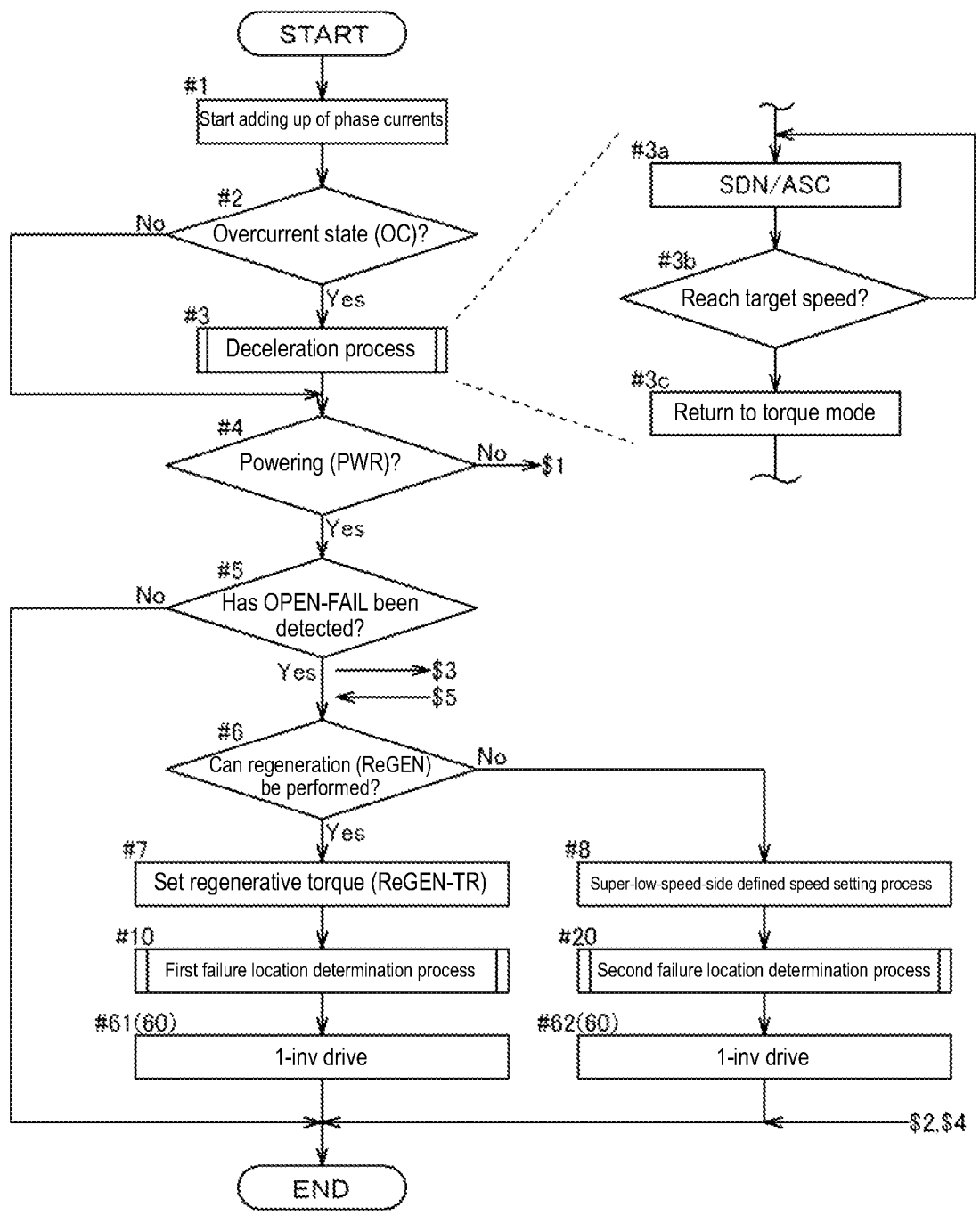
FIG. 32 is a flowchart showing an example of a procedure for determining a location where an open-circuit failure has occurred.
Figure 33:
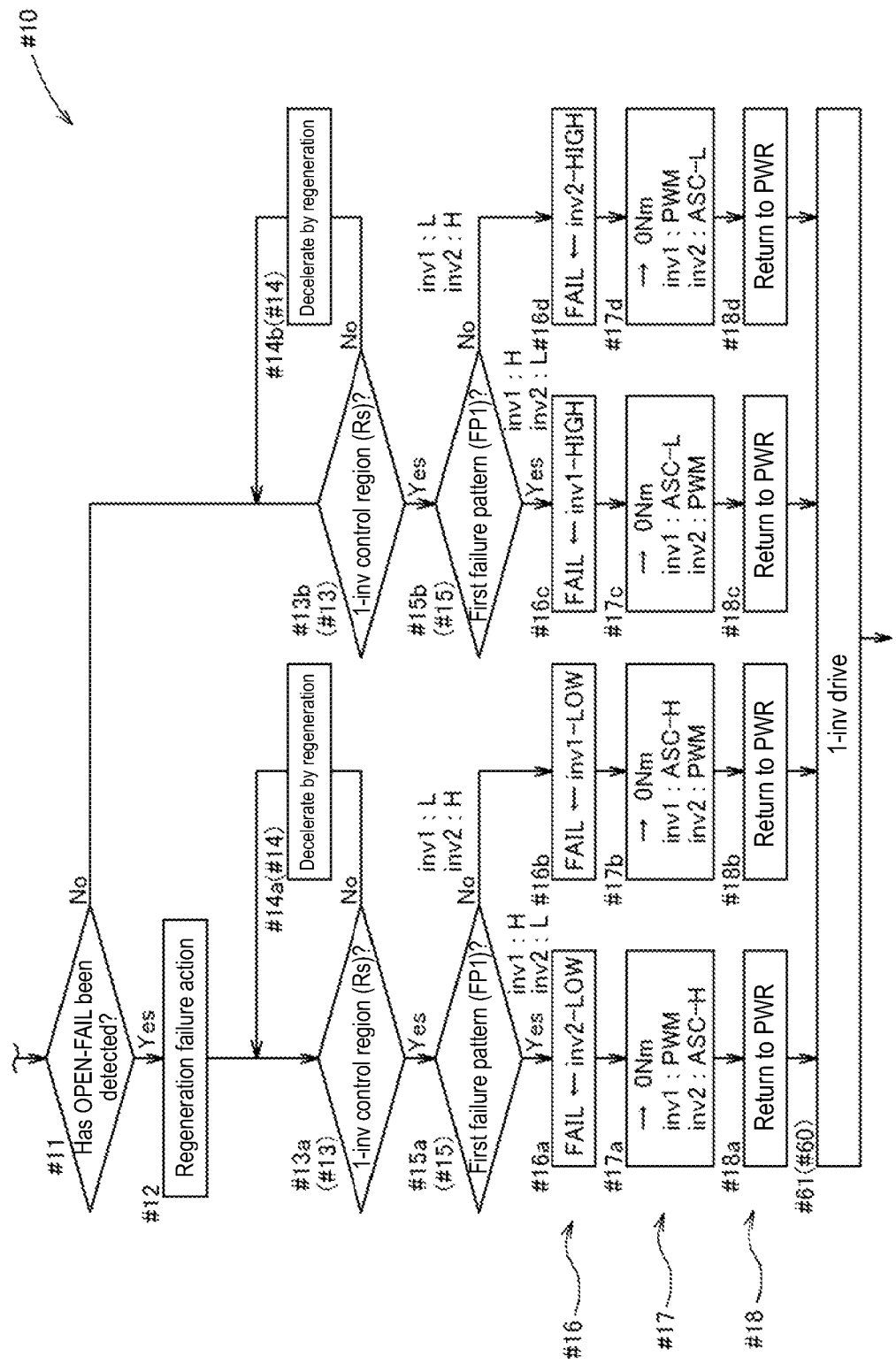
FIG. 33 is a flowchart showing an example of a procedure for a first failure location determination process.
Figure 34:
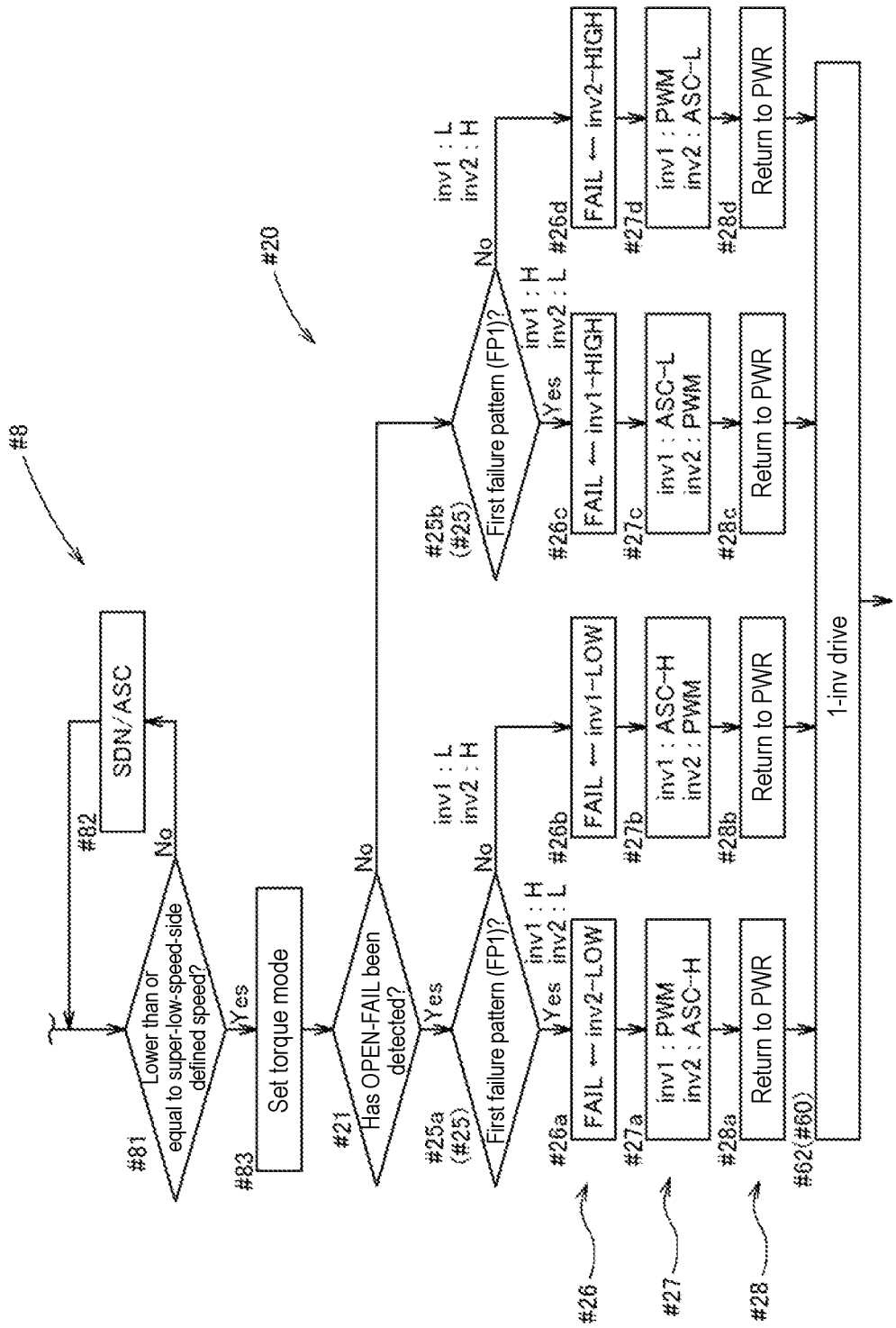
FIG. 34 is a flowchart showing an example of a procedure for a second failure location determination process.
Figure 35:
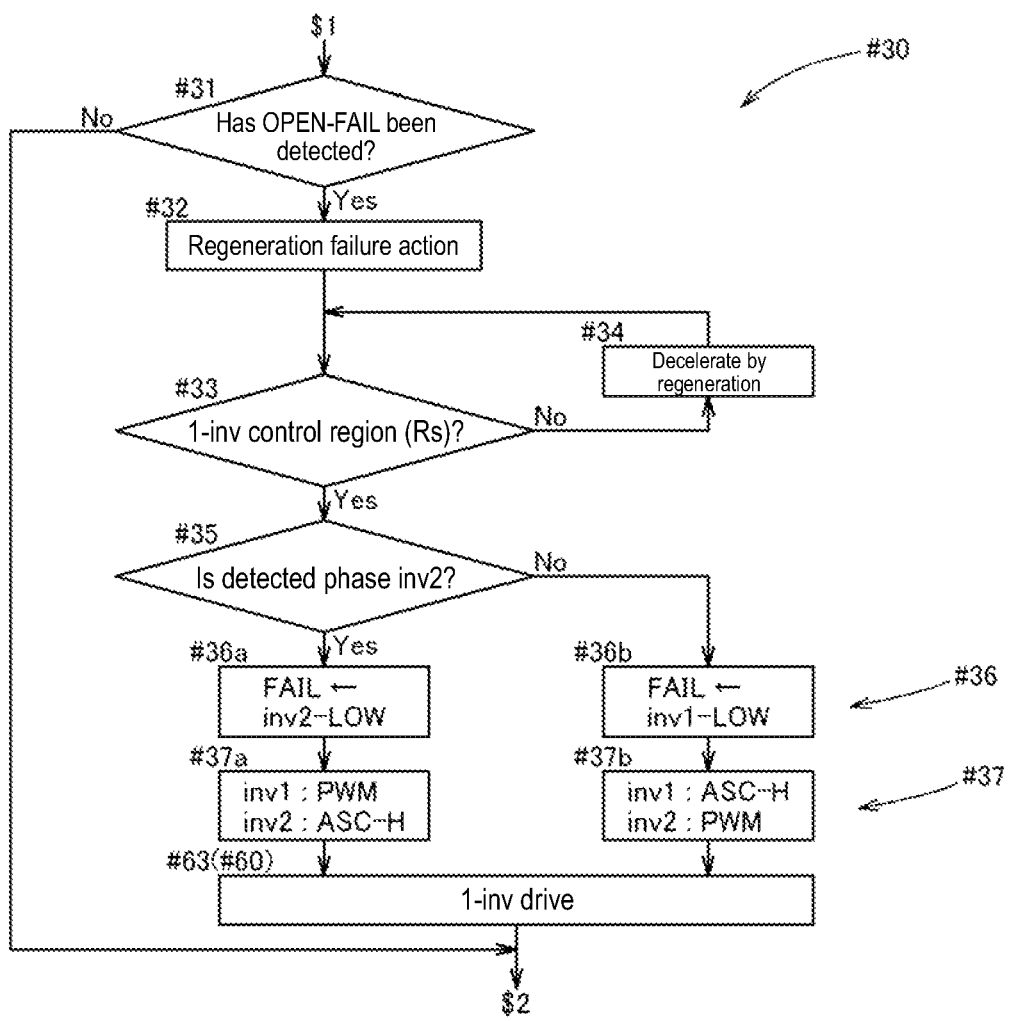
FIG. 35 is a flowchart showing an example of a procedure for a third failure location determination process.

With also reference to flowcharts of FIGS. 32 to 35, a procedure for determining failure-side arms will be described below. FIG. 32 shows an example of an overall procedure for determining failure-side arms. FIG. 33 shows an example of a procedure for a first failure location determination process (#10), FIG. 34 shows an example of a procedure for a second failure location determination process (#20), and FIG. 35 shows an example of a procedure for a third failure location determination process (#30).

As described above, for detection of an open-circuit failure and determination of failure-side arms, there is a need to determine integrated currents which are integrated values of alternating currents. Hence, adding up of alternating currents (phase currents) starts (#1). As described above, for example, alternating currents (Iu, Iv, and Iw) for 200 [ms] are added up, by which integrated currents ($\Sigma$Iu, $\Sigma$Iv, and $\Sigma$Iw) are computed.

At subsequent step #2, it is determined whether it is an overcurrent state (OC). According to experiments and simulations performed by the inventors, it has been confirmed that when an open-circuit failure has occurred in an operating region in which the rotating electrical machine 80 has large output torque and also has a high rotational speed like, for example, a high output region Roc shown in FIG. 19, the instantaneous values of three-phase alternating currents become very large. In such a case, an overcurrent detection sensor (not shown) provided in the inverters 10 or the rotating electrical machine 80 detects the fact that it is an overcurrent state, and transmits a result of the detection to the rotating electrical machine control device 1. Handling of an overcurrent has high priority and thus the rotating electrical machine control device 1 limits other control and prioritizes control for eliminating an overcurrent state. Here, the rotating electrical machine control device 1 reduces the rotational speed of the rotating electrical machine 80 (#3: deceleration process) by performing shutdown control (SDN) or active short-circuit control (ASC) (#3a). When the rotational speed reaches a target speed (e.g., a rotational speed at which the operating point is outside the high output region Roc), the rotating electrical machine control device 1 returns to normal control (torque control) (#3b and #3c).

Then, it is determined whether the operating state of the rotating electrical machine 80 is powering (PWR) or regeneration (ReGEN) (#4). If the operating state is regeneration, then processing goes through $1 and then, as will be described later with reference to FIG. 35, a third failure location determination process (#30) is performed. If the rotating electrical machine 80 is performing powering, then it is determined whether an open-circuit failure (OPEN-FAIL) has been detected (#5). Here, it is determined whether any one of the six patterns of conditions for determination shown in table 3 is satisfied, and when any one of the conditions is satisfied, it is detected that an open-circuit failure has occurred. Note that the control state of the rotating electrical machine 80 upon performing step #5 corresponds to a first control state. In addition, here, description is made assuming that an open-circuit failure has been detected in the first control state at the first operating point P1 shown in FIG. 19. $3 and $5 will be described later with reference to FIGS. 40 and 41.

If it is determined that an open-circuit failure has occurred, then it is determined whether the rotating electrical machine 80 can perform regeneration (ReGEN) (#6). As described above, in the present embodiment having the two inverters 10, control is performed such that even when an open-circuit failure has occurred, control of the rotating electrical machine 80 is continued to continue traveling of the vehicle. When the rotating electrical machine 80 performs regeneration, the rotating electrical machine 80 decelerates, and thus, when the travel speed of the vehicle is low and the rotational speed of the rotating electrical machine 80 is also low, by regeneration, the rotating electrical machine 80 may stop and the vehicle may also stop. That is, it becomes difficult to continue traveling of the vehicle. At step #6, for example, it is determined whether the rotational speed of the rotating electrical machine 80 is higher than or equal to a first defined rotational speed which is defined in advance.

If the rotational speed of the rotating electrical machine 80 is higher than or equal to the first defined rotational speed, the rotating electrical machine control device 1 sets regenerative torque (ReGEN-TR) (#7) and performs a first failure location determination process (#10). By setting the regenerative torque, the operating point of the rotating electrical machine 80 moves from the first operating point P1 to the second operating point P2 shown in FIG. 19. After the rotating electrical machine control device 1 identifies a failure-side arm by performing the first failure location determination process (#10), the rotating electrical machine control device 1 performs single inverter drive control (1-inv drive) in which the rotating electrical machine 80 is driven by one inverter 10 (#61 (#60)).

If, at step #6, the rotational speed of the rotating electrical machine 80 is lower than the first defined rotational speed, then a second failure location determination process (#20) is performed. As described above with reference to FIGS. 16 to 18, 30, and 31 and tables 6 and 7, the second failure location determination process (#20) is a process involving powering at the super low rotational speed. Namely, the second failure location determination process (#20) is performed at a rotational speed lower than or equal to a second defined rotational speed which is lower than the first defined rotational speed. Hence, prior to the second failure location determination process (#20), a process of setting the rotational speed of the rotating electrical machine 80 to the second defined rotational speed (super-low-speed-side defined speed) is performed (#8). After the rotating electrical machine control device 1 identifies a failure-side arm by performing the second failure location determination process (#20), the rotating electrical machine control device 1 performs single inverter drive control (1-inv drive) in which the rotating electrical machine 80 is driven by one inverter 10 (#62 (#60)).

The first failure location determination process (#10) will be described below with reference to FIG. 33. In the first failure location determination process (#10), first, it is determined whether an open-circuit failure is detected in a regeneration state (second control state) (#11). Here, it is determined whether any one of the six patterns of conditions for determination shown in table 4 is satisfied, and when any one of the conditions is satisfied, it is detected that an open-circuit failure has occurred.

If it is determined, at step #11, that an open-circuit failure has occurred, then as described above with reference to FIGS. 21 to 23, regeneration failure action (#12) is performed to eliminate the distortion and bias of waveforms of alternating currents (Iu, Iv, and Iw) in regeneration. By normal regeneration or regeneration associated with regeneration failure action, the rotational speed of the rotating electrical machine 80 decreases, and the operating point moves into the single inverter control region Rs. At step #13a (#13) subsequent to step #12, it is determined whether the operating point of the rotating electrical machine 80 is in the single inverter control region Rs. If the operating point is not in the single inverter control region Rs, then deceleration by regeneration is continued until the operating point is determined to be in the single inverter control region Rs (#14a (#14)).

If the operating point has entered the single inverter control region Rs, then it is determined whether a failure pattern FP obtained when an open-circuit failure has been detected at step #5 is the first failure pattern FP1 (#15a (#15)). When the failure pattern FP is the first failure pattern FP1, the failure-side arms are the upper-stage-side arms of the first inverter 11 (inv1:H) or the lower-stage-side arms of the second inverter 12 (inv2:L). At step #11, an open-circuit failure is detected also in regeneration, and thus, the failure-side arms are the lower-stage-side arms of the second inverter 12 (inv2:L). Thus, at step #16a (#16), the lower-stage-side arms of the second inverter 12 (inv2-LOW) are set as a failure location (FAIL).

The rotating electrical machine control device 1 performs zero-newton control (0 Nm) in which control is performed such that output torque of the rotating electrical machine 80 is zero, and then moves the operating point to the third operating point P3, and controls the second inverter 12 having the open-circuit failure in its lower-stage-side arm by upper-stage-side active short-circuit control (ASC-H), and controls the first inverter 11 by pulse width modulation control (#17a (#17)). Then, the rotating electrical machine 80 returns to powering from regeneration (#18a (#18)), and single inverter drive control (1-inv drive) in which the rotating electrical machine 80 is driven by one inverter 10 is performed (#61 (#60)).

A transition path from step #15a (#15) to step #16b (#16), #17b (#17), #18b (#18), and #61 (#60) is also the same as above, and thus, a detailed description thereof is omitted. In addition, a transition path from step #11 to step #13b (#13), #14b (#14), #15b (#15), #16c (#16), #17c (#17), #18c (#18), and #61 (#60) and a transition path from step #15b (#15) to step #16d (#16), #17d (#17), #18d (#18), and #61 (#60) are also the same as above, and thus, a detailed description thereof is omitted.

Note that as described above with reference to FIGS. 21, 22, 28, and 29, etc., when regeneration failure action is performed, both distortion and bias of alternating currents (Iu, Iv, and Iw) are suppressed and bias of integrated currents (ΣIu, ΣIv, and ΣIw) is also reduced. Thus, conditions for determination upon regeneration that are described above with reference to table 4 do not hold true. Hence, it is preferable that integrated currents (ΣIu, ΣIv, and ΣIw) used for determination at step #15 and #16 have values obtained before performing regeneration failure action at step #12 (e.g., values obtained upon determination at step #11). Alternatively, it is preferred that the determination at step #15 and #16 be performed before regeneration failure action.

The second failure location determination process (#20) will be described below with reference to FIG. 34. As described above with reference to FIG. 32, prior to the second failure location determination process (#20), a super-low-speed-side defined speed setting process (#8) is performed in which the rotational speed of the rotating electrical machine 80 is set to the second defined rotational speed (super-low-speed-side defined speed). In the super-low-speed-side defined speed setting process, first, it is determined whether the rotational speed of the rotating electrical machine 80 is lower than or equal to the second defined rotational speed (super-low-speed-side defined speed) (#81). If the rotational speed is higher than the super-low-speed-side defined speed, then the rotating electrical machine control device 1 reduces the rotational speed of the rotating electrical machine 80 by shutdown control (SDN), active short-circuit control (ASC), or zero-newton control (0 Nm) (#82). If the rotational speed of the rotating electrical machine 80 is lower than or equal to the second defined rotational speed (super-low-speed-side defined speed), then the control mode of the rotating electrical machine 80 is set to torque mode (#83). Namely, when control for deceleration at step #82 is not performed, torque mode is continued, and when control for deceleration is performed, the mode returns to torque mode.

The rotating electrical machine control device 1 determines whether an open-circuit failure is detected in a state in which the rotating electrical machine 80 is performing powering at a rotational speed lower than or equal to the second defined rotational speed (super-low-speed-side defined speed) (powering at the super low rotational speed (second control state)) (#21). Here, it is determined whether any one of the six patterns of conditions for determination shown in table 6 is satisfied, and when any one of the conditions is satisfied, it is detected that an open-circuit failure has occurred.

If it is determined, at step #21, that an open-circuit failure has occurred, then it is determined whether a failure pattern FP obtained when an open-circuit failure has been detected at step #5 is the first failure pattern FP1 (#25a (#25)). When the failure pattern FP is the first failure pattern FP1, the failure-side arms are the upper-stage-side arms of the first inverter 11 (inv1:H) or the lower-stage-side arms of the second inverter 12 (inv2:L). At step #21, an open-circuit failure is detected also in powering at the super low rotation speed, and thus, the failure-side arms are the lower-stage-side arms of the second inverter 12 (inv2:L). Thus, at step #26a (#26), the lower-stage-side arms of the second inverter 12 (inv2-LOW) are set as a failure location (FAIL).

The rotating electrical machine control device 1 controls the second inverter 12 having the open-circuit failure in its lower-stage-side arm by upper-stage-side active short-circuit control (ASC-H), and controls the first inverter 11 by pulse width modulation control (#27a (#27)). Then, the rotating electrical machine 80 returns to normal powering from powering at the super low rotational speed (#28a (#28)), and single inverter drive control (1-inv drive) in which the rotating electrical machine 80 is driven by one inverter 10 is performed (#62 (#60)).

A transition path from step #25a (#25) to step #26b (#26), #27b (#27), #28b (#28), and #62 (#60) is also the same as above, and thus, a detailed description thereof is omitted. In addition, a transition path from step #21 to step #25b (#25), #26c (#26), #27c (#27), #28c (#28), and #62 (#60) and a transition path from step #25b (#25) to step #26d (#26), #27d (#27), #28d (#28), and #62 (#60) are also the same as above, and thus, a detailed description thereof is omitted.

With reference to FIG. 35, the third failure location determination process (#30) will be described below. As shown in FIG. 32, the third failure location determination process (#30) is performed branched off before the open-circuit failure determination process in the first control state at step #5. Since the third failure location determination process (#30) is performed during regeneration of the rotating electrical machine 80, the third failure location determination process (#30) corresponds to a failure determination process in the second control state. However, the third failure location determination process (#30) is performed independently of a failure determination process in the first control state. As described above, when switching is performed on the inverters 10 by mixed pulse width modulation control, even if an open-circuit failure has occurred in an upper-stage-side arm, distortion occurring in waveforms of alternating currents upon regeneration is small, and thus, it is difficult to detect occurrence of the open-circuit failure. Thus, in the third failure location determination process (#30), only when an open-circuit failure has occurred in a lower-stage-side arm, occurrence of the open-circuit failure is detected and a failed inverter 10 is determined. Note that when the operation state of the rotating electrical machine 80 transitions to powering, detection of an open-circuit failure in the first control state is possible. Thus, the third failure location determination process is performed during regeneration of the rotating electrical machine 80 to at least promptly detect occurrence of an open-circuit failure in a lower-stage-side arm and identify a failure location.

In the third failure location determination process (#30), first, it is determined whether an open-circuit failure is detected in a regeneration state (second control state) (#31). In the third failure location determination process, too, it is determined whether any one of the six patterns of conditions for determination shown in table 4 is satisfied, and when any one of the conditions is satisfied, it is detected that an open-circuit failure has occurred. Here, a lower-stage-side failure pattern LF is detected. As described above, when an open-circuit failure has occurred in an upper-stage-side arm, in the third failure location determination process (#30), neither detection of the failure nor determination of a failure location can be performed.

If it is determined, at step #31, that an open-circuit failure has occurred, as described above with reference to FIGS. 21 to 23, regeneration failure action (#32) is performed to eliminate the distortion and bias of waveforms of alternating currents (ΣIu, Iv, and Iw) in regeneration. By performing the regeneration failure action, the rotational speed of the rotating electrical machine 80 decreases, and the operating point moves into the single inverter control region Rs. At step #33 subsequent to step #32, it is determined whether the operating point of the rotating electrical machine 80 is in the single inverter control region Rs. If the operating point is not in the single inverter control region Rs, then deceleration by regeneration is continued until the operating point is determined to be in the single inverter control region Rs (#34).

If the operating point has entered the single inverter control region Rs, then it is determined which one of a set of lower-stage-side arms of the first inverter 11 and a set of lower-stage-side arms of the second inverter 12 has the open-circuit failure. Here, it is determined whether a detected phase of the open-circuit failure is of the second inverter 12 (#35). As described above with reference to table 4, the rotating electrical machine control device 1 can identify a switching element 3 having an open-circuit failure by determining which one of the six patterns of conditions for determination holds true. That is, whether the open-circuit failure has occurred in the first inverter 11 or the second inverter 12 is known.

When the open-circuit failure has occurred in the second inverter 12, at step #36a (#36), the lower-stage-side arms of the second inverter 12 (inv2-LOW) are set as a failure location (FAIL). In addition, when the open-circuit failure has occurred in the first inverter 11, at step #36b (#36), the lower-stage-side arms of the first inverter 11 (inv1-LOW) are set as a failure location (FAIL).

When the open-circuit failure has occurred in the second inverter 12, the rotating electrical machine control device 1 controls the second inverter 12 having the open-circuit failure in its lower-stage-side arm by upper-stage-side active short-circuit control (ASC-H), and controls the first inverter 11 by pulse width modulation control (#37a (#37)). Then, single inverter drive control (1-inv drive) in which the rotating electrical machine 80 is driven by one inverter 10 is performed (#63 (#60)). In addition, when the open-circuit failure has occurred in the first inverter 11, the rotating electrical machine control device 1 controls the first inverter 11 having the open-circuit failure in its lower-stage-side arm by upper-stage-side active short-circuit control (ASC-H), and controls the second inverter 12 by pulse width modulation control (#37b (#37)). Then, single inverter drive control (1-inv drive) in which the rotating electrical machine 80 is driven by one inverter 10 is performed (#63 (#60)).

Note that the control modes of the single inverter drive control (#60) are not limited only to continuous pulse width modulation control (CPWM) and discontinuous pulse width modulation control (DPWM), and rectangular-wave control (1-Pulse) may be used. They are exemplification, and any modulation mode may be used. Here, in mixed pulse width modulation control, switching control signals go into an inactive state during a second period H2, enabling a reduction in system loss. By setting different periods as second periods H2 for the first inverter 11 and the second inverter 12, a state in which switching is continuously performed as a whole using a plurality of pulses can be implemented. However, in single inverter drive control, switching is performed only on either one of the inverters 10, and thus, in mixed pulse width modulation control, there is a possibility that distortion may occur in waveforms of alternating currents. Thus, it is preferred that single inverter drive control be performed by pulse width modulation control in which a plurality of pulses with different patterns are outputted throughout one cycle of electrical angle, or by rectangular-wave control. However, it does not mean that mixed pulse width modulation control (MX-PWM) is excluded from being selected as a control mode.

In addition, as described above with reference to FIGS. 21, 22, 28, and 29, etc., when regeneration failure action is performed, both distortion and bias of alternating currents (Iu, Iv, and Iw) are suppressed and bias of integrated currents (fIu, ΣIv, and ΣIw) is also reduced. Thus, conditions for determination upon regeneration that are described above with reference to table 4 do not hold true. Hence, it is preferable that as with the first failure location determination process (#10), integrated currents (ΣIu, ΣIv, and ΣIw) used for determination at step #35 have values obtained before performing regeneration failure action at step #32 (e.g., values obtained upon determination at step #31). Alternatively, it is preferred that the determination at step #35 be performed before regeneration failure action.

As has been described above, when an open-circuit failure (one-phase open-circuit failure) in which one switching element 3 is always in an open-circuit state has occurred, the rotating electrical machine control device 1 adds up each of alternating currents of a plurality of phases (Iu, Iv, and Iw) to compute current integrated values for the respective phases (ΣIu, ΣIv, and ΣIw), and detects occurrence of the open-circuit failure based on the positive and negative polarities of each of the current integrated values (ΣIu, ΣIv, and ΣIw), and determines a location where the open-circuit failure has occurred. When switching control is performed on the first inverter 11 and the second inverter 12 by mixed pulse width modulation control, the rotating electrical machine control device 1 determines which one of the first failure pattern FP1 and the second failure pattern FP2 is a failure pattern FP, based on the positive and negative polarities of each of current integrated values (ΣIu, ΣIv, and ΣIw) in the first control state (powering). In addition, the rotating electrical machine control device 1 determines which one of the first lower-stage-side failure pattern LF1 and the second lower-stage-side failure pattern LF2 is a lower-stage-side failure pattern LF, based on each of current integrated values (ΣIu, ΣIv, and ΣIw) in the second control state (regeneration/powering at the super low rotational speed) which differs from the first control state (powering). Then, the rotating electrical machine control device 1 determines which one of a set of the upper-stage-side arms of the first inverter 11, a set of the lower-stage-side arms of the first inverter 11, a set of the upper-stage-side arms of the second inverter 12, and a set of the lower-stage-side arms of the second inverter 12 is failure-side arms, based on a result of the determination in the first control state and a result of the determination in the second control state.

Note that in the above description, with reference to FIG. 32, etc., a mode is exemplified in which after performing determination in the first control state, determination in the second control state is performed. However, the order of the first control state and the second control state may be reversed. In addition, the determination based on a result of the determination in the first control state and a result of the determination in the second control state also includes, for example, a case in which there is no result of the determination in the first control state. When there is no result of the determination in the first control state and the lower-stage-side failure pattern LF is determined in the second control state, by the first lower-stage-side failure pattern LF1, the lower-stage-side arms of the second inverter 12 are identified as failure-side arms, and by the second lower-stage-side failure pattern LF2, the lower-stage-side arms of the first inverter 11 are identified as failure-side arms. A case in which there are both of a result of the determination in the first control state and a result of the determination in the second control state is as described above with reference to FIG. 15.

Note that when an open-circuit failure has occurred in upper-stage-side arms and there is no first control state, failure-side arms having the open-circuit failure are not identified. However, in this case, the rotating electrical machine 80 is performing regeneration, and even if an open-circuit failure has occurred in upper-stage-side arms upon regeneration, distortion does not occur in alternating currents (Iu, Iv, and Iw). Thus, since there is almost no influence, even if an open-circuit failure is not detected, there is no problem. When the rotating electrical machine 80 performs powering thereafter, an open-circuit failure is detected. At this time, as a result of determination in the first control state, it is determined that a failure pattern is the first failure pattern FP1 or the second failure pattern FP2. Upon regeneration before powering, a result of determination in the second control state (no lower-stage-side failure pattern LF) is already obtained, and thus, the rotating electrical machine control device 1 can identify failure-side arms based on a result of determination in the first control state and the result of determination in the second control state. As a matter of course, after detecting an open-circuit failure in powering, regeneration or powering at the super low rotational speed may be further performed to obtain a result of determination in the second control state again, and then failure-side arms may be identified based on a result of determination in the first control state and the result of determination in the second control state.

Meanwhile, as described above, the rotating electrical machine control device 1 has the loss reduction priority mode and the noise reduction priority mode as control modes of the rotating electrical machine 80. As described above with reference to table 2, in the noise reduction priority mode, both of the first inverter 11 and the second inverter 12 are driven by general pulse width modulation control instead of mixed pulse width modulation control. The behavior of three-phase alternating currents for a case in which an open-circuit failure has occurred when both of the first inverter 11 and the second inverter 12 are driven in the noise reduction priority mode differs from behavior described above with reference to FIGS. 11 to 14, etc.

Figure 36:
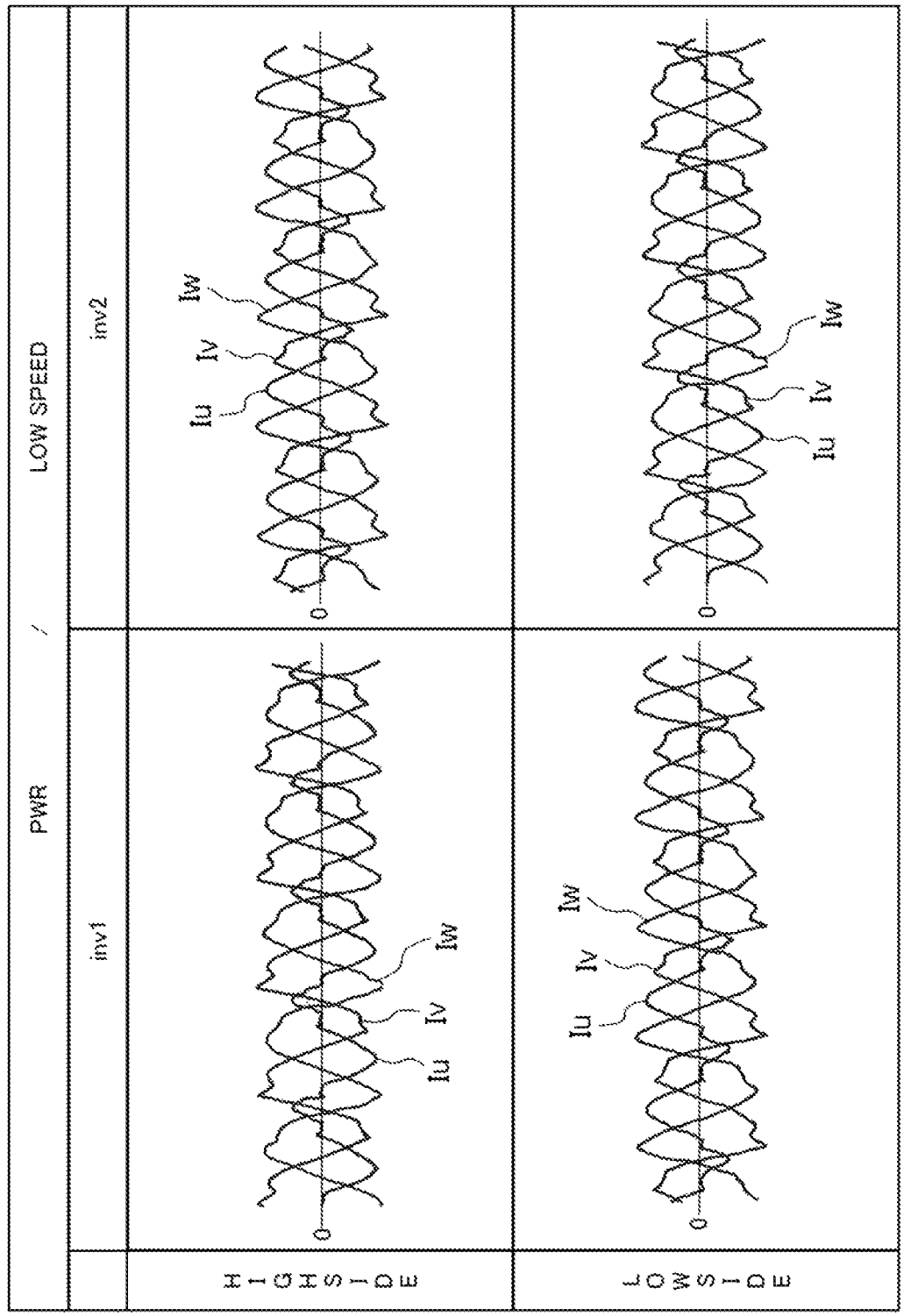
FIG. 36 is a waveform diagram showing an example of waveforms of three-phase alternating currents for a case in which an open-circuit failure has occurred upon powering (low speed) in a noise reduction priority mode.
Figure 37:
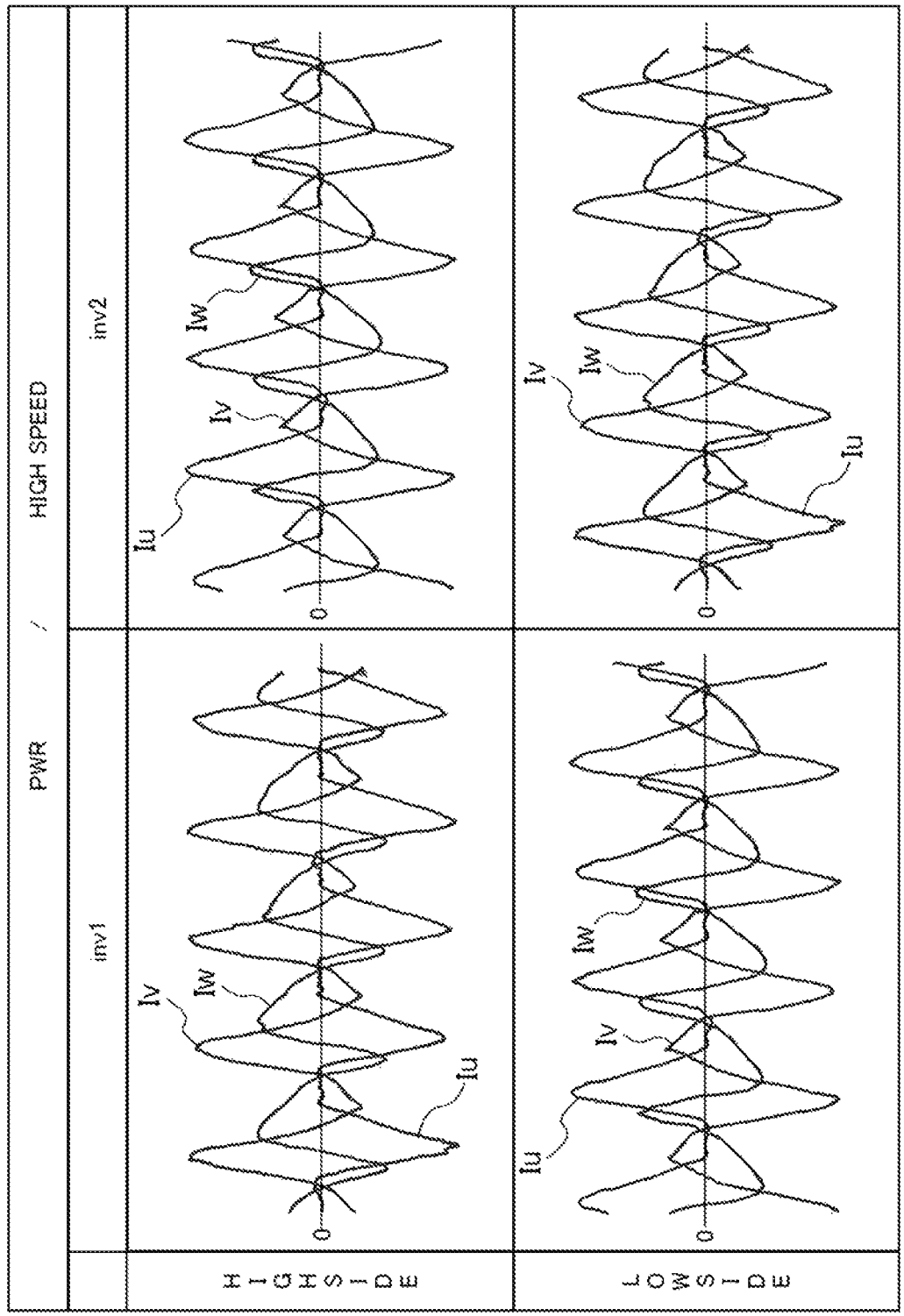
FIG. 37 is a waveform diagram showing an example of waveforms of three-phase alternating currents for a case in which an open-circuit failure has occurred upon powering (high speed) in the noise reduction priority mode.
Figure 38:
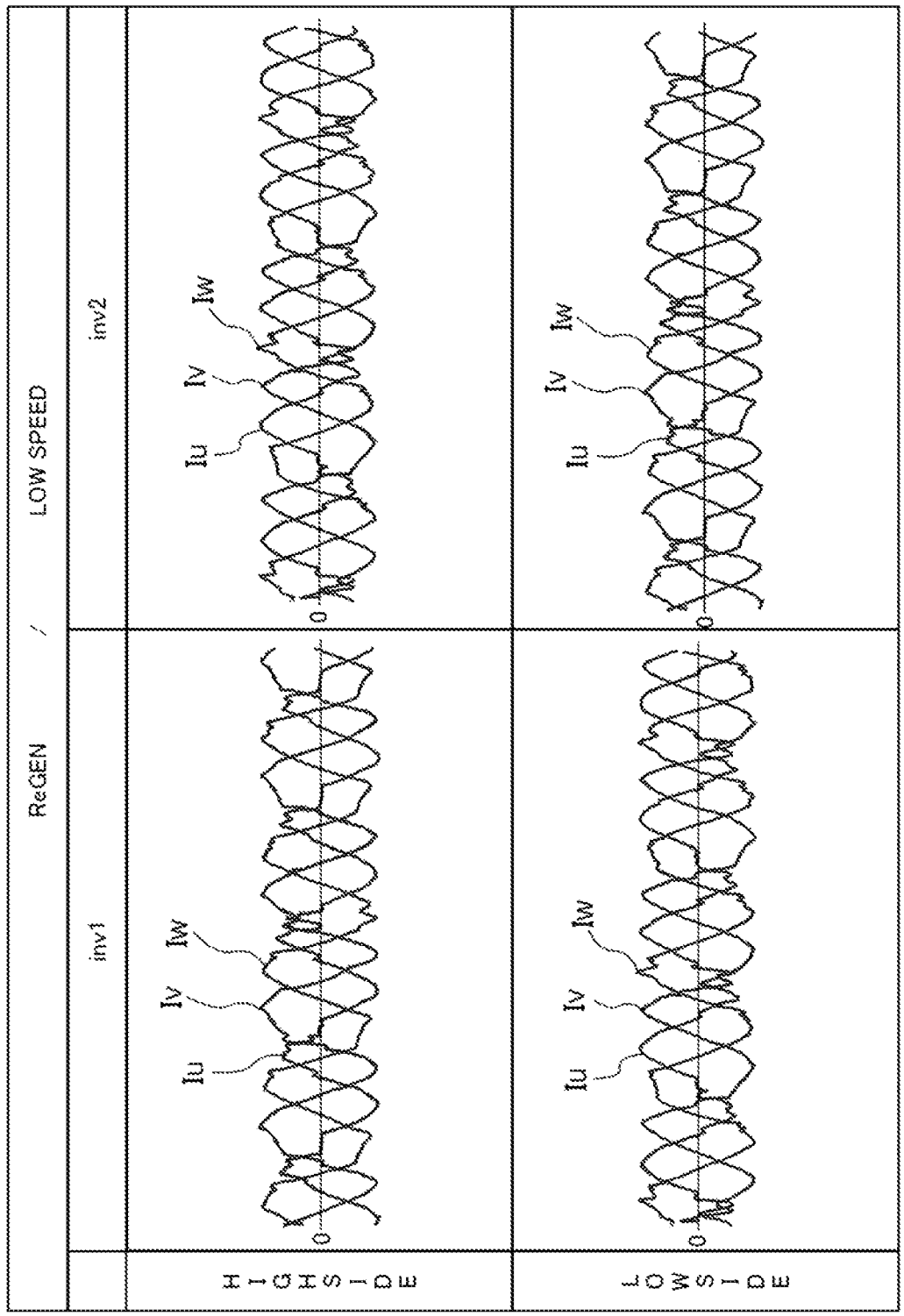
FIG. 38 is a waveform diagram showing an example of waveforms of three-phase alternating currents for a case in which an open-circuit failure has occurred upon regeneration (low speed) in the noise reduction priority mode.
Figure 39:
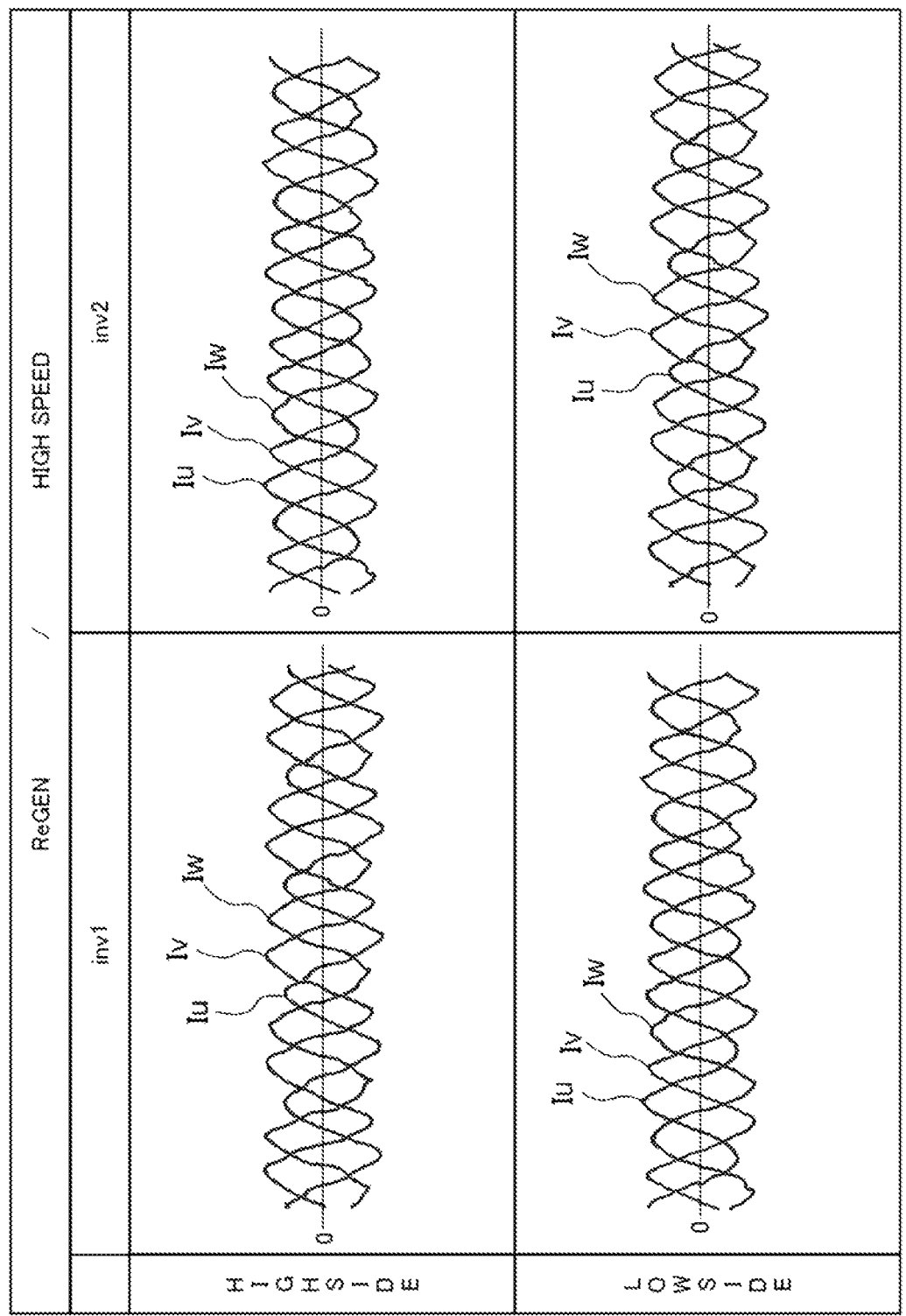
FIG. 39 is a waveform diagram showing an example of waveforms of three-phase alternating currents for a case in which an open-circuit failure has occurred upon regeneration (high speed) in the noise reduction priority mode.

FIGS. 36 to 39 are waveform diagrams showing, as with FIGS. 11 to 14, examples of waveforms of three-phase alternating currents (a U-phase current Iu, a V-phase current Iv, and a W-phase current Iw) for a case in which an open-circuit failure has occurred in the noise reduction priority mode (i.e., when both inverters 10 are controlled by pulse width modulation control). FIGS. 36 and 37 show, as with FIGS. 11 and 12, waveforms of three-phase alternating currents for a case in which an open-circuit failure has occurred upon powering, and FIGS. 38 and 39 show, as with FIGS. 13 and 14, waveforms of three-phase alternating currents for a case in which an open-circuit failure has occurred upon regeneration. As with FIGS. 11 to 14, FIGS. 36 to 39 show, in common, waveforms for a case in which a U-phase switching element 3 has an open-circuit failure. In addition, as with FIGS. 11 to 14, FIGS. 36 to 39 show, in common and in matrix form, waveforms for a case in which a switching element 3 on the upper-stage side (HIGHSIDE) of the first inverter 11 has an open-circuit failure, waveforms for a case in which a switching element 3 on the lower-stage side (LOWSIDE) of the first inverter 11 has an open-circuit failure, waveforms for a case in which a switching element 3 on the upper-stage side (HIGHSIDE) of the second inverter 12 has an open-circuit failure, and waveforms for a case in which a switching element 3 on the lower-stage side (LOWSIDE) of the second inverter 12 has an open-circuit failure. In addition, as with FIG. 12 in comparison with FIG. 11, FIG. 37 in comparison with FIG. 36 shows a case in which the rotational speed of the rotating electrical machine 80 is high for the same torque, and as with FIG. 14 in comparison with FIG. 13, FIG. 39 in comparison with FIG. 38 shows a case in which the rotational speed of the rotating electrical machine 80 is high for the same torque.

As with FIGS. 11 and 12, as shown in FIGS. 36 and 37, when an open-circuit failure has occurred upon powering, regardless of which one of the upper-stage side and lower-stage side of the first inverter 11 or the second inverter 12 has the open-circuit failure, the waveforms of three-phase alternating currents are asymmetrical and distorted. In addition, the waveforms of three-phase alternating currents are the same between when the upper-stage side of the first inverter 11 has an open-circuit failure and when the lower-stage side of the second inverter 12 has an open-circuit failure, and are the same between when the lower-stage side of the first inverter 11 has an open-circuit failure and when the upper-stage side of the second inverter 12 has an open-circuit failure.

In addition, as shown in FIGS. 38 and 39, when an open-circuit failure has occurred upon regeneration, too, regardless of which one of the upper-stage side and lower-stage side of the first inverter 11 or the second inverter 12 has the open-circuit failure, the waveforms of three-phase alternating currents are asymmetrical and distorted. In addition, the waveforms of three-phase alternating currents are the same between when the upper-stage side of the first inverter 11 has an open-circuit failure and when the lower-stage side of the second inverter 12 has an open-circuit failure, and are the same between when the lower-stage side of the first inverter 11 has an open-circuit failure and when the upper-stage side of the second inverter 12 has an open-circuit failure.

In the loss reduction priority mode (i.e., when both inverters 10 are controlled by mixed pulse width modulation control), as shown in FIGS. 13 and 14, upon regeneration, when an open-circuit failure has occurred on the lower-stage sides of the first inverter 11 and the second inverter 12, the waveforms of three-phase alternating currents are asymmetrical and distorted, but when an open-circuit failure has occurred on the upper-stage sides of the first inverter 11 and the second inverter 12, the waveforms of three-phase alternating currents are substantially symmetrical and have almost no distortion.

Namely, in the loss reduction priority mode, as shown in FIG. 15, upon powering (excluding at the super low rotational speed), regardless of where an open-circuit failure has occurred, the waveforms of three-phase alternating currents show abnormalities, and a manner of the abnormalities is roughly divided into the first failure pattern FP1 and the second failure pattern FP2 shown in FIG. 15. On the other hand, upon regeneration, only when an open-circuit failure has occurred on the lower-stage sides of the first inverter 11 and the second inverter 12, the waveforms of three-phase alternating currents show abnormalities. Thus, by checking the state of waveforms of three-phase alternating currents upon powering against the state of waveforms of three-phase alternating currents upon regeneration, when an open-circuit failure has been detected, it is possible to determine on which one of the upper-stage side and lower-stage side and in which one of the inverters 10 the open-circuit failure has occurred (see also tables 3 to 5 and the above-described description that refers to tables 3 to 5.).

Figure 42:
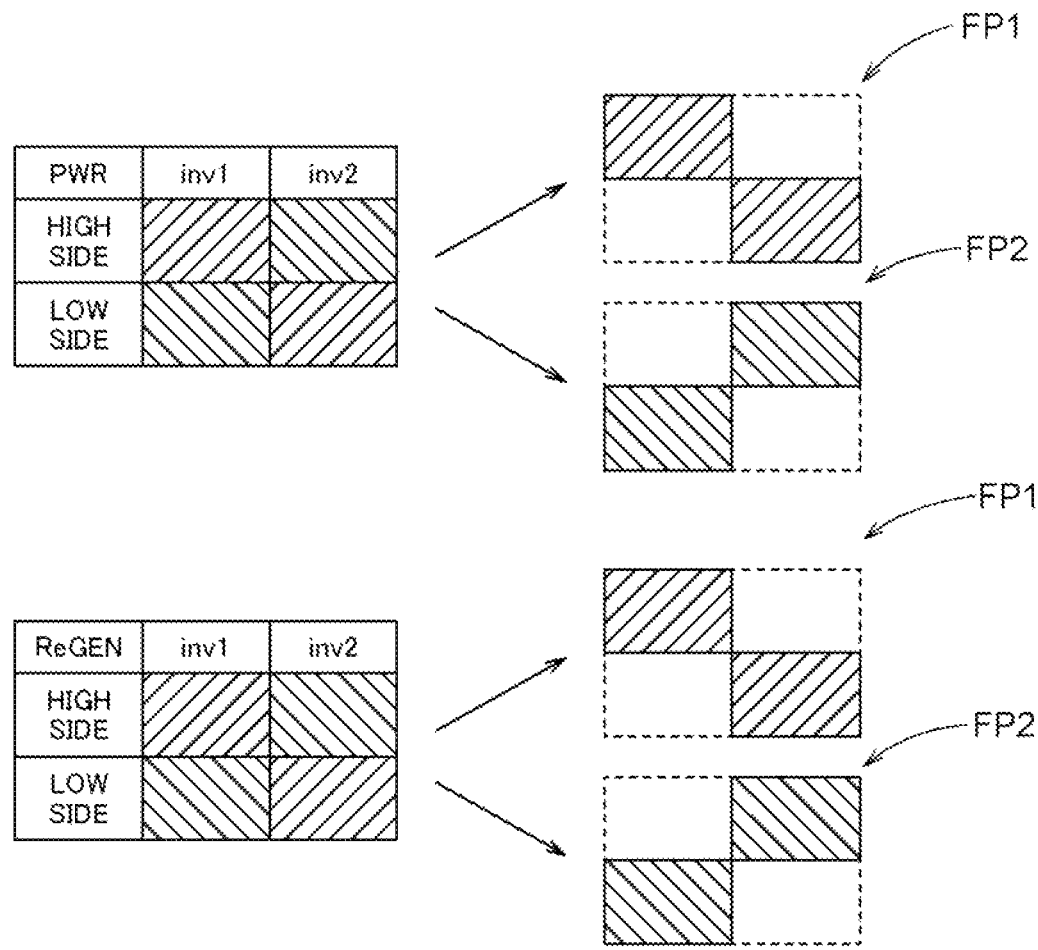
FIG. 42 is a diagram showing the behavior of waveforms of three-phase alternating currents for a case in which an open-circuit failure has occurred upon powering and a case in which an open-circuit failure has occurred upon regeneration in the noise reduction priority mode.

However, in the noise reduction priority mode, as shown in FIG. 42, the states of waveforms of three-phase alternating currents upon powering and upon regeneration show the same trend. That is, both upon powering and upon regeneration, when an open-circuit failure has occurred, the first failure pattern FP1 or the second failure pattern FP2 can be determined as a failure pattern FP. Hence, it cannot be determined on which one of the upper-stage side and lower-stage side and in which one of the inverters 10 an open-circuit failure has occurred. Hence, the rotating electrical machine control device 1 assumes that either one of the first inverter 11 and the second inverter 12 is a failed inverter, and with that assumption, drive of the rotating electrical machine 80 is controlled through one of the inverters 10 that is assumed to have no failure (1-inv drive) in the single inverter control region Rs.

Thereafter, if an abnormality (open-circuit failure) has not been detected, then it means that the assumption is right, and thus, one of the inverters 10 that is assumed to have the failure is determined to be a failed inverter. On the other hand, if an abnormality (open-circuit failure) has been further detected, then it means that the assumption is wrong, and thus, one of the inverters 10 that is not the one assumed to have the failure is determined to be a failed inverter. Then, with the correct failed inverter being identified, drive of the rotating electrical machine 80 is controlled through one of the inverters 10 (normal inverter) that has no failure (1-inv drive) in the single inverter control region Rs.

Figure 40:
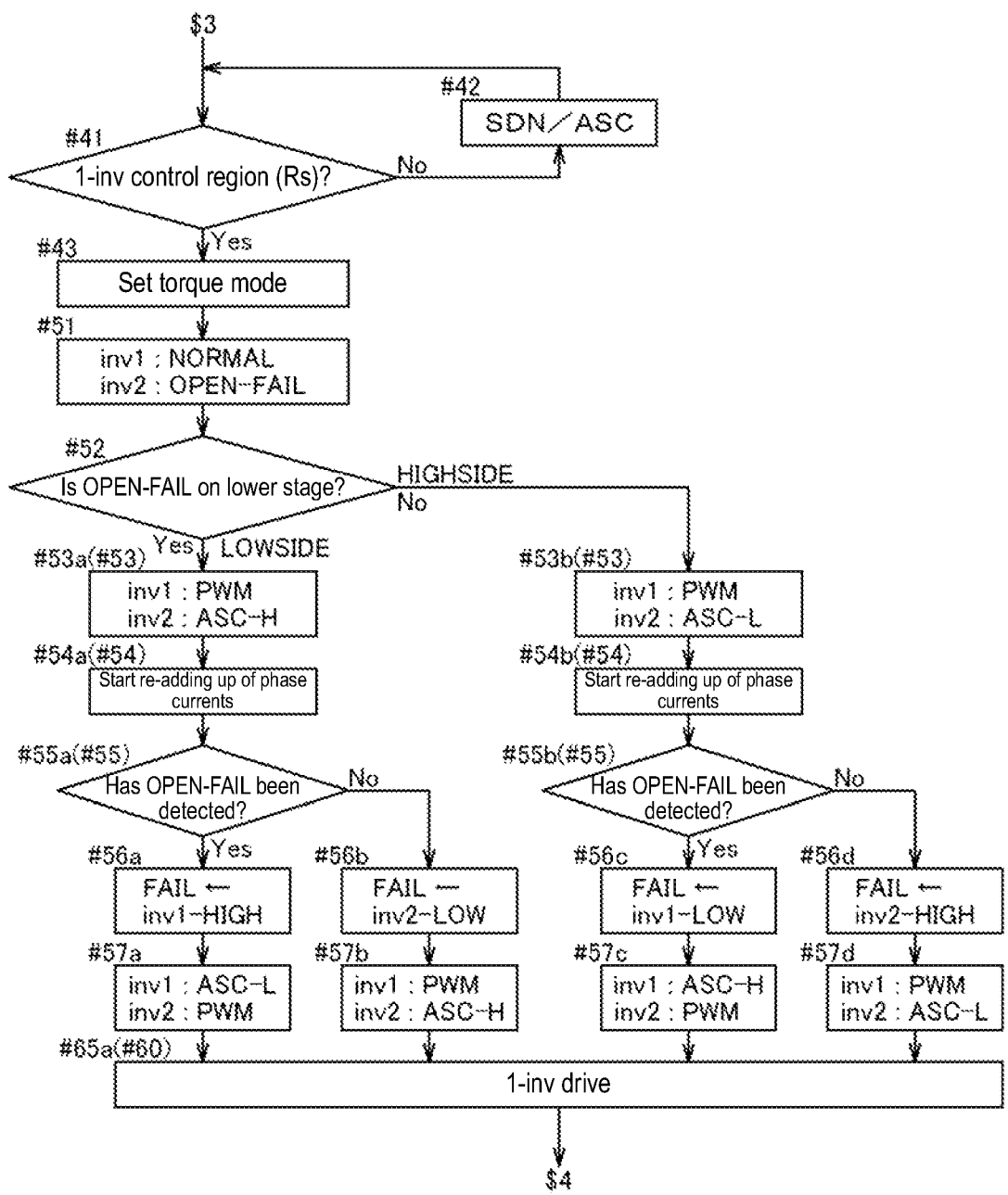
FIG. 40 is a flowchart showing an example of a procedure for determining a location where an open-circuit failure has occurred in the noise reduction priority mode.
Figure 41:
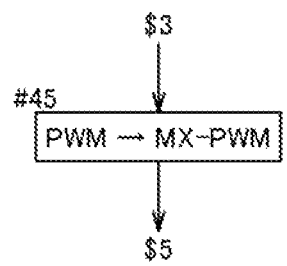
FIG. 41 is a flowchart showing another example of a procedure for determining a location where an open-circuit failure has occurred in the noise reduction priority mode.

Description will be made below with reference also to a flowchart of FIG. 40. As described above with reference to FIGS. 36, 37, and 42, even when switching is performed on the inverters 10 by general pulse width modulation control instead of mixed pulse width modulation control, a failure pattern FP can be determined by detection of an open-circuit failure in the first control state (step #5). Thus, here, processes subsequent to step #5 will be described.

First, at step #41, it is determined whether the operating point of the rotating electrical machine 80 is in the single inverter control region Rs. If the operating point is not in the single inverter control region Rs, then deceleration by, for example, shutdown control (SDN), active short-circuit control (ASC), or zero-newton control (0 Nm) is performed until the operating point is determined to be in the single inverter control region Rs (#42). If the operating point is in the single inverter control region Rs, then the control mode of the rotating electrical machine 80 is set to torque mode (#43). Namely, when control for deceleration at step #42 is not performed, torque mode is continued, and when control for deceleration is performed, the mode returns to torque mode.

A failure pattern FP obtained when an open-circuit failure has been detected at step #5 is the first failure pattern FP1 or the second failure pattern FP2. Thus, it is unknown in which one of the inverters 10, the first inverter 11 or the second inverter 12, the open-circuit failure has occurred. Hence, the rotating electrical machine control device 1 assumes that the open-circuit failure has occurred in either one of the inverters 10. Namely, the rotating electrical machine control device 1 assumes either one of the inverters 10, the first inverter 11 or the second inverter 12, to be a failed inverter in which the open-circuit failure has occurred, and sets the assumed inverter to be an assumed failed inverter, and assumes the other inverter 10 to be a normal inverter having no failure, and sets the assumed inverter to be an assumed normal inverter (#51). Here, the first inverter 11 is set to be an assumed normal inverter (NORMAL), and the second inverter 12 is set to be an assumed failed inverter (OPEN-FAIL). As a matter of course, this assumption may be the other way around.

For example, if a failure pattern FP obtained when an open-circuit failure has been detected at step #5 is the first failure pattern FP1, then the failure-side arms are the upper-stage-side arms of the first inverter 11 or the lower-stage-side arms of the second inverter 12. Since the second inverter 12 is set to be an assumed failed inverter at step #51, it is assumed that the failure-side arms are the lower-stage-side arms of the second inverter 12. Namely, the lower-stage-side arms of the second inverter 12 are set as assumed failure-side arms.

At step #52, it is determined whether the failure-side arms (assumed failure-side arms) in which the open-circuit failure (OPEN-FAIL) has occurred are upper-stage-side arms or lower-stage-side arms, based on the assumed failed inverter set at step #51 and the failure pattern FP determined at step #5. Here, the failure-side arms are lower-stage-side arms, and thus, the rotating electrical machine control device 1 controls the second inverter 12 by upper-stage-side active short-circuit control (ASC-H), and controls the first inverter 11 by pulse width modulation control (#53a (#53)).

When switching in the inverters 10 by new control modes starts, re-adding up of phase currents starts (#54a (#54)). Namely, the integrated values of three-phase currents (Σlu, Iv, and Iw) are reset once, and integrated currents (ΣIu, ΣIv, and ΣIw) are computed again. Then, at step #55a (#55), based on the integrated currents (ΣIu, ΣIv, and ΣIw), it is determined whether an open-circuit failure is detected. Here, if an open-circuit failure has been detected, then it means that there are errors in the assumptions at step #51 and #52. That is, it is found that the failure-side arms are not the lower-stage-side arms of the second inverter 12, but are the upper-stage-side arms of the first inverter 11 that are on the other side in the first failure pattern FP1.

The rotating electrical machine control device 1 sets the upper-stage-side arms of the first inverter 11 (inv1-HIGH) as a failure location (FAIL) (#56a (#56)). Then, the rotating electrical machine control device 1 controls the first inverter 11 having the open-circuit failure in its upper-stage-side arm by lower-stage-side active short-circuit control (ASC-L), and controls the second inverter 12 by pulse width modulation control (#57a (#57)). Then, single inverter drive control (1-inv drive) in which the rotating electrical machine 80 is driven by one inverter 10 is performed (#65a (#60)).

If, at step #55a (#55), an open-circuit failure has not been detected, then it means that the assumptions at step #51 and #52 are right. That is, it is found that the failure-side arms are, as assumed, the lower-stage-side arms of the second inverter 12. The lower-stage-side arms of the second inverter 12 (inv2-LOW) are set as a failure location (FAIL) (#56b (#56)). Then, the rotating electrical machine control device 1 controls the second inverter 12 having the open-circuit failure in its lower-stage-side arm by upper-stage-side active short-circuit control (ASC-H), and controls the first inverter 11 by pulse width modulation control (#57b (#57)). Then, single inverter drive control (1-inv drive) in which the rotating electrical machine 80 is driven by one inverter 10 is performed (#65a (#60)).

A transition path from step #52 to step #53b (#53), #54b (#54), #55b (#55), #56c (#56), #57c (#57), and #65a (#60) is also the same as above, and thus, a detailed description thereof is omitted. In addition, a transition path from step #55b (#55) to step #56d (#56), #57d (#27), and #65a (#60) is also the same as above, and thus, a detailed description thereof is omitted. Note that in the noise reduction priority mode, switching is performed on the inverters 10 by general pulse width modulation control. Hence, upon performing single inverter drive control (1-inv drive), a control scheme does not need to be changed from mixed pulse width modulation control to general pulse width modulation control.

As such, when the control schemes for the inverters 10 are not mixed pulse width modulation control, too, the rotating electrical machine control device 1 determines which one of the first failure pattern FP1 and the second failure pattern FP2 is a failure pattern FP for an open-circuit failure, based on the positive and negative polarities of each of current integrated values (ΣIu, ΣIv, and ΣIw), and then assumes either one of the inverters 10, the first inverter 11 or the second inverter 12, to be a failed inverter, and sets the assumed inverter to be an assumed failed inverter. Then, the rotating electrical machine control device 1 performs active short-circuit control by bringing all switching elements 3 in assumed failure-side arms that are assumed, based on the determined failure pattern FP, to be failure-side arms out of the upper-stage-side arms and lower-stage-side arms of the assumed failed inverter into on state, and bringing all switching elements 3 in assumed non-failure-side arms that are on the other side into off state, and performs switching control on an inverter 10 (assumed normal inverter) that is different from the assumed failed inverter. Thereafter, when an open-circuit failure has not been detected based on the positive and negative polarities of each of current integrated values (ΣIu, ΣIv, and ΣIw), the rotating electrical machine control device 1 determines that the assumed failed inverter is a failed inverter, and determines that the assumed failure-side arms are failure-side arms. When an open-circuit failure has been detected, the rotating electrical machine control device 1 determines that the inverter 10 that is different from the assumed failed inverter is a failed inverter, and determines failure-side arms of the failed inverter based on a failure pattern FP.

Note that a method of assuming a failed inverter such as that described above with reference to the flowchart of FIG. 40 can, as a matter of course, also be applied to a case in which a control scheme is mixed pulse width modulation control.

In addition, in the above description, a mode is exemplified in which assuming that either one of the first inverter 11 and the second inverter 12 is a failed inverter, the failed inverter is determined, and a failure location is identified. However, as shown in a flowchart of FIG. 41, with a control scheme being changed from pulse width modulation control to mixed pulse width modulation control, processing may go through $5, and by the first failure location determination process (#10) or the second failure location determination process (#20) which is described above with reference to FIGS. 32 to 34, a failed inverter may be determined and a failure location may be identified.

Namely, in a case in which the rotating electrical machine control device 1 controls both inverters 10, the first inverter 11 and the second inverter 12, by pulse width modulation control in which a plurality of pulses with different patterns are outputted during a second period H2, too, by which a plurality of pulses with different patterns are outputted throughout one cycle of electrical angle, or by rectangular-wave control in which one pulse is outputted in one cycle of electrical angle, instead of by mixed pulse width modulation control, when occurrence of an open-circuit failure has been detected in the first control state, a failure pattern FP may be determined in the first control state, and thereafter, control schemes for both inverters 10, the first inverter 11 and the second inverter 12, may be changed to mixed pulse width modulation control, and in the second control state, it may be determined which one of lower-stage-side failure patterns LF is present, and thereafter, failure-side arms may be determined based on a result of the determination in the first control state and a result of the determination in the second control state.

As described above, in the noise reduction priority mode, both upon powering and upon regeneration, when an open-circuit failure has occurred, the first failure pattern FP1 or the second failure pattern FP2 can be determined as a failure pattern FP. Thus, in the noise reduction priority mode, the first control state includes powering and regeneration. That is, the first control state before changing the control schemes to mixed pulse width modulation control includes powering and regeneration. The second control state after changing the control schemes to mixed pulse width modulation control is, as with the loss reduction priority mode, regeneration or powering at the super low rotational speed.

As has been described above, according to the present embodiment, when an open-circuit failure has occurred in one of the switching elements 3 included in the two inverters 10 that are provided at respective both ends of the stator coils 8 which are open-end windings, a failure location can be identified.

Next, a technique for identifying a failure location when a short-circuit failure has occurred in one of the switching elements 3 included in the two inverters 10 that are provided at respective both ends of the open-end windings (stator coils 8) will be described.

Figure 43:
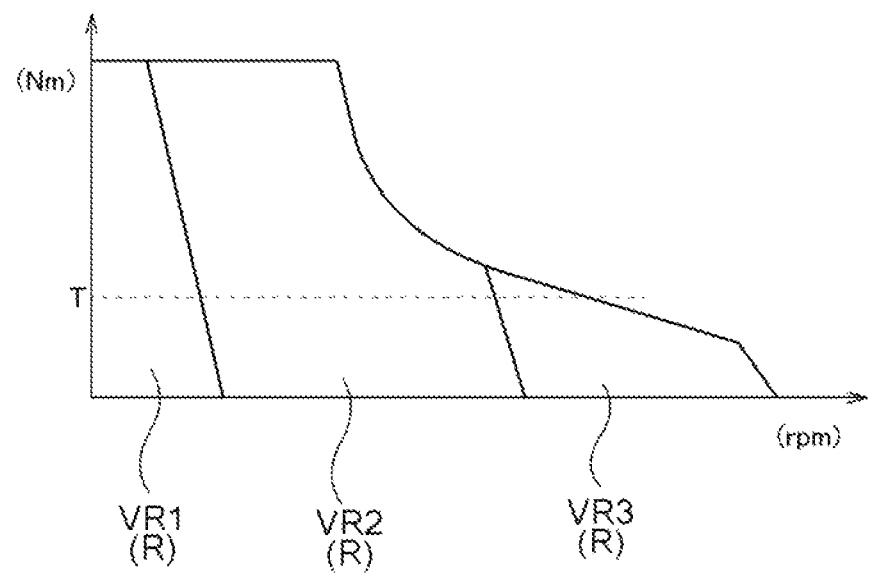
FIG. 43 is a diagram showing an example of control regions of the rotating electrical machine.

In the present embodiment, a plurality of control regions R (see FIG. 43, etc.) based on the operating conditions of the rotating electrical machine 80 are set, and the rotating electrical machine control device 1 controls the inverters 10 using control schemes set for each control region R. FIG. 43 shows an example of a relationship between the rotational speed and torque of the rotating electrical machine 80. For example, as shown in FIG. 43, as the control regions R of the rotating electrical machine 80, there are set a first speed region VR1, a second speed region VR2 in which the rotational speed of the rotating electrical machine 80 is higher than that in the first speed region VR1 for the same torque T, and a third speed region VR3 in which the rotational speed of the rotating electrical machine 80 is higher than that in the second speed region VR2 for the same torque T.

For example, as shown in the following table 8, in the first speed region VR1, the rotating electrical machine control device 1 controls both inverters 10, the first inverter 11 and the second inverter 12, by continuous pulse width modulation control (CPWM). In addition, in the second speed region VR2, the rotating electrical machine control device 1 controls both inverters 10, the first inverter 11 and the second inverter 12, by discontinuous pulse width modulation control (DPWM). In addition, in the third speed region VR3, the rotating electrical machine control device 1 controls both inverters 10, the first inverter 11 and the second inverter 12, by rectangular-wave control. Mi_sys, Mi_inv1, and Mi_inv2 in the table will be described later.

TABLE 8

| R | Mi_sys | INV1 | Mi_inv1 | INV2 | Mi_inv2 |
|---|---|---|---|---|---|
| VR1 | M < X | CPWM | M < X | CPWM | M < X |
| VR2 | X ≤ M < 0.78 | DPWM | X ≤ M < 0.78 | DPWM | X ≤ M < 0.78 |
| VR3 | M = 0.78 | 1-Pulse | M = 0.78 | 1-Pulse | M = 0.78 |

It is preferred that boundaries between the control regions R (boundaries between the first speed region VR1, the second speed region VR2, and the third speed region VR3) be set based on at least one of the rotational speed of the rotating electrical machine 80 based on the torque of the rotating electrical machine 80 and a ratio of the root-mean-square value of line-to-line voltage of alternating-current voltages of a plurality of phases to direct-current voltage (which may be an instruction value or may be an equivalent from output voltage).

As exemplified in FIG. 43, the operating conditions of the rotating electrical machine 80 are often defined by a relationship between rotational speed and torque. The control regions R may be set based on rotational speed which is one parameter. Here, the rotational speed that defines boundaries between the control regions R can be set to be constant regardless of torque, but it is further preferred that the rotational speed that defines boundaries between the control regions R be set to a value that varies depending on the torque. By doing so, drive of the rotating electrical machine 80 can be controlled with high efficiency, based on the operating conditions of the rotating electrical machine 80.

In addition, for example, when the rotating electrical machine 80 requires high output (high rotational speed or high torque), a voltage-type inverter implements the requirement by increasing direct-current voltage or increasing a ratio at which direct-current voltage is converted into alternating-current voltage. When direct-current voltage is constant, the requirement can be implemented by increasing the ratio at which direct-current voltage is converted into alternating-current voltage. This ratio can be represented as a ratio of the root-mean-square value of three-phase alternating-current electric power to direct-current electric power (in a case of a voltage-type inverter, it is equivalent to a ratio of the root-mean-square value of three-phase alternating-current voltage to direct-current voltage). As described above, control schemes for controlling the inverters 10 include various schemes from a scheme in which the ratio is low to a scheme in which the ratio is high.

As shown in table 8, when the control regions R are set based on the ratio of the root-mean-square value of three-phase alternating-current electric power to direct-current electric power (modulation index) which is determined based on a requirement for the rotating electrical machine 80, drive of the rotating electrical machine 80 can be controlled with high efficiency, based on the operating conditions of the rotating electrical machine 80. Note that in the table, "Mi_inv1" represents the modulation index of the first inverter 11, "Mi_inv2" represents the modulation index of the second inverter 12, and "Mi_sys" represents the modulation index of the entire system.

The above-described table 8 exemplifies modulation indices for each control region R. In the present embodiment, the terminal-to-terminal voltage "E1" of the first direct-current power supply 61 and the terminal-to-terminal voltage "E2" of the second direct-current power supply 62 are identical (both are the voltage "E"). When the root-mean-square value on the alternating-current side of the first inverter 11 is "Va_inv1" and the root-mean-square value on the alternating-current side of the second inverter 12 is "Va_inv2", the modulation index "Mi_inv1" of the first inverter 11 and the modulation index "Mi_inv2" of the second inverter 12 are as shown in the following reshown equations (1) and (2). In addition, the modulation index "Mi_sys" of the entire system is as shown in the following reshown equation (3).

$$Mi\_inv1 = Va\_inv1/E1 = Va\_inv1/E \quad (1)$$

$$Mi\_inv2 = Va\_inv2/E2 = Va\_inv2/E \quad (2)$$

$$Mi\_sys = (Va\_inv1 + Va\_inv2)/(E1 + E2) \quad (3)$$
$$= (Va\_inv1 + Va\_inv2)/2E$$

For the instantaneous value of voltage, an instantaneous vector needs to be considered, but when only the modulation index is simply considered, the modulation index "Mi_sys" of the entire system is "(Mi_inv1+Mi_inv2)/2" from equations (1) to (3). Note that table 8 shows, as rated values, modulation indices for each control region R. Hence, upon actual control, taking into account hunting occurring when a control scheme changes between control regions R, etc., modulation indices for each control region R may include an overlapping range.

Note that the modulation index "X" is set based on a theoretical upper limit value (approximately 0.707) of a modulation index for continuous pulse width modulation (space vector pulse width modulation), and further taking into account dead time. The modulation index "X" is set as appropriate based on experiments, simulations, etc. (e.g., 0.3 or less).

Figure 46:
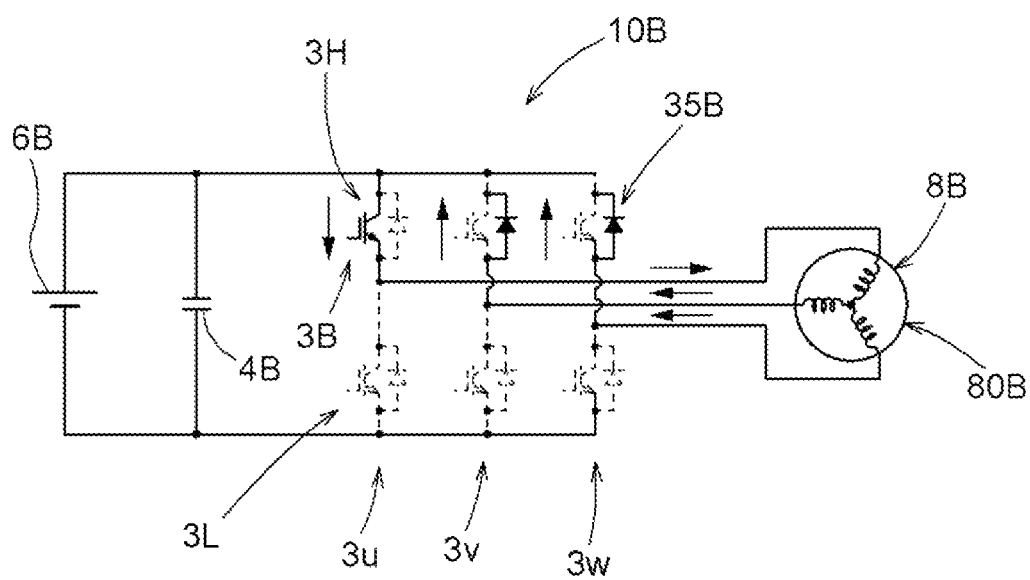
FIG. 46 is a diagram showing an example of the flow of currents during performance of shutdown control after detecting a short-circuit failure in a one-inverter system.

Meanwhile, a switching element 3 included in the inverters 10 may cause a short-circuit failure in which the switching element 3 is always in on state, or an open-circuit failure in which the switching element 3 is always in off state. For example, when, as shown in FIG. 46, a rotating electrical machine 80B including Y-connected stator coils 8B is driven by one inverter 10B, if a short-circuit failure or an open-circuit failure has occurred, then shutdown control in which all switching elements 3B in the inverter 10B are brought into off state, or active short-circuit control in which upper-stage-side switching elements 3H in arms 3A of all of a plurality of phases are brought into on state or lower-stage-side switching elements 3L in the arms 3A of all of the plurality of phases are brought into on state is performed, by which the vehicle stops.

However, when, as in the present embodiment, drive of the rotating electrical machine 80 having, as the stator coils 8, open-end windings of a plurality of phases that are independent of each other is controlled through the first inverter 11 and the second inverter 12, it is possible to control drive of the rotating electrical machine 80 through one inverter 10, the first inverter 11 or the second inverter 12. As described above, when one inverter 10 is short-circuited by active short-circuit control, the stator coils 8 of a plurality of phases are short-circuited in the one inverter 10, and the one inverter 10 serves as a neutral point and the stator coils 8 are Y-connected. Hence, the rotating electrical machine control device 1 can implement a mode in which the Y-connected rotating electrical machine 80 is controlled through one inverter 10 (an inverter 10 that is not subjected to active short-circuit control).

In a case in which the rotating electrical machine 80B is driven by one inverter 10B, when a short-circuit failure or an open-circuit failure has occurred, there is a need to stop a vehicle that uses the rotating electrical machine 80B as a drive power source. However, when, as in the present embodiment, the rotating electrical machine 80 is driven by the two inverters 10, even if a short-circuit failure or an open-circuit failure has occurred, traveling of the vehicle that uses the rotating electrical machine 80 as a drive power source can be continued in a certain limited range without stopping the vehicle. For example, the vehicle can travel to a destination for the time being, such as a driver's home, a repair shop, etc.

For example, when a short-circuit failure has occurred in one inverter 10, active short-circuit control may be performed by bringing all switching elements 3 in one side of the arms, upper-stage-side arms or lower-stage-side arms, that includes a switching element 3 having the short-circuit failure into on state, and bringing all switching elements 3 in the other side of the arms into off state. By bringing all switching elements 3 in one side of the arms that includes a switching element 3 having the short-circuit failure into on state, the switching element 3 having the short-circuit failure can be used as a switching element 3 that has no failure.

In addition, when an open-circuit failure has occurred in one inverter 10, active short-circuit control may be performed by bringing all switching elements 3 in one side of the arms, upper-stage-side arms or lower-stage-side arms, that does not include a switching element 3 having the open-circuit failure into on state, and bringing all switching elements 3 in one side of the arms that includes the switching element 3 having the open-circuit failure into off state. By bringing all switching elements 3 in one side of the arms that includes a switching element 3 having the open-circuit failure into off state, the switching element 3 having the open-circuit failure can be used as a switching element 3 that has no failure.

Hence, there is a need to identify at least which one of the first inverter 11 and the second inverter 12 a failed witching element 3 belongs to, and which one of a set of upper-stage-side arms and a set of lower-stage-side arms the failed switching element 3 belongs to. It is more preferable to also identify which one of the plurality of phases the failed switching element 3 is of.

A mode will be described below in which when an short-circuit failure has occurred in any one of the switching elements 3 included in the first inverter 11 and the second inverter 12 (when a one-phase short-circuit failure has occurred), the switching element 3 having the short-circuit failure is identified, and the rotating electrical machine 80 is driven by fail-safe control so that traveling of the vehicle can be continued after the identification.

Figure 44:
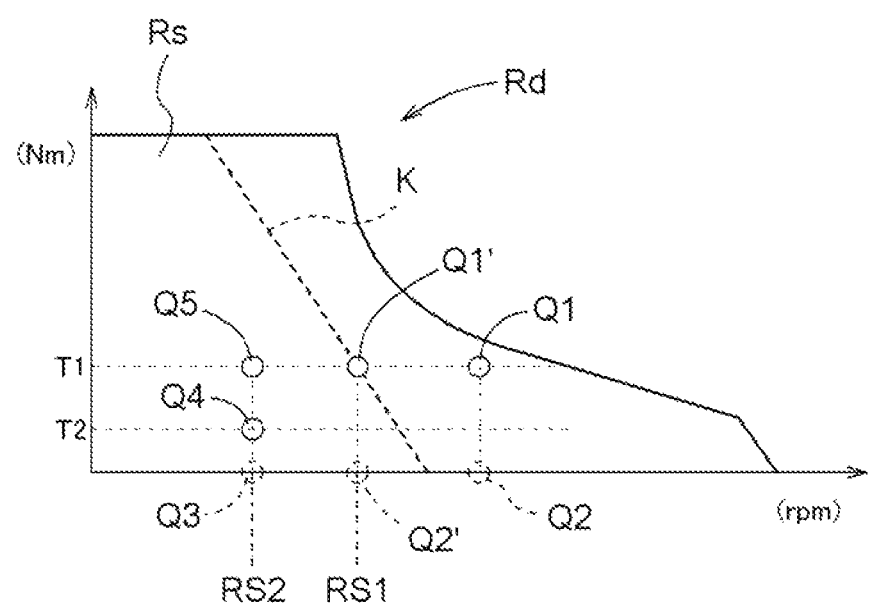
FIG. 44 is a diagram showing an example of operating points from when a short-circuit failure has been detected to when the rotating electrical machine is driven by fail-safe control.

FIG. 44 shows an example of operating points from when a short-circuit failure has been detected to when the rotating electrical machine 80 is driven by fail-safe control, in control regions of the rotating electrical machine 80. In addition, a control region "Rs" in FIG. 44 represents a single inverter control region Rs used when the rotating electrical machine 80 is controlled by one inverter 10, and "Rd" indicating the entire control region represents a dual inverter control region Rd used when the rotating electrical machine 80 is controlled by the two inverters 10. "K" represents a schematic boundary between the single inverter control region Rs and the dual inverter control region Rd of the present embodiment. Here, rotational speed that defines "K" can be set to be constant regardless of torque, but it is further preferred that as exemplified in FIG. 44, the rotational speed that defines "K" be set to a value that varies depending on the torque. In addition, as a matter of course, these control regions do not represent limiting regions in which the rotating electrical machine 80 is driven. Thus, the boundary "K" does not represent a limit on control by a single inverter, either, and is a boundary that is set as appropriate to set the single inverter control region Rs as a region in which the rotating electrical machine 80 can be driven by a single inverter.

Figure 45:
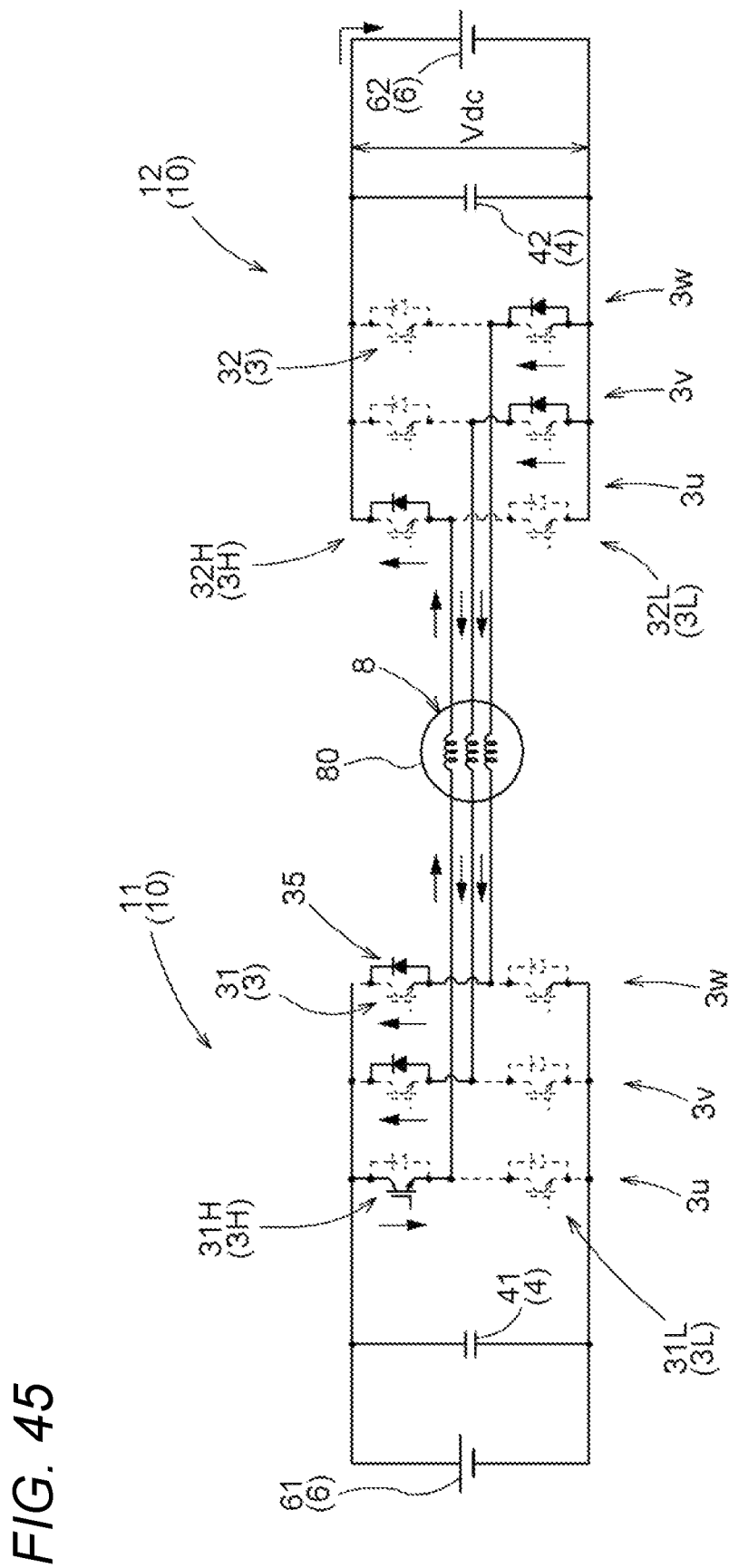
FIG. 45 is a diagram showing an example of the flow of currents during performance of shutdown control after detecting a short-circuit failure.

FIG. 45 exemplifies the flow of currents for a case in which shutdown control in which all switching elements 3 in the first inverter 11 and the second inverter 12 are brought into off state is performed in a state in which, for example, an upper-stage-side switching element 3H (31H) in a U-phase arm 3$u$ of the first inverter 11 has a short-circuit failure. FIG. 46 exemplifies the flow of currents for a case in which in a system (one-inverter system) that drives the rotating electrical machine 80B including the Y-connected stator coils 8B through one inverter 10B, shutdown control in which all switching elements 3 in the inverter 10B are brought into off state is performed in a state in which an upper-stage-side switching element 3H in a U-phase arm 3$u$ has a short-circuit failure.

For example, a case in which a short-circuit failure has occurred at a first operating point Q1 shown in FIG. 44 is considered. Note that when a short-circuit failure has occurred, an overcurrent flows through an inverter 10 in which the short-circuit failure has occurred, and thus, an overcurrent detection circuit transmits information indicating that a short-circuit failure may have occurred in the inverter 10 to the rotating electrical machine control device 1 through a corresponding drive circuit 2. At this time, there is no need to identify a switching element 3 that may have caused the short-circuit failure. It is only necessary to identify which one of the first inverter 11 and the second inverter 12 has caused the short-circuit failure.

As shown in FIG. 44, the first operating point Q1 is an operating point with a relatively high rotational speed. Thus, even when a short-circuit failure is detected and shutdown control is performed on the first inverter 11 and the second inverter 12, the rotating electrical machine 80 continues its rotation by an inertial force, and the rotation generates a large back electromotive force (BEMF). When the back electromotive force exceeds the voltage on the direct-current side (direct-current link voltage Vdc) of the inverter 10, current flows from the rotating electrical machine 80 to a direct-current power supply 6 side.

As described above, FIG. 45 shows a state in which the upper-stage-side switching element 3H (31H) in the U-phase arm 3$u$ of the first inverter 11 has a short-circuit failure, and shutdown control is performed. Each arm 3A of the second inverter 12 can allow current to flow only through paths with freewheeling diodes 35. Thus, only when the back electromotive force exceeds a direct-current link voltage Vdc of the second inverter 12 (a terminal-to-terminal voltage of the second direct-current power supply 62), current flows into the second direct-current power supply 62, by which a current loop can be formed, and current can flow through the first inverter 11 and the second inverter 12. Though details will be described later, when a current loop can be formed, a switching element 3 having a short-circuit failure can be identified based on phase currents (here, three-phase currents Iu, Iv, and Iw).

On the other hand, for example, as shown in FIG. 44, when the first operating point Q1 is "Q1'" with a lower rotational speed, the back electromotive force may not exceed the direct-current link voltage Vdc. When the back electromotive force does not exceed the direct-current link voltage Vdc of the second inverter 12 (the terminal-to-terminal voltage of the second direct-current power supply 62), a current loop cannot be formed on a second inverter 12 side, and thus current cannot flow through the first inverter 11 and the second inverter 12.

Note that as shown in FIG. 46, in the 1-inverter system, by the upper-stage-side switching element 3H (31H) in the U-phase arm 3$u$ having a short-circuit failure, a current loop can be formed. Thus, if only a small back electromotive force is generated, then current can flow through the inverter 10B.

As described above, when the first operating point Q1 is "Q1'", the back electromotive force does not exceed the direct-current link voltage Vdc and a current loop is not formed, and thus, a switching element 3 having a short-circuit failure cannot be identified based on phase currents (here, three-phase currents Iu, Iv, and Iw). Hence, though details will be described later, the operating point is moved into the single inverter control region Rs. For example, the operating point is moved to a fourth operating point Q4 shown in FIG. 44. Then, the rotating electrical machine control device 1 controls drive of the rotating electrical machine 80 by a torque control mode in which a torque instruction is provided, instead of by shutdown control, by which a current loop is formed, and identifies a switching element 3 having a short-circuit failure, based on phase currents (here, three-phase currents Iu, Iv, and Iw).

Figure 47:
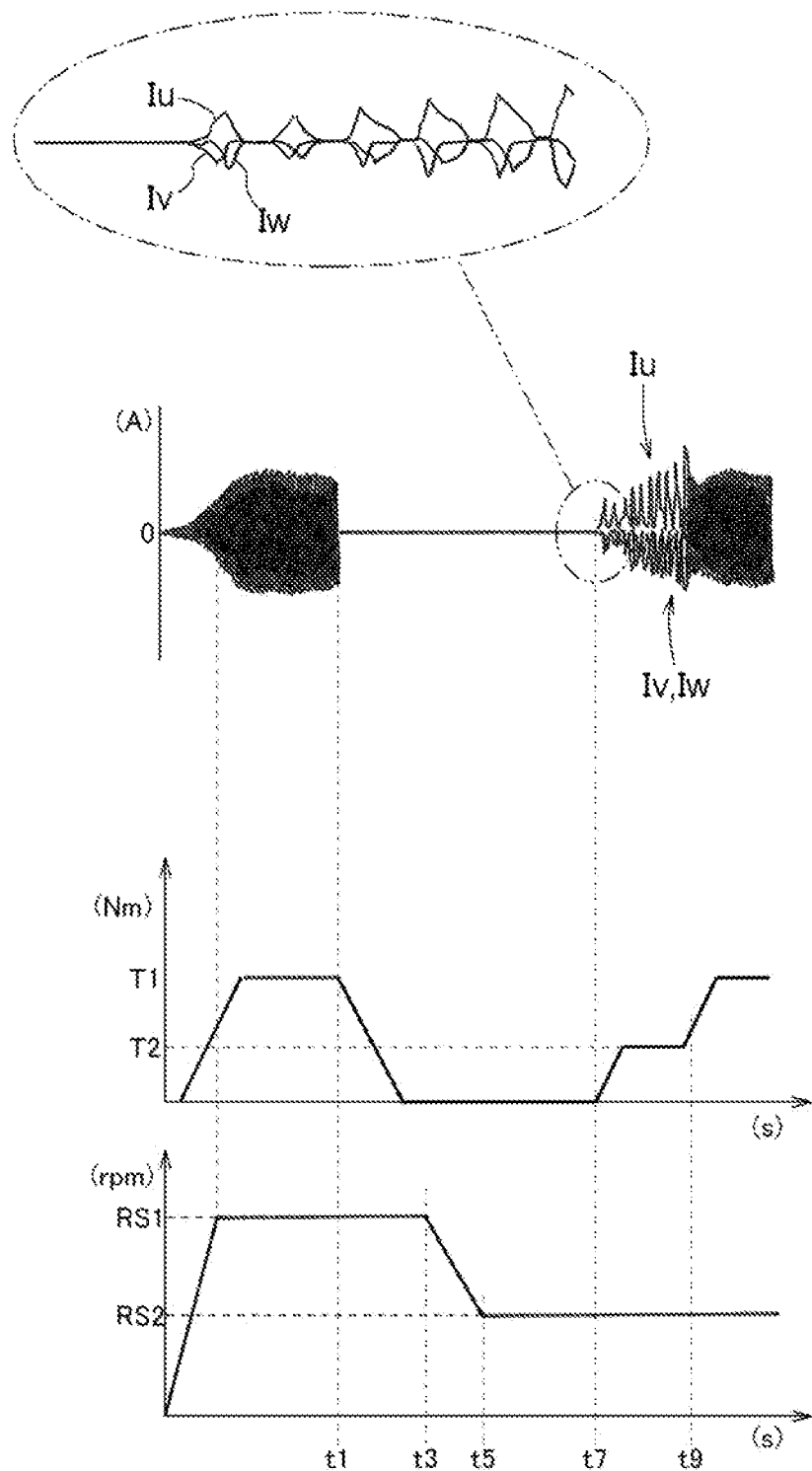
FIG. 47 is a diagram showing an example of transitions of torque instructions and rotational speed and the waveforms of three-phase currents after occurrence of a short-circuit failure.

FIG. 47 exemplifies transitions of torque instructions and rotational speed and the waveforms of three-phase currents for this case. The rotating electrical machine 80 detects occurrence of a short-circuit failure at time t1 at which the rotating electrical machine 80 rotates at a first rotational speed RS1 based on a first torque instruction T1 (the first operating point Q1 (Q1'): see FIG. 44). Deceleration of the rotating electrical machine 80 starts from time t3, and the rotational speed is reduced to a second rotational speed RS2 at time t5. At this time, it is preferred that the rotational speed of the rotating electrical machine 80 be reduced by, for example, shutdown control. Note that as shown in FIG. 47, here, the torque instruction may be reduced to "zero". In this case, the operating point moves from the first operating point Q1 (Q1') to a third operating point Q3 via a second operating point Q2 (Q2'). When the rotational speed is reduced to the second rotational speed RS2, the rotating electrical machine control device 1 performs torque control on the rotating electrical machine 80 by a second torque instruction T2 that is smaller than the first torque instruction T1 (time t7 to t9). By this, the operating point moves from the third operating point Q3 to the fourth operating point Q4.

The waveforms of three-phase currents (Iu, Iv, and Iw) obtained in torque control performed at time t7 to t9 are asymmetrical and distorted as shown in FIG. 47. The rotating electrical machine control device 1 identifies a switching element 3 having a short-circuit failure, based on the three-phase currents (Iu, Iv, and Iw) obtained at time t7 to t9. Though details will be described later, when the back electromotive force exceeds the direct-current link voltage Vdc, too, the waveforms of three-phase currents (Iu, Iv, and Iw) are likewise asymmetrical and distorted. Thus, when the back electromotive force exceeds the direct-current link voltage Vdc, too, the rotating electrical machine control device 1 identifies a switching element 3 having a short-circuit failure, based on the three-phase currents (Iu, Iv, and Iw).

When a switching element 3 having a short-circuit failure has been identified, the rotating electrical machine control device 1 controls drive of the rotating electrical machine 80 in the single inverter control region Rs to allow the vehicle to travel. For example, the operating point is moved from the fourth operating point Q4 to a fifth operating point Q5. The torque instruction at the fifth operating point Q5 is the first torque instruction T1 which is the same torque instruction as that at the first operating point Q1. Thus, although the rotational speed of the rotating electrical machine 80 decreases, the same torque as that before the short-circuit failure is outputted to drive the rotating electrical machine 80, by which traveling of the vehicle can be continued.

Figure 48:
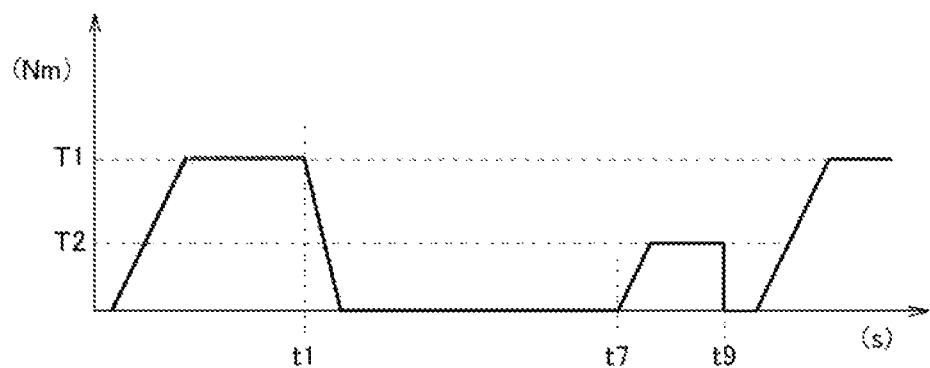
FIG. 48 is a diagram showing another example of a transition of torque instructions after occurrence of a short-circuit failure.

Note that although FIG. 47 exemplifies a mode in which the torque instruction is changed from the second torque instruction T2 to the first torque instruction T1, as exemplified in FIG. 48, the torque instruction may be brought to "zero" once from the second torque instruction T2, and then the torque instruction may be changed from zero to the first torque instruction T1.

Figure 49:
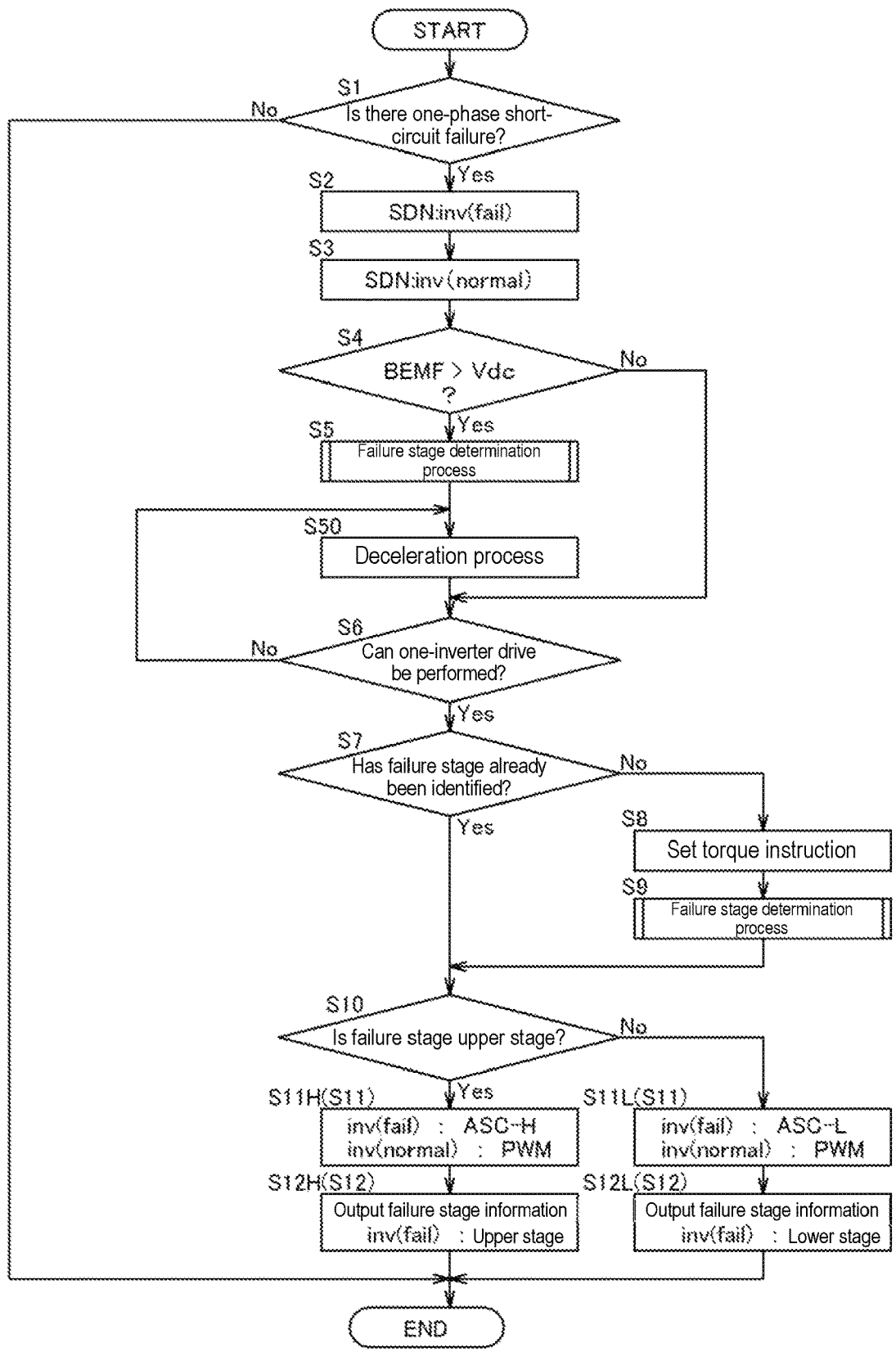
FIG. 49 is a flowchart showing an example of a procedure for identifying a location where a short-circuit failure has occurred.

A flowchart of FIG. 49 shows an example of a procedure for identifying a location where a short-circuit failure has occurred. When a current detection circuit or the like has detected occurrence of a short-circuit failure in the first inverter 11 or the second inverter 12, the rotating electrical machine control device 1 determines that a one-phase short-circuit failure has occurred (S1). As described above, the rotating electrical machine control device 1 has recognized which one of the inverters 10, the first inverter 11 or the second inverter 12, has the short-circuit failure, and first, the rotating electrical machine control device 1 performs shutdown control on a failed inverter (inv (fail)) which is an inverter 10 having the short-circuit failure (S2). The rotating electrical machine control device 1 then also performs shutdown control on a normal inverter (inv (normal)) which is an inverter 10 having no short-circuit failure (S3).

Subsequently, the rotating electrical machine control device 1 determines whether a back electromotive force (BEMF) has exceeded the direct-current link voltage Vdc (S4). Since the back electromotive force has linearity with the rotational speed of the rotating electrical machine 80, the rotating electrical machine control device 1 may perform this determination based on the rotational speed of the rotating electrical machine 80. That is, the rotating electrical machine control device 1 may determine whether the rotational speed of the rotating electrical machine 80 is higher than or equal to a defined rotational speed which is defined in advance. When the rotational speed is higher than or equal to the defined rotational speed, the rotating electrical machine control device 1 can determine that the back electromotive force (BEMF) has exceeded the direct-current link voltage Vdc. Note that this determination may be performed with reference to the modulation index. For example, when the modulation index is greater than or equal to a defined modulation index, the rotating electrical machine control device 1 can determine that the back electromotive force (BEMF) has exceeded the direct-current link voltage Vdc.

When the back electromotive force (BEMF) has exceeded the direct-current link voltage Vdc, as described above with reference to FIG. 45, the rotating electrical machine control device 1 determines, based on three-phase currents (Iu, Iv, and Iw), whether a switching element 3 having the short-circuit failure belongs to upper-stage-side arms or lower-stage-side arms. That is, the rotating electrical machine control device 1 performs a failure stage determination process (S5). In addition, after the failure stage determination process (S5), the rotating electrical machine control device 1 performs a deceleration process by reducing the rotational speed of the rotating electrical machine 80 by shutdown control (S50). Note that here, both inverters 10, the first inverter 11 and the second inverter 12, are shut down at step S2 and S3, and thus, step S50 has the same meaning as continuation of shutdown control.

When the back electromotive force (BEMF) has not exceeded the direct-current link voltage Vdc or after performing the failure stage determination process at step S5, the rotating electrical machine control device 1 determines whether a current operating point is in the single inverter control region Rs. That is, it is determined whether the rotating electrical machine 80 can be driven by one inverter 10 (S6). If one-inverter drive cannot be performed, then the deceleration process at step S50 is continued to reduce the rotational speed of the rotating electrical machine 80. By this, even if the operating point is outside the single inverter control region Rs, by repeating step S6 and S50, the rotational speed of the rotating electrical machine 80 decreases, resulting in satisfying a condition for determination at step S6.

When the operating point of the rotating electrical machine 80 is in the single inverter control region Rs, the rotating electrical machine control device 1 determines whether a failure stage has already been identified (S7). If a failure stage has been identified through step S5, then processing proceeds to step S10 which will be described later. On the other hand, if processing has not gone through step S5 or if a failure stage has not been identified even though processing has gone through step S5, then processing proceeds to step S8.

Step S8 is performed at, for example, the above-described third operating point Q3, and the second torque instruction T2 is set as a torque instruction. Subsequently, the rotating electrical machine control device 1 determines, for example, at the fourth operating point Q4, whether a switching element 3 having the short-circuit failure belongs to upper-stage-side arms or lower-stage-side arms, based on three-phase currents (Iu, Iv, and Iw). That is, the rotating electrical machine control device 1 performs a failure stage determination process (S9).

At step S10 subsequent to step S7 or S9, it is determined whether the failure stage is an upper stage. Before step S10 it has been determined at step S5 or S9 whether a switching element 3 having the short-circuit failure belongs to upper-stage-side arms or lower-stage-side arms, based on three-phase currents (Iu, Iv, and Iw). Thus, based on results of those determinations, the rotating electrical machine control device 1 determines whether the failure stage is an upper stage or a lower stage.

If the failure stage is an upper stage, then the rotating electrical machine control device 1 performs upper-stage-side active short-circuit control (ASC-H) on the failed inverter (inv (fail)), and performs pulse width modulation control (PWM) on the normal inverter (inv (normal)) (S11H (S11)). In addition, if the failure stage is a lower stage, then the rotating electrical machine control device 1 performs lower-stage-side active short-circuit control (ASC-L) on the failed inverter (inv (fail)), and performs pulse width modulation control (PWM) on the normal inverter (inv (normal)) (S11L (S11)). These steps S11 are performed at the fifth operating point Q5 in FIG. 44.

In addition, the rotating electrical machine control device 1 outputs information on the failure stage having the short-circuit failure to a higher-level control device, etc. (not shown) (S12). Specifically, information on the failed inverter (the first inverter 11 or the second inverter 12) and information indicating which one of a set of upper-stage-side arms and a set of lower-stage-side arms of the failed inverter has the short-circuit failure are outputted. Furthermore, information indicating which one of the plurality of phases may be outputted.

Note that a mode described above with reference to FIG. 49 shows an example in which when a short-circuit failure has been detected at step S1, the rotating electrical machine control device 1 performs shutdown control on both inverters 10, and then performs a failure stage determination process at step S5. However, the failure stage determination process (S5) may be performed without performing shutdown control.

In addition, the mode described above with reference to FIG. 49 shows an example in which the rotational speed of the rotating electrical machine 80 is reduced until the operating point reaches inside the single inverter control region Rs. However, it does not prohibit the rotating electrical machine control device 1 from performing a failure stage determination process (S9) in a state in which the operating point is outside the single inverter control region Rs, and then reducing the rotational speed of the rotating electrical machine 80 until the operating point reaches inside the single inverter control region Rs.

In addition, the mode described above with reference to FIG. 49 shows an example in which when the back electromotive force (BEMF) has not exceeded the direct-current link voltage Vdc, the rotating electrical machine control device 1 reduces the rotational speed of the rotating electrical machine 80 until the operating point reaches inside the single inverter control region Rs, and then performs a failure stage determination process (S9). However, it does not prohibit the rotating electrical machine control device 1 from reducing the rotational speed of the rotating electrical machine 80 until the operating point reaches inside the single inverter control region Rs even if the back electromotive force (BEMF) has exceeded the direct-current link voltage Vdc, and then setting a torque instruction at step S8 and performing the failure stage determination process (S9).

Figure 50:
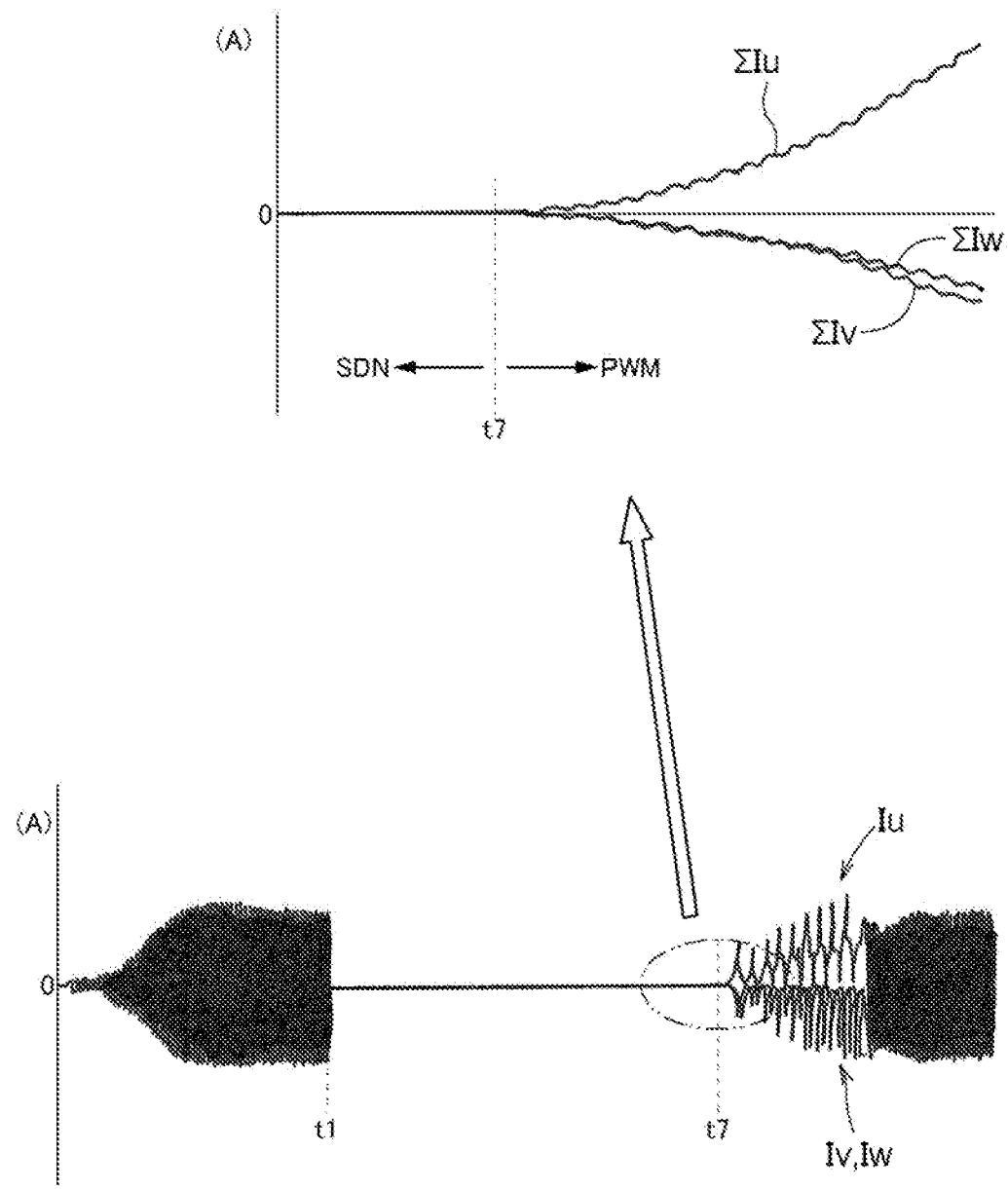
FIG. 50 is a diagram showing an example of waveforms of integrated currents.
Figure 51:
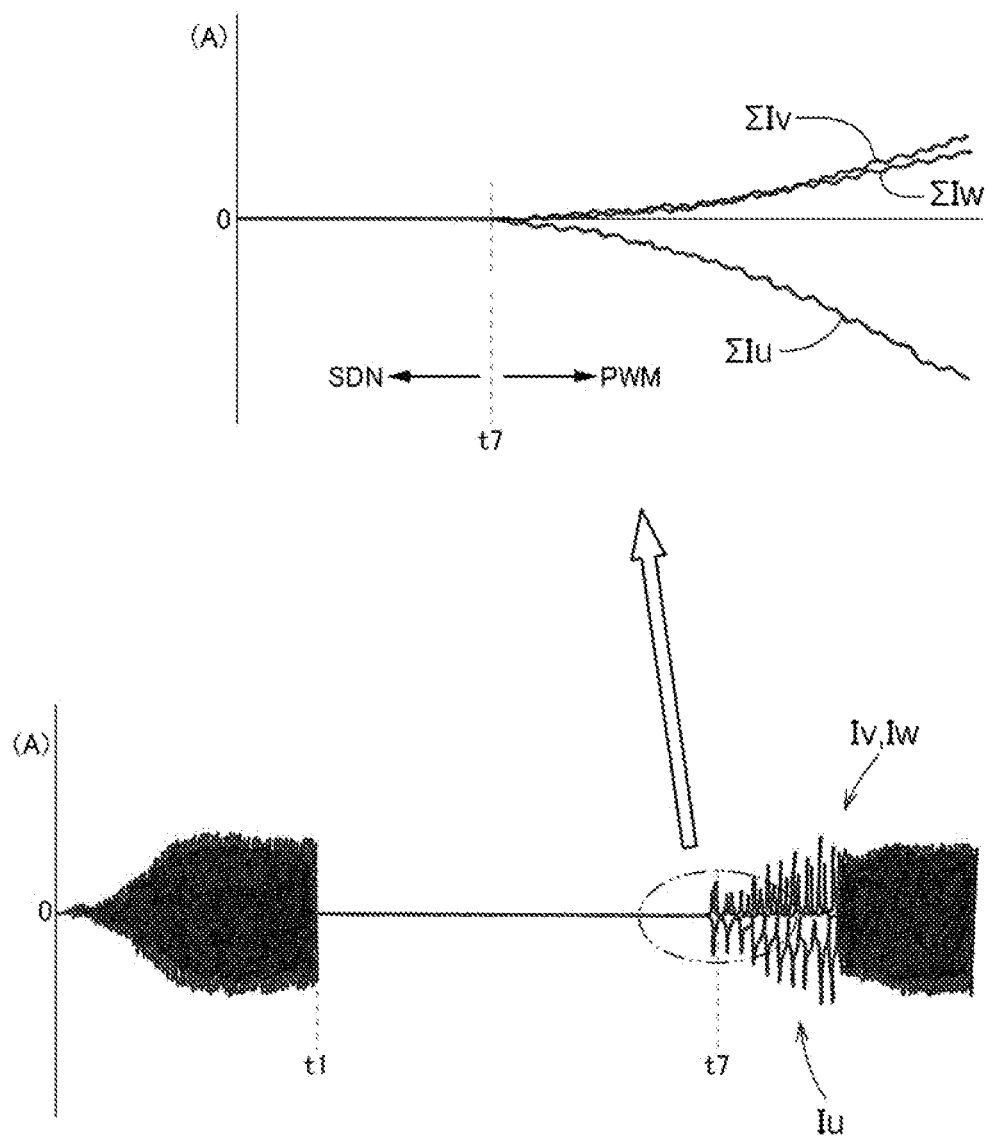
FIG. 51 is a diagram showing an example of waveforms of integrated currents.
Figure 52:
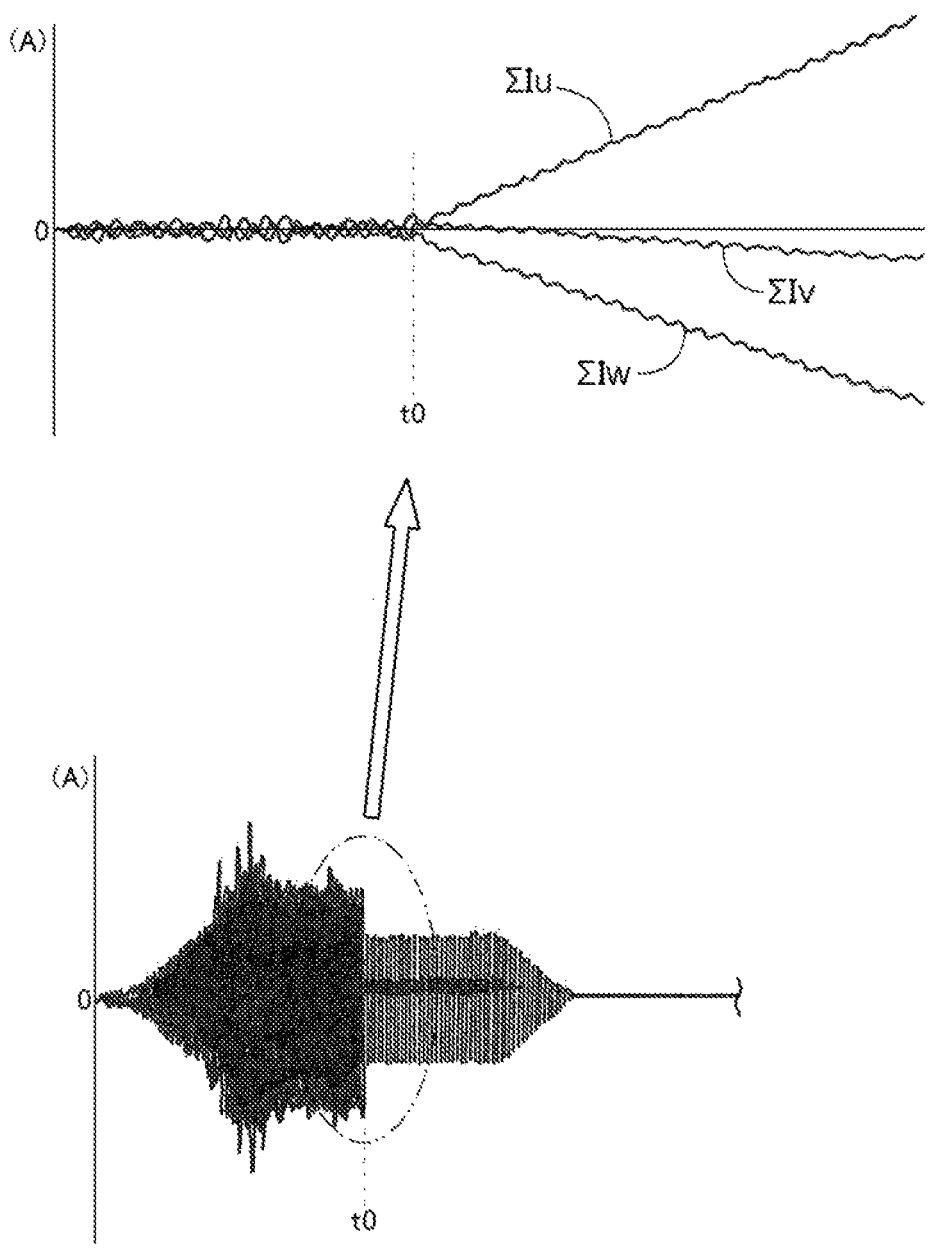
FIG. 52 is a diagram showing an example of waveforms of integrated currents.
Figure 53:
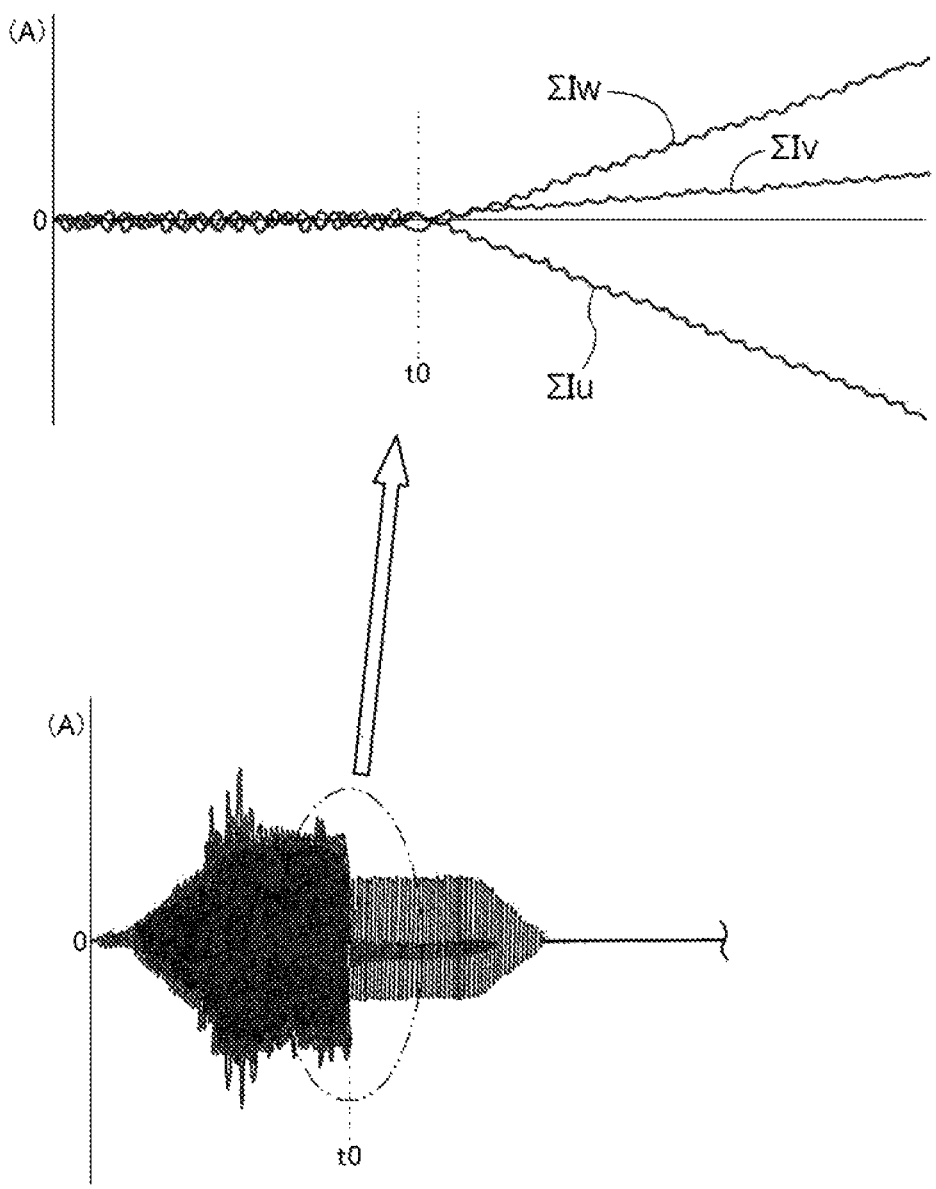
FIG. 53 is a diagram showing an example of waveforms of integrated currents.

With reference to FIGS. 50 to 53, a principle of identifying a switching element 3 having a short-circuit failure will be described below. FIGS. 50 and 51 are diagrams for describing a principle of determination in the failure stage determination process at step S9 of FIG. 49. FIG. 50 shows a case in which the upper-stage-side switching element 3H of the U-phase in the first inverter 11 has a short-circuit failure, and FIG. 51 shows a case in which the lower-stage-side switching element 3L of the U-phase in the first inverter 11 has a short-circuit failure. FIGS. 52 and 53 are diagrams for describing a principle of determination in the failure stage determination process at step S5 of FIG. 49. FIG. 52 shows a case in which the upper-stage-side switching element 3H of the U-phase in the first inverter 11 has a short-circuit failure, and FIG. 53 shows a case in which the lower-stage-side switching element 3L of the U-phase in the first inverter 11 has a short-circuit failure.

With an inverter in which a short-circuit failure has occurred being a failed inverter, the rotating electrical machine control device 1 adds up each of alternating currents of a plurality of phases to compute current integrated values for the respective phases, and determines which one of a set of upper-stage-side arms and a set of lower-stage-side arms of the failed inverter has the short-circuit failure, based on the positive and negative polarities of each of the current integrated values. Here, the failed inverter is the first inverter 11. In addition, the alternating currents of a plurality of phases are three-phase currents (a U-phase current Iu, a V-phase current Iv, and a W-phase current Iw). In addition, the current integrated values for the respective phases are a U-phase integrated current $\Sigma Iu$, a V-phase integrated current $\Sigma Iv$, and a W-phase integrated current $\Sigma Iw$.

As exemplified in FIG. 47, when torque control (pulse width modulation control) is performed in a state in which the upper-stage-side switching element 3H of the U-phase in the first inverter 11 has a short-circuit failure, the waveforms of three-phase currents are asymmetrical and distorted. As shown in FIGS. 47 and 50, the waveforms are such that the U-phase current Iu is greatly biased toward the positive side and the V-phase current Iv and the W-phase current Iw are greatly biased toward the negative side. Here, the rotating electrical machine control device 1 adds up the three-phase currents (the U-phase current Iu, the V-phase current Iv, and the W-phase current Iw) over a predetermined period of time (e.g., 200 [ms]). As shown in FIG. 50, the U-phase integrated current $\Sigma Iu$ obtained by adding up the U-phase current Iu that is greatly biased toward the positive side increases toward the positive side (the waveform rises). In addition, the V-phase integrated current $\Sigma Iv$ and the W-phase integrated current $\Sigma Iw$ that are obtained by adding up the V-phase current Iv and the W-phase current Iw that are greatly biased toward the negative side increase toward the negative side (the values decrease and the waveforms drop).

The rotating electrical machine control device 1 sets a predefined integration threshold value for the positive side and the negative side, and when a current has exceeded the integration threshold value toward the positive side or the negative side, the rotating electrical machine control device 1 determines that a short-circuit failure has occurred, and can identify a short-circuit failure occurrence pattern. Here, a positive-side integration threshold value is "Ith+" and a negative-side integration threshold value is "Ith−". In a mode exemplified in FIG. 50, when the following condition holds true, it is determined that a short-circuit failure has occurred. This condition is a first pattern.

$$(\Sigma Iu > Ith+) \&\& (\Sigma Iv < Ith-) \&\& (\Sigma Iw < Ith-)$$

Note that this condition also holds true when the lower-stage-side switching element 3L of the U-phase in the second inverter 12 has a short-circuit failure, in addition to when the upper-stage-side switching element 3H of the U-phase in the first inverter 11 has a short-circuit failure.

In addition, when torque control (pulse width modulation control) is performed in a state in which the lower-stage-side switching element 3L of the U-phase in the first inverter 11 has a short-circuit failure, too, as shown in the bottom of FIG. 51, the waveforms of three-phase currents are asymmetrical and distorted. As shown in FIG. 51, the waveforms are such that the U-phase current Iu is greatly biased toward the negative side and the V-phase current Iv and the W-phase current Iw are greatly biased toward the positive side. As shown in FIG. 51, the U-phase integrated current $\Sigma Iu$ obtained by adding up the U-phase current Iu that is greatly biased toward the negative side increases toward the negative side (the value decreases and the waveform drops). In addition, the V-phase integrated current $\Sigma Iv$ and the W-phase integrated current $\Sigma Iw$ that are obtained by adding up the V-phase current Iv and the W-phase current Iw that are greatly biased toward the positive side increase toward the positive side (the waveforms rise). In a mode exemplified in FIG. 51, when the following condition holds true, it is determined that a short-circuit failure has occurred. This condition is a second pattern.

$$(\Sigma Iu < Ith-) \&\& (\Sigma Iv > Ith+) \&\& (\Sigma Iw > Ith+)$$

Note that this condition also holds true when the upper-stage-side switching element 3H of the U-phase in the second inverter 12 has a short-circuit failure, in addition to when the lower-stage-side switching element 3L of the U-phase in the first inverter 11 has a short-circuit failure.

As shown in the following table 9, there are six types of conditions, from the first pattern to a sixth pattern, that hold true when 12 switching elements 3 included in the first inverter 11 and the second inverter 12 have a short-circuit failure. In the following description, each switching element 3 is represented using identification symbols for three phases (U, V, and W), identification numbers for the first inverter 11 and the second inverter 12 (1 and 2), and identification symbols for an upper-stage-side switching element 3H and a lower-stage-side switching element 3L (H and L). For example, the upper-stage-side switching element 3H of the U-phase in the first inverter 11 is represented as "U1H", and the lower-stage-side switching element 3L of the W-phase in the second inverter 12 is represented as "W2L".

TABLE 9

| Pattern | Condition for determination | Failure location |
|---|---|---|
| 1 | ($\Sigma$Iu > Ith+) && ($\Sigma$Iv < Ith−) && ($\Sigma$Iw < Ith−) | U1H, U2L |
| 2 | ($\Sigma$Iu < Ith−) && ($\Sigma$Iv > Ith+) && ($\Sigma$Iw > Ith+) | U1L, U2H |
| 3 | ($\Sigma$Iu < Ith−) && ($\Sigma$Iv > Ith+) && ($\Sigma$Iw < Ith−) | V1H, V2L |
| 4 | ($\Sigma$Iu > Ith+) && ($\Sigma$Iv < Ith−) && ($\Sigma$Iw > Ith+) | V1L, V2H |
| 5 | ($\Sigma$Iu < Ith−) && ($\Sigma$Iv < Ith−) && ($\Sigma$Iw > Ith+) | W1H, W2L |
| 6 | ($\Sigma$Iu > Ith+) && ($\Sigma$Iv > Ith+) && ($\Sigma$Iw < Ith−) | W1L, W2H |

As described above, at step S1 of FIG. 49, which one of the inverters 10, the first inverter 11 or the second inverter 12, has a short-circuit failure is known. Thus, when it is determined, at step S9 of FIG. 49, which one of the first to sixth patterns a condition to hold corresponds to, it can be determined in which one of a set of upper-stage-side arms and a set of lower-stage-side arms and in which one of the inverters 10 the short-circuit failure has occurred. For example, when a short-circuit failure has occurred in the first inverter 11 and a condition of the fourth pattern is satisfied, it is determined that the short-circuit failure has occurred in the lower-stage-side arms of the first inverter 11. In the present embodiment, furthermore, it is also determined which one of the switching elements 3 in the lower-stage-side arms has the short-circuit failure. In this example, it is determined that the lower-stage-side switching element 3L of the V-phase (V1L) in the first inverter 11 has the short-circuit failure.

As described above, step S9 is performed when the rotational speed of the rotating electrical machine 80 is lower than the defined rotational speed (or less than the defined modulation index). The rotating electrical machine control device 1 performs torque control on the first inverter 11 and the second inverter 12, based on a torque instruction less than or equal to defined torque which is defined in advance (e.g., the second torque instruction T2 shown in FIGS. 44 and 47). Then, during performance of the torque control, the rotating electrical machine control device 1 determines which one of a set of upper-stage-side arms and a set of lower-stage-side arms of a failed inverter has a short-circuit failure, based on the positive and negative polarities of each of current integrated values (a U-phase integrated current $\Sigma$Iu, a V-phase integrated current $\Sigma$Iv, and a W-phase integrated current $\Sigma$Iw).

As such, in a case in which the first inverter 11 is a failed inverter, when a current integrated value for one phase among a plurality of current integrated values (a U-phase integrated current $\Sigma$Iu, a V-phase integrated current $\Sigma$Iv, and a W-phase integrated current $\Sigma$Iw) is positive and current integrated values for other phases are negative, it is determined that a short-circuit failure has occurred in upper-stage-side arms of the failed inverter (table 9: patterns 1, 3, and 5), and when a current integrated value for one phase among the plurality of current integrated values is negative and current integrated values for other phases are positive, it is determined that a short-circuit failure has occurred in lower-stage-side arms of the failed inverter (table 9: patterns 2, 4, and 6). In addition, in a case in which the second inverter 12 is a failed inverter, when a current integrated value for one phase among a plurality of current integrated values is positive and current integrated values for other phases are negative, it is determined that a short-circuit failure has occurred in lower-stage-side arms of the failed inverter (table 9: patterns 1, 3, and 5), and when a current integrated value for one phase among the plurality of current integrated values is negative and current integrated values for other phases are positive, it is determined that a short-circuit failure has occurred in upper-stage-side arms of the failed inverter (table 9: patterns 2, 4, and 6).

The same can also be said for a case in which the rotational speed of the rotating electrical machine 80 is higher than or equal to the defined rotational speed (or greater than or equal to the defined modulation index). When the rotational speed of the rotating electrical machine 80 is higher than or equal to the defined rotational speed, the rotating electrical machine control device 1 performs shutdown control in which all switching elements 3 in both inverters 10, the first inverter 11 and the second inverter 12, are brought into off state. Then, during performance of the shutdown control, the rotating electrical machine control device 1 determines which one of a set of upper-stage-side arms and a set of lower-stage-side arms of the failed inverter has a short-circuit failure, based on the positive and negative polarities of each of current integrated values.

When the upper-stage-side switching element 3H of the U-phase in the first inverter 11 (U1H) has a short-circuit failure, shutdown control is performed, and the rotational speed of the rotating electrical machine 80 is higher than or equal to the defined rotational speed, too, the waveforms of three-phase currents are asymmetrical and distorted. As shown in FIG. 52, waveforms are such that a U-phase current Iu is greatly biased toward the positive side and a V-phase current Iv and a W-phase current Iw are greatly biased toward the negative side. As shown in FIG. 52, a U-phase integrated current Iu obtained by adding up the U-phase current Iu that is greatly biased toward the positive side increases toward the positive side (the waveform rises). In addition, a V-phase integrated current $\Sigma$Iv and a W-phase integrated current Iw that are obtained by adding up the V-phase current Iv and the W-phase current Iw that are greatly biased toward the negative side increase toward the negative side (the values decrease and the waveforms drop). These trends are the same as those in the mode shown in FIG. 50. In a mode exemplified in FIG. 52, when the following condition holds true, it is determined that a short-circuit failure has occurred. This condition is the same as the first pattern shown in the above-described table 9.

($\Sigma Iu$>$Ith+$)&&($\Sigma Iv$<$Ith-$)&&($\Sigma Iw$<$Ith-$)

As with the above description, this condition also holds true when the lower-stage-side switching element 3L of the U-phase in the second inverter 12 (U2L) has a short-circuit failure, in addition to when the upper-stage-side switching element 3H of the U-phase in the first inverter 11 (U1H) has a short-circuit failure.

In addition, when shutdown control is performed in a state in which the lower-stage-side switching element 3L of the U-phase in the first inverter 11 (U1L) has a short-circuit failure, too, as shown in the bottom of FIG. 53, the waveforms of three-phase currents are asymmetrical and distorted. As shown in FIG. 53, the waveforms are such that a U-phase current Iu is greatly biased toward the negative side and a V-phase current Iv and a W-phase current Iw are greatly biased toward the positive side. As shown in FIG. 53, a U-phase integrated current ΣIu obtained by adding up the U-phase current Iu that is greatly biased toward the negative side increases toward the negative side (the value decreases and the waveform drops). In addition, a V-phase integrated current ΣIv and a W-phase integrated current ΣIw that are obtained by adding up the V-phase current Iv and the W-phase current Iw that are greatly biased toward the positive side increase toward the positive side (the waveforms rise). These trends are the same as those in the mode shown in FIG. 51. In a mode exemplified in FIG. 53, too, when the following condition holds true, it is determined that a short-circuit failure has occurred. This condition is the same as the second pattern shown in the above-described table 9.

(ΣIu<Ith−)&&(ΣIv>Ith+)&&(ΣIw>Ith+)

As with the above description, this condition also holds true when the upper-stage-side switching element 3H of the U-phase in the second inverter 12 (U2H) has a short-circuit failure, in addition to when the lower-stage-side switching element 3L of the U-phase in the first inverter 11 (U1L) has a short-circuit failure.

As such, when the rotational speed of the rotating electrical machine 80 is higher than or equal to the defined rotational speed, too, likewise, at step S5, a switching element 3 having a short-circuit failure can be identified in accordance with the conditions in the above-described table 9.

As has been described above, according to the present embodiment, when a short-circuit failure has occurred in one of the switching elements 3 included in the two inverters 10 that are provided at respective both ends of the open-end windings, the failed switching element 3 can be identified. Then, without using the failed switching element 3, control of the rotating electrical machine 80 can be continued.

Here, of the first inverter 11 and the second inverter 12, an inverter 10 that is different from a failed inverter is a normal inverter, and either one of a set of upper-stage-side arms and a set of lower-stage-side arms of the failed inverter that has a short-circuit failure is failure-side arms and the other one is non-failure-side arms. The rotating electrical machine control device 1 performs active short-circuit control in which all switching elements 3 in the failure-side arms of the failed inverter are brought into on state, and all switching elements 3 in the non-failure-side arms are brought into off state, and performs single inverter drive control in which the rotating electrical machine 80 is driven through the normal inverter.

For example, as described above, when the upper-stage-side switching element 3H (31H) of the U-phase in the first inverter 11 has a short-circuit failure, the first inverter 11 is a failed inverter and the second inverter 12 is a normal inverter. The upper-stage-side arms of the first inverter 11 are failure-side arms, and the lower-stage-side arms of the first inverter 11 are non-failure-side arms. The rotating electrical machine control device 1 performs upper-stage-side active short-circuit control (ASC-H) in which all switching elements 3 in the upper-stage-side arms of the first inverter 11 are brought into on state, and all switching elements 3 in the lower-stage-side arms of the first inverter 11 are brought into off state, and performs single inverter drive control in which the rotating electrical machine 80 is driven through the second inverter 12.

Figure 54:
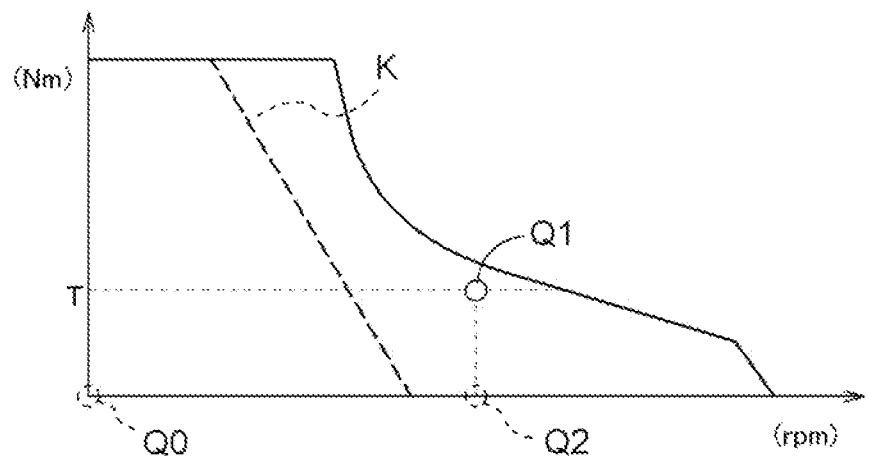
FIG. 54 is a diagram showing an example of control regions of a rotating electrical machine in the one-inverter system.
Figure 55:
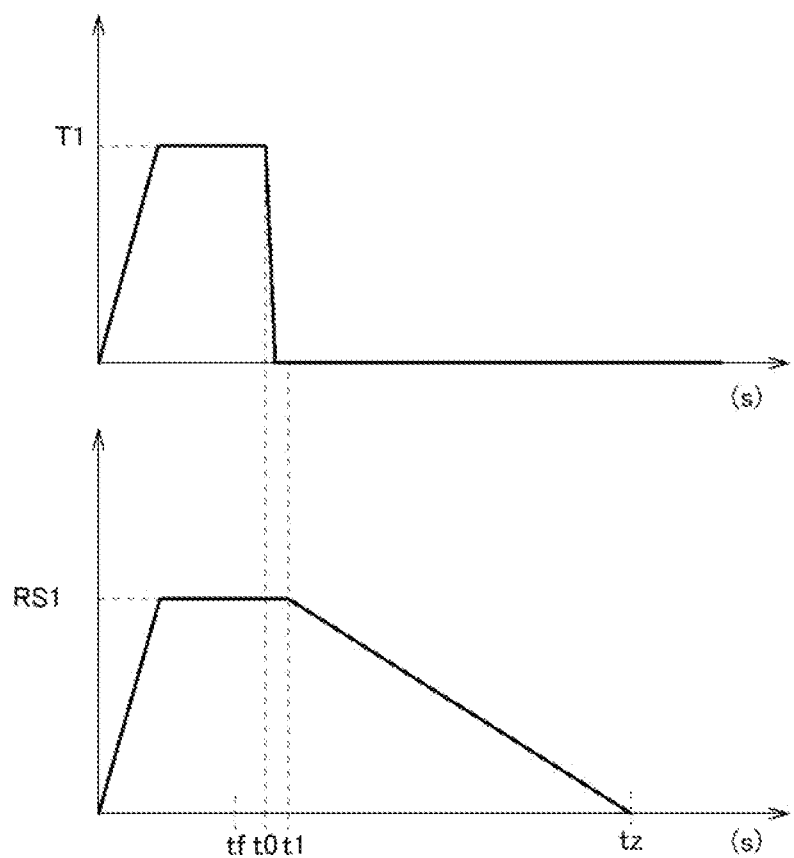
FIG. 55 is a diagram showing a torque instruction and rotational speed after occurrence of a short-circuit failure in the one-inverter system.

FIG. 54 shows, as a comparative example, an example of control regions of the rotating electrical machine 80B in the one-inverter system. In addition, FIG. 55 shows a torque instruction and the rotational speed of the rotating electrical machine 80B after occurrence of a short-circuit failure in the one-inverter system. When a short-circuit failure has occurred at time tf at which the rotating electrical machine 80B is operating at a first operating point Q1, by detection of a short circuit, shutdown control is immediately performed at time t0. To handle large current that flows by performance of the shutdown control, active short-circuit control is immediately performed at time t1. By the active short-circuit control, the rotational speed of the rotating electrical machine 80B decreases, and at time tz, the rotational speed of the rotating electrical machine 80B reaches "zero", by which the rotating electrical machine 80B stops. That is, the rotating electrical machine 80B is controlled such that the operating point moves toward a point of origin Q0 via a second operating point Q2. As such, in the one-inverter system, when a short-circuit failure has occurred, drive of the rotating electrical machine 80B cannot be continued and traveling of the vehicle cannot be continued, either.

However, according to the present embodiment, as described above, when a short-circuit failure has occurred in one of the switching elements 3 included in the two inverters 10 that are provided at respective both ends of the open-end windings, a failure location can be identified.

Summary of the Embodiment

A summary of the rotating electrical machine control device (1) described above will be briefly described below.

(1-1) In one aspect, in a rotating electrical machine control device (1) that controls, through a first inverter (11) and a second inverter (12), drive of a rotating electrical machine (80) having open-end windings (8) of a plurality of phases that are independent of each other, the first inverter (11) is connected to a one-end side of the open-end windings (8) of a plurality of phases to convert electric power between direct current and alternating currents of a plurality of phases, the second inverter (12) is connected to an other-end side of the open-end windings (8) of a plurality of phases to convert electric power between direct current and alternating currents of a plurality of phases, in the first inverter (11) and the second inverter (12), each arm (3A) for one alternating-current phase includes a series circuit of an upper-stage-side switching element (3H) and a lower-stage-side switching element (3L), the first inverter (11) and the second inverter (12) can be controlled independently of each other, when an open-circuit failure in which one switching element (3) is always in an open-circuit state has occurred in either one of inverters (10), the first inverter (11) or the second inverter (12), each of alternating currents of a plurality of phases (Iu, Iv, and Iw) is added up to compute current integrated values for the respective phases (ΣIu, ΣIv, and ΣIw), and occurrence of the open-circuit failure is detected based on positive and negative polarities of each of the current integrated values (ΣIu, ΣIv, and ΣIw), and a location where the open-circuit failure has occurred is determined, and when occurrence of the open-circuit failure has been detected upon controlling both of the inverters (10), the first inverter

(11) and the second inverter (12), by mixed pulse width modulation control in which control is performed such that a plurality of pulses with different patterns are outputted during a first period which is a ½ cycle of electrical angle and an inactive state continues during a second period which is the other ½ cycle, it is determined which one of a first failure pattern (FP1) and a second failure pattern (FP2) is a failure pattern (FP), based on positive and negative polarities of each of the current integrated values ($\Sigma Iu$, $\Sigma Iv$, and $\Sigma Iw$) in a first control state, the first failure pattern (FP1) being a pattern in which one of a set of upper-stage-side arms of the first inverter (11) and a set of lower-stage-side arms of the second inverter (12) is failure-side arms in which the open-circuit failure has occurred, and the second failure pattern (FP2) being a pattern in which one of a set of the lower-stage-side arms of the first inverter (11) and a set of the upper-stage-side arms of the second inverter (12) is the failure-side arms, it is determined which one of a first lower-stage-side failure pattern (LF1) and a second lower-stage-side failure pattern (LF2) is a lower-stage-side failure pattern (LF), based on each of the current integrated values ($\Sigma Iu$, $\Sigma Iv$, and $\Sigma Iw$) in a second control state different from the first control state, the first lower-stage-side failure pattern (LF1) being a pattern in which the lower-stage-side arms of the second inverter (12) are the failure-side arms, and the second lower-stage-side failure pattern (LF2) being a pattern in which the lower-stage-side arms of the first inverter (11) are the failure-side arms, and it is determined which one of a set of the upper-stage-side arms of the first inverter (11), a set of the lower-stage-side arms of the first inverter (11), a set of the upper-stage-side arms of the second inverter (12), and a set of the lower-stage-side arms of the second inverter (12) is the failure-side arms, based on a result of the determination in the first control state and a result of the determination in the second control state.

According to experiments and simulations performed by the inventors, it has been confirmed that when an open-circuit failure of a switching element (3) has occurred in either one of the two inverters (10), the waveforms of three-phase currents are asymmetrical and distorted. For example, the waveform of an alternating current of a given phase is greatly biased toward the positive side, and the waveform of an alternating current of another phase is greatly biased toward the negative side. When alternating currents (Iu, Iv, and Iw) are added up over a predetermined period of time, these bias trends appear more remarkably. A bias direction varies depending on the location of a switching element (3) having an open-circuit failure. Thus, on the basis of the positive and negative polarities of current integrated values ($\Sigma Iu$, $\Sigma Iv$, and $\Sigma Iw$), it can be determined that an open-circuit failure has occurred and determined in which one of a set of upper-stage-side arms and a set of lower-stage-side arms and in which one of the inverters (10) the open-circuit failure has occurred. In addition, according to experiments and simulations performed by the inventors, in the second control state, when an open-circuit failure has occurred in upper-stage-side arms, detection of the open-circuit failure itself is difficult, but when an open-circuit failure has occurred in lower-stage-side arms, it is possible to detect the open-circuit failure and to determine which one of the inverters (10) has the failure. In the first control state, regardless of which one of a set of upper-stage-side arms and a set of lower-stage-side arms has an open-circuit failure, it is possible to detect the open-circuit failure. However, in the first control state, although it can be determined whether a failure pattern (FP) is the first failure pattern (FP1) or the second failure pattern (FP2), it cannot be determined which one of the inverters (10) has the open-circuit failure. According to this configuration, when an open-circuit failure has occurred in lower-stage-side arms, failure-side arms can be determined based on at least a result of determination in the second control state. In addition, regardless of which one of a set of upper-stage-side arms and a set of lower-stage-side arms has an open-circuit failure, failure-side arms can be determined on the basis of both a result of determination in the first control state and a result of determination in the second control state. As such, according to this configuration, when an open-circuit failure has occurred in one of the switching elements (3) included in the two inverters (10) that are provided at respective both ends of the open-end windings (8), a failure location can be identified.

(1-2) It is preferred that in the rotating electrical machine control device (1), when the failure pattern (FP) is determined to be the first failure pattern (FP1) in the first control state, and the lower-stage-side failure pattern (LF) is determined in the second control state, it be determined that the lower-stage-side arms of the second inverter (12) are the failure-side arms, when the failure pattern (FP) is determined to be the first failure pattern (FP1) in the first control state, and the lower-stage-side failure pattern (LF) is not determined in the second control state, it be determined that the upper-stage-side arms of the first inverter (11) are the failure-side arms, when the failure pattern (FP) is determined to be the second failure pattern (FP2) in the first control state, and the lower-stage-side failure pattern (LF) is determined in the second control state, it be determined that the lower-stage-side arms of the first inverter (11) are the failure-side arms, and when the failure pattern (FP) is determined to be the second failure pattern (FP2) in the first control state, and the lower-stage-side failure pattern (LF) is not determined in the second control state, it be determined that the upper-stage-side arms of the second inverter (12) are the failure-side arms.

According to this configuration, failure-side arms can be appropriately identified based on a failure pattern (FP) determined in the first control state and a result of determination as to whether the lower-stage-side failure pattern (LF) is present which is made in the second control state.

(1-3) In addition, it is preferred that in the rotating electrical machine control device (1), when the current integrated value for one phase among a plurality of the current integrated values ($\Sigma Iu$, $\Sigma Iv$, and $\Sigma Iw$) is negative and the current integrated values for other phases are positive, it be determined that the failure pattern (FP) is the first failure pattern (FP1), and when the current integrated value for one phase among a plurality of the current integrated values ($\Sigma Iu$, $\Sigma Iv$, and $\Sigma Iw$) is positive and the current integrated values for other phases are negative, it be determined that the failure pattern (FP) is the second failure pattern (FP2).

It has been confirmed by experiments and simulations performed by the inventors that in the first control state, an alternating current of a phase including a switching element (3) having an open-circuit failure is biased in a trend different from trends of alternating currents of other phases. Thus, a failure location can be identified based on bias trends such as those described above.

(1-4) In addition, it is preferred that in the rotating electrical machine control device (1), when the current integrated value for one phase among a plurality of the current integrated values ($\Sigma Iu$, $\Sigma Iv$, and $\Sigma Iw$) is negative and the current integrated values for other phases are positive, it be determined that the lower-stage-side failure pattern (LF) is the first lower-stage-side failure pattern (LF1), and when the current integrated value for one phase among a plurality of the current integrated values (ΣIu, ΣIv, and ΣIw) is positive and the current integrated values for other phases are negative, it be determined that the lower-stage-side failure pattern (LF) is the second lower-stage-side failure pattern (LF2).

It has been confirmed by experiments and simulations performed by the inventors that in the second control state, an alternating current of a phase including a switching element (3) having an open-circuit failure is biased in a trend different from trends of alternating currents of other phases. Thus, a failure location can be identified based on bias trends such as those described above.

(1-5) In addition, it is preferred that the first control state be powering at a rotational speed of the rotating electrical machine (80) that is higher than or equal to a first defined rotational speed which is defined in advance, and the second control state be regeneration.

According to experiments and simulations performed by the inventors, it has been confirmed that when switching control is performed on the inverters (10) by mixed pulse width modulation control in a case in which an open-circuit failure has occurred, the behavior of alternating currents (Iu, Iv, and Iw) differs between powering and regeneration. Thus, by considering the first control state to be powering and the second control state to be regeneration, a failure-side arm can be appropriately determined.

(1-6) In addition, it is preferred that in the rotating electrical machine control device (1), the second control state be regeneration, and when occurrence of the open-circuit failure has been detected in the second control state, regeneration failure action in which distortion of alternating currents of a plurality of phases (Iu, Iv, and Iw) caused by the open-circuit failure is suppressed be performed.

According to experiments and simulations performed by the inventors, when an open-circuit failure has occurred in upper-stage-side arms, large distortion does not occur in the waveforms of alternating currents (Iu, Iv, and Iw) in the second control state. Thus, even if an open-circuit failure has occurred in upper-stage-side arms, in the second control state, under a certain condition, the inverters (10) can be still controlled in the same manner as in a case with no open-circuit failure. According to this configuration, by performing regeneration failure action in which distortion of alternating currents of a plurality of phases (Iu, Iv, and Iw) caused by an open-circuit failure is suppressed, even if an open-circuit failure has occurred, the inverters (10) can be controlled in the same manner as in a case with no open-circuit failure.

(1-7) Here, it is preferred that the regeneration failure action be such that a switching pattern for the upper-stage-side arms of the first inverter (11) and a switching pattern for the lower-stage-side arms of the second inverter (12) are interchanged, and a switching pattern for the lower-stage-side arms of the first inverter (11) and a switching pattern for the upper-stage-side arms of the second inverter (12) are interchanged, or that a switching pattern for the upper-stage-side arms of the first inverter (11) and a switching pattern for the lower-stage-side arms are interchanged, and a switching pattern for the upper-stage-side arms of the second inverter (12) and a switching pattern for the lower-stage-side arms are interchanged, and furthermore, the positive and negative polarities of each of the alternating currents of a plurality of phases (Iu, Iv, and Iw) are reversed.

According to experiments and simulations performed by the inventors, when an open-circuit failure has occurred in upper-stage-side arms, large distortion does not occur in the waveforms of alternating currents (Iu, Iv, and Iw) in the second control state. According to this configuration, by apparently interchanging upper-stage-side arms and lower-stage-side arms, failure-side arms having an open-circuit failure are made to be upper-stage-side arms, by which alternating currents (Iu, Iv, and Iw) with suppressed distortion can be obtained.

(1-8) Here, it is preferred that the rotational speed of the rotating electrical machine (80) be reduced by regeneration.

According to this configuration, by reducing the rotational speed of the rotating electrical machine (80) by regenerative operation for determining a failure location, a lead time before next control such as driving of the rotating electrical machine (80) using one inverter (10) after determining a failure location can be reduced.

(1-9) In addition, it is preferred that the first control state be powering at a rotational speed of the rotating electrical machine (80) that is higher than or equal to a first defined rotational speed which is defined in advance, and the second control state be powering at a rotational speed of the rotating electrical machine (80) that is lower than or equal to a second defined rotational speed lower than the first defined rotational speed.

According to experiments and simulations performed by the inventors, it has been confirmed that when switching control is performed on the inverters (10) by mixed pulse width modulation control in a case in which an open-circuit failure has occurred, even if the same powering is performed, the behavior of alternating currents (Iu, Iv, and Iw) varies depending on the rotational speed. It has been confirmed that particularly, when the rotational speed is low, the same behavior as that for regeneration is exhibited. Thus, by considering the first control state to be powering and the second control state to be powering performed at a rotational speed lower than that for the first control state, a failure-side arm can be appropriately determined.

(1-10) In addition, it is preferred that in the rotating electrical machine control device (1), in the first control state, occurrence of the open-circuit failure be detected and the failure pattern (FP) be determined, and thereafter, in the second control state, the lower-stage-side failure pattern (LF) be determined, and thereafter, the failure-side arms be determined based on a result of the determination in the first control state and a result of the determination in the second control state.

According to this configuration, by performing control that implements the first control state and control that implements the second control state in turn, failure-side arms can be appropriately determined.

(1-11) In addition, it is preferred that in the rotating electrical machine control device (1), in the first control state, after detecting occurrence of the open-circuit failure and determining the failure pattern (FP), when the rotational speed of the rotating electrical machine (80) is higher than or equal to a first defined rotational speed which is defined in advance, the lower-stage-side failure pattern (LF) be determined with the second control state being regeneration, and when the rotational speed of the rotating electrical machine (80) is lower than the first defined rotational speed, the lower-stage-side failure pattern (LF) be determined with the second control state being powering at a rotational speed lower than or equal to a second defined rotational speed which is lower than the first defined rotational speed.

When a control mode is changed from powering to regeneration, the rotational speed of the rotating electrical machine (80) decreases. When the rotational speed of the rotating electrical machine (80) is low, by regeneration, there is a possibility that the rotating electrical machine (80)

may stop. According to this configuration, when the rotational speed of the rotating electrical machine (80) is lower than the first defined rotational speed, powering at a rotational speed lower than or equal to the first defined rotational speed is performed instead of regeneration, and thus, a failure location can be appropriately determined without stopping the rotating electrical machine (80).

(1-12) Here, it is preferred that when the rotational speed of the rotating electrical machine (80) is lower than a first defined rotational speed which is defined in advance, the rotational speed of the rotating electrical machine (80) be reduced to the second defined rotational speed or less by shutdown control in which the switching elements (3) of all of a plurality of phases are brought into off state, or zero-newton control in which control is performed such that output torque of the rotating electrical machine (80) is zero.

According to this configuration, in a case of a rotational speed at which regeneration cannot be performed, the second control state can be brought about by appropriately reducing the rotational speed of the rotating electrical machine (80) to the second defined rotational speed or less.

(1-13) In addition, it is preferred that in a rotating electrical machine control device (1) in which in the first control state, occurrence of the open-circuit failure is detected and the failure pattern (FP) is determined, and thereafter, in the second control state, the lower-stage-side failure pattern (LF) is determined, and thereafter, the failure-side arms are determined based on a result of the determination in the first control state and a result of the determination in the second control state, when occurrence of the open-circuit failure has been detected in the first control state in a case in which both of the inverters (10), the first inverter (11) and the second inverter (12), are controlled by pulse width modulation control in which a plurality of pulses with different patterns are outputted during the second period (T2), too, by which a plurality of pulses with different patterns are outputted throughout one cycle of electrical angle, or by rectangular-wave control in which one pulse is outputted in one cycle of electrical angle, instead of by the mixed pulse width modulation control, the failure pattern (FP) be determined in the first control state, and thereafter, control schemes for both of the inverters (10), the first inverter (11) and the second inverter (12), be changed to the mixed pulse width modulation control, and the lower-stage-side failure pattern (LF) be determined in the second control state, and thereafter, the failure-side arms be determined based on a result of the determination in the first control state and a result of the determination in the second control state.

According to experiments and simulations performed by the inventors, it has been found that in a case in which switching control is performed on the two inverters (10) by mixed pulse width modulation control, as described above, when an open-circuit failure has occurred, differences in the behavior of alternating currents (Iu, Iv, and Iw) are observed between the first control state and the second control state, but for example, in a case of performing switching control by generally known pulse width modulation control, such differences are not observed. Note, however, that when an open-circuit failure has occurred, the fact that an open-circuit failure has occurred and whether a failure pattern (FP) is the first failure pattern (FP1) or the second failure pattern (FP2) are determined. According to this configuration, after these determinations are made in the first control state, control schemes for the inverters (10) are changed to mixed pulse width modulation control to implement the second control state. Thus, differences in the behavior of alternating currents (Iu, Iv, and Iw) are observed between the first control state and the second control state, by which failure-side arms can be determined.

(1-14) In addition, in one aspect, in a rotating electrical machine control device (1) that controls, through a first inverter (11) and a second inverter (12), drive of a rotating electrical machine (80) having open-end windings (8) of a plurality of phases that are independent of each other, the first inverter (11) is connected to a one-end side of the open-end windings (8) of a plurality of phases to convert electric power between direct current and alternating currents of a plurality of phases, the second inverter (12) is connected to an other-end side of the open-end windings (8) of a plurality of phases to convert electric power between direct current and alternating currents of a plurality of phases, in the first inverter (11) and the second inverter (12), each arm (3A) for one alternating-current phase includes a series circuit of an upper-stage-side switching element (3H) and a lower-stage-side switching element (3L), the first inverter (11) and the second inverter (12) can be controlled independently of each other, when an open-circuit failure in which one switching element (3) is always in an open-circuit state has occurred in either one of inverters (10), the first inverter (11) or the second inverter (12), each of alternating currents of a plurality of phases ($\Sigma$Iu, Iv, and Iw) is added up to compute current integrated values for the respective phases ($\Sigma$Iu, $\Sigma$Iv, and $\Sigma$Iw), and occurrence of the open-circuit failure is detected based on positive and negative polarities of each of the current integrated values ($\Sigma$Iu, $\Sigma$Iv, and $\Sigma$Iw), and a location where the open-circuit failure has occurred is determined, and when occurrence of the open-circuit failure has been detected, it is determined which one of a first failure pattern (FP1) and a second failure pattern (FP2) is a failure pattern (FP), based on positive and negative polarities of each of the current integrated values ($\Sigma$Iu, $\Sigma$Iv, and $\Sigma$Iw), the first failure pattern (FP1) being a pattern in which the open-circuit failure has occurred in one of a set of upper-stage-side arms of the first inverter (11) and a set of lower-stage-side arms of the second inverter (12), and the second failure pattern (FP2) being a pattern in which the open-circuit failure has occurred in one of a set of the lower-stage-side arms of the first inverter (11) and a set of the upper-stage-side arms of the second inverter (12), and thereafter, either one of the inverters (10), the first inverter (11) or the second inverter (12), is assumed to be a failed inverter in which the open-circuit failure has occurred, and is determined to be an assumed failed inverter, and active short-circuit control is performed by bringing all of the switching elements (3) in assumed failure-side arms that are assumed, based on the determined failure pattern (FP), to be failure-side arms in which the open-circuit failure has occurred out of the upper-stage-side arms and the lower-stage-side arms of the assumed failed inverter into on state, and bringing all of the switching elements (3) in assumed non-failure-side arms that are on the other side into on state, and switching control is performed on one of the inverters (10) that is different from the assumed failed inverter, and thereafter, when the open-circuit failure has not been detected based on positive and negative polarities of each of the current integrated values ($\Sigma$Iu, $\Sigma$Iv, and $\Sigma$Iw), the assumed failed inverter is determined to be the failed inverter, and the assumed failure-side arms are determined to be the failure-side arms, and when the open-circuit failure has been detected, the one of the inverters (10) that is different from the assumed failed inverter is determined to be the failed inverter, and the failure-side arms of the failed inverter are determined based on the failure pattern (FP).

According to this configuration, when occurrence of an open-circuit failure has been detected, failure-side arms are assumed and determined to be assumed failure-side arms, and switching control is performed on the inverters (10) in a mode that can be used even if an open-circuit failure occurs in the assumed failure-side arms. If, in this state, an open-circuit failure has not been detected again, then it is found that the assumption is right, and if, in this state, an open-circuit failure has been detected again, then it is found that the assumption is wrong. Thus, according to this configuration, failure-side arms can be identified.

(1-15) Here, it is preferred that in the rotating electrical machine control device (1), when occurrence of the open-circuit failure has been detected, it be determined whether a failure pattern (FP) is the first failure pattern (FP1) or the second failure pattern (FP2), and thereafter, the rotational speed of the rotating electrical machine (80) be reduced by the active short-circuit control, shutdown control in which the switching elements (3) of all of a plurality of phases are brought into off state, or zero-newton control in which control is performed such that output torque of the rotating electrical machine (80) is zero, and thereafter, switching control be performed on one of the inverters (10) that is different from the assumed failed inverter.

When the rotating electrical machine (80) is driven only by an inverter (10) that is different from an assumed failed inverter, an operating region of the rotating electrical machine (80) is narrow compared to a case in which the rotating electrical machine (80) is driven using the two inverters (10), and for example, a rotational speed at which operation can be performed also decreases. According to this configuration, by reducing the rotational speed of the rotating electrical machine (80) before performing switching control on an inverter (10) that is different from an assumed failed inverter, the rotating electrical machine (80) can be appropriately driven only by the inverter (10).

(1-16) In addition, it is preferred that in the rotating electrical machine control device (1), when an overcurrent state has occurred due to occurrence of the open-circuit failure, by performing shutdown control in which the switching elements (3) of all of a plurality of phases are brought into off state, or active short-circuit control in which the upper-stage-side switching elements (3H) in the arms (3A) of all of a plurality of phases are brought into on state or the lower-stage-side switching elements (3L) in the arms (3A) of all of a plurality of phases are brought into on state, the rotational speed of the rotating electrical machine (80) be reduced to eliminate the overcurrent state, and thereafter, the failure-side arms be determined.

According to experiments and simulations performed by the inventors, it has been confirmed that, for example, when an open-circuit failure has occurred at an operating point at which the rotating electrical machine (80) has large output torque and also has a high rotational speed, the instantaneous values of three-phase alternating currents may become very large. In such a case, the fact that it is an overcurrent state is detected, and in general, control of the inverters (10) is limited. Thus, in such a case, it is preferred that failure-side arms be determined after eliminating the overcurrent state.

(1-17) In addition, it is preferred that in the rotating electrical machine control device (1), with one of the inverters (10), the first inverter (11) or the second inverter (12), that has the open-circuit failure being a failed inverter, one of the inverters (10) that is different from the failed inverter being a normal inverter, and one of a set of the upper-stage-side arms and a set of the lower-stage-side arms of the failed inverter that is on an opposite side to the failure-side arms being non-failure-side arms, active short-circuit control in which all of the switching elements (3) in the failure-side arms of the failed inverter are brought into off state, and all the switching elements (3) in the non-failure-side arms are brought into on state be performed, and single inverter drive control in which the rotating electrical machine (80) is driven through the normal inverter be performed.

In a case in which the inverters (10) are connected to respective both ends of the open-end windings (8), when a failed inverter is short-circuited by active short-circuit control, the open-end windings (8) of a plurality of phases are short-circuited in the failed inverter. That is, the failed inverter serves as a neutral point and the open-end windings (8) are Y-connected. Since active short-circuit control is performed such that of the upper-stage-side arms and lower-stage-side arms of the failed inverter, failure-side arms including a switching element (3) having an open-circuit failure go into off state, the switching element (3) having an open-circuit failure becomes equivalent to a state with no open-circuit failure. Thus, the rotating electrical machine control device 1 can appropriately control drive of the rotating electrical machine (80) including the Y-connected open-end windings (8), through a normal inverter.

(1-18) Here, it is preferred that in the rotating electrical machine control device (1), the single inverter drive control be performed by pulse width modulation control in which a plurality of pulses with different patterns are outputted throughout one cycle of electrical angle.

In mixed pulse width modulation control, switching control signals go into an inactive state during a second period (T2), enabling a reduction in system loss. By setting different periods as second periods (T2) for the first inverter (11) and the second inverter (12), a state in which switching is continuously performed as a whole using a plurality of pulses can be implemented. However, in single inverter drive control, switching is performed only on either one of the inverters (10), and thus, in mixed pulse width modulation control, distortion occurs in waveforms of alternating currents. Thus, it is preferred that single inverter drive control be performed by pulse width modulation control in which a plurality of pulses with different patterns are outputted throughout one cycle of electrical angle.

(2-1) In addition, in one aspect, in a rotating electrical machine control device (1) that controls, through a first inverter (11) and a second inverter (12), drive of a rotating electrical machine (80) having open-end windings (8) of a plurality of phases that are independent of each other, the first inverter (11) is connected to a one-end side of the open-end windings (8) of a plurality of phases to convert electric power between direct current and alternating currents of a plurality of phases, the second inverter (12) is connected to an other-end side of the open-end windings (8) of a plurality of phases to convert electric power between direct current and alternating currents of a plurality of phases, in the first inverter (11) and the second inverter (12), each arm (3A) for one alternating-current phase includes a series circuit of an upper-stage-side switching element (3H) and a lower-stage-side switching element (3L), the first inverter (11) and the second inverter (12) can be controlled independently of each other, and when a short-circuit failure in which one switching element (3) is short-circuited has occurred in either one of inverters (10), the first inverter (11) or the second inverter (12), with the inverter (10) in which the short-circuit failure has occurred being a failed inverter, each of alternating currents of a plurality of phases (Iu, Iv, and Iw) is added up to compute current integrated values for the respective phases ($\Sigma$Iu, $\Sigma$Iv, and $\Sigma$Iw), and it is determined which one of a set of upper-stage-side arms and a set of lower-stage-side arms of the failed inverter has the short-circuit failure, based on positive and negative polarities of each of the current integrated values (ΣIu, ΣIv, and ΣIw).

According to experiments and simulations performed by the inventors, it has been confirmed that when a short-circuit failure of a switching element (3) has occurred in either one of the two inverters (10), the waveforms of three-phase currents are asymmetrical and distorted. For example, the waveform of an alternating current of a given phase is greatly biased toward the positive side, and the waveform of an alternating current of another phase is greatly biased toward the negative side. When alternating currents (Iu, Iv, and Iw) are added up over a predetermined period of time, these bias trends appear more remarkably. A bias direction varies depending on the location of a switching element (3) having a short-circuit failure. Thus, on the basis of the positive and negative polarities of current integrated values (ΣIu, ΣIv, and ΣIw), it can be determined which one of a set of upper-stage-side arms and a set of lower-stage-side arms of a failed inverter has the short-circuit failure. By identifying a failure location, the two inverters (10) are controlled so as not to be influenced by the failure location, by which drive of the rotating electrical machine (80) can be continued. As such, according to this configuration, when a short-circuit failure has occurred in one of the switching elements (3) included in the two inverters (10) that are provided at respective both ends of the open-end windings (8), a failure location can be identified.

(2-2) In addition, it is preferred that in the rotating electrical machine control device (1), in a case in which the first inverter (11) is the failed inverter, when the current integrated value for one phase among a plurality of the current integrated values (ΣIu, ΣIv, and ΣIw) is positive and the current integrated values for other phases are negative, it be determined that the short-circuit failure has occurred in the upper-stage-side arms of the failed inverter, and when the current integrated value for one phase among a plurality of the current integrated values (ΣIu, ΣIv, and ΣIw) is negative and the current integrated values for other phases are positive, it be determined that the short-circuit failure has occurred in the lower-stage-side arms of the failed inverter, and in a case in which the second inverter (12) is the failed inverter, when the current integrated value for one phase among a plurality of the current integrated values (ΣIu, ΣIv, and ΣIw) is positive and the current integrated values for other phases are negative, it be determined that the short-circuit failure has occurred in the lower-stage-side arms of the failed inverter, and when the current integrated value for one phase among a plurality of the current integrated values (ΣIu, ΣIv, and ΣIw) is negative and the current integrated values for other phases are positive, it be determined that the short-circuit failure has occurred in the upper-stage-side arms of the failed inverter.

It has been confirmed by experiments and simulations performed by the inventors that an alternating current of a phase including a switching element (3) having a short-circuit failure is biased in a trend different from trends of alternating currents of other phases. Thus, a failure location can be identified based on bias trends such as those described above.

(2-3) In addition, it is preferred that in the rotating electrical machine control device (1), when the rotational speed of the rotating electrical machine (80) is higher than or equal to a defined rotational speed which is defined in advance, or when a modulation index which is a ratio of a root-mean-square value of line-to-line voltage of alternating currents of a plurality of phases to direct-current voltage is greater than or equal to a defined modulation index which is defined in advance, shutdown control in which all of the switching elements (3) in both of the inverters 10, the first inverter (11) and the second inverter (12), are brought into off state be performed, and during performance of the shutdown control, it be determined which one of a set of the upper-stage-side arms and a set of the lower-stage-side arms of the failed inverter has the short-circuit failure, based on positive and negative polarities of each of the current integrated values (ΣIu, ΣIv, and ΣIw).

In a mode in which the first inverter (11) and the second inverter (12) are connected to respective both ends of the open-end windings (8), when all switching elements (3) in an inverter (10) that has no failure go into a non-conduction state, current can only flow in a direction going from a negative polarity to a positive polarity. However, when a back electromotive force (BEMF) becomes higher than the direct-current side voltage (Vdc) of the inverter (10), a current circulation path can also be formed in the inverter (10) in which all switching elements (3) are in the non-conduction state, through a direct-current power supply (6) connected to the inverter (10). Since the back electromotive force (BEMF) has linearity with the rotational speed of the rotating electrical machine (80), when the rotational speed of the rotating electrical machine (80) is higher than or equal to the defined rotational speed, as described above, a failure location can be promptly determined. In addition, when the modulation index is high, too, there is a tendency that the output of the rotating electrical machine (80) increases and the rotational speed also increases, and thus, as described above, a failure location can be promptly determined.

(2-4) In addition, it is preferred that in the rotating electrical machine control device (1), when the rotational speed of the rotating electrical machine (80) is lower than a defined rotational speed which is defined in advance, or when a modulation index which is a ratio of a root-mean-square value of line-to-line voltage of alternating currents of a plurality of phases to direct-current voltage is less than a defined modulation index which is defined in advance, torque control be performed on the first inverter (11) and the second inverter (12), based on a torque instruction less than or equal to defined torque (T2) which is defined in advance, and during performance of the torque control, it be determined which one of a set of the upper-stage-side arms and a set of the lower-stage-side arms of the failed inverter has the short-circuit failure, based on positive and negative polarities of each of the current integrated values (ΣIu, ΣIv, and ΣIw).

In a mode in which the first inverter (11) and the second inverter (12) are connected to respective both ends of the open-end windings (8), in a case in which a back electromotive force (BEMF) is lower than the direct-current side voltage (Vdc) of the inverters (10), when all switching elements (3) in an inverter (10) that has no failure go into a non-conduction state, current can only flow in a direction going from a negative polarity to a positive polarity. Thus, if shutdown control is performed when a short-circuit failure has been detected, then a failure location cannot be determined. According to this configuration, by driving the two inverters (10) using defined torque (T2) which is low torque with relatively low current consumption, current can flow through the inverters (10). Thus, in a state in which a short-circuit failure has occurred, a failure location can be determined while the load on the inverters (10) and the open-end windings (8) is suppressed.

(2-5) In addition, it is preferred that in the rotating electrical machine control device (1), with one of the inverters (10), the first inverter (11) or the second inverter (12), that is different from the failed inverter being a normal inverter, either one of a set of the upper-stage-side arms and a set of the lower-stage-side arms of the failed inverter that has the short-circuit failure being failure-side arms, and the other one being non-failure-side arms, active short-circuit control in which all of the switching elements (3) in the failure-side arms of the failed inverter are brought into on state, and all the switching elements (3) in the non-failure-side arms are brought into off state be performed, and single inverter drive control in which the rotating electrical machine (80) is driven through the normal inverter be performed.

In a case in which the inverters (10) are connected to respective both ends of the open-end windings (8), when a failed inverter is short-circuited by active short-circuit control, the open-end windings (8) of a plurality of phases are short-circuited in the failed inverter. That is, the failed inverter serves as a neutral point and the open-end windings (8) are Y-connected. Since active short-circuit control is performed such that of the upper-stage-side arms and lower-stage-side arms of the failed inverter, failure-side arms including a switching element (3) having a short-circuit failure are short-circuited, the switching element (3) having a short-circuit failure becomes equivalent to a state with no short-circuit failure. Thus, the rotating electrical machine control device (1) can appropriately control drive of the rotating electrical machine (80) including the Y-connected open-end windings (8), through a normal inverter.

REFERENCE SIGNS LIST

1: Rotating electrical machine control device, 3: Switching element, 3A: Arm, 3H: Upper-stage-side switching element, 3L: Lower-stage-side switching element, 8: Stator coil (open-end winding), 10: Inverter, 11: First inverter, 12: Second inverter, 80: Rotating electrical machine, FP: Failure pattern, FP1: First failure pattern, FP2: Second failure pattern, LF: Lower-stage-side failure pattern, LF1: First lower-stage-side failure pattern, LF2: Second lower-stage-side failure pattern, H1: First period, H2: Second period, Iu: U-phase current (alternating current), Iv: V-phase current (alternating current), Iw: W-phase current (alternating current), T2: Second torque instruction (defined torque), $\Sigma Iu$: U-phase integrated current (current integrated value), $\Sigma Iv$: V-phase integrated current (current integrated value), and $\Sigma Iw$: W-phase integrated current (current integrated value)

The invention claimed is:

1. A rotating electrical machine control device that controls, through a first inverter and a second inverter, drive of a rotating electrical machine having open-end windings of a plurality of phases that are independent of each other, wherein the first inverter is connected to a one-end side of the open-end windings of a plurality of phases to convert electric power between direct current and alternating currents of a plurality of phases, the second inverter is connected to another-end side of the open-end windings of a plurality of phases to convert electric power between direct current and alternating currents of a plurality of phases, in the first inverter and the second inverter, each arm for one alternating-current phase includes a series circuit of an upper-stage-side switching element and a lower-stage-side switching element, the first inverter and the second inverter can be controlled independently of each other, when an open-circuit failure in which one switching element is always in an open-circuit state has occurred in either one of inverters, the first inverter or the second inverter, each of alternating currents of a plurality of phases is added up to compute current integrated values for the respective phases, and occurrence of the open-circuit failure is detected based on positive and negative polarities of each of the current integrated values, and a location where the open-circuit failure has occurred is determined, and when occurrence of the open-circuit failure has been detected upon controlling both of the inverters, the first inverter and the second inverter, by mixed pulse width modulation control in which control is performed such that a plurality of pulses with different patterns are outputted during a first period and an inactive state continues during a second period, the first period being a ½ cycle of electrical angle and the second period being another ½ cycle, it is determined which one of a first failure pattern and a second failure pattern is a failure pattern, based on positive and negative polarities of each of the current integrated values in a first control state, the first failure pattern being a pattern in which one of a set of upper-stage-side arms of the first inverter and a set of lower-stage-side arms of the second inverter is failure-side arms in which the open-circuit failure has occurred, and the second failure pattern being a pattern in which one of a set of lower-stage-side arms of the first inverter and a set of upper-stage-side arms of the second inverter is the failure-side arms, it is determined which one of a first lower-stage-side failure pattern and a second lower-stage-side failure pattern is a lower-stage-side failure pattern, based on each of the current integrated values in a second control state different from the first control state, the first lower-stage-side failure pattern being a pattern in which the lower-stage-side arms of the second inverter are the failure-side arms, and the second lower-stage-side failure pattern being a pattern in which the lower-stage-side arms of the first inverter are the failure-side arms, and it is determined which one of a set of the upper-stage-side arms of the first inverter, a set of the lower-stage-side arms of the first inverter, a set of the upper-stage-side arms of the second inverter, and a set of the lower-stage-side arms of the second inverter is the failure-side arms, based on a result of the determination in the first control state and a result of the determination in the second control state.

2. The rotating electrical machine control device according to claim 1, wherein when the failure pattern is determined to be the first failure pattern in the first control state, and the lower-stage-side failure pattern is determined to be the first lower-stage-side failure pattern in the second control state, it is determined that the lower-stage-side arms of the second inverter are the failure-side arms, when the failure pattern is determined to be the first failure pattern in the first control state, and none of the lower-stage-side failure patterns are determined in the second control state, it is determined that the upper-stage-side arms of the first inverter are the failure-side arms, when the failure pattern is determined to be the second failure pattern in the first control state, and the lower-stage-side failure pattern is determined to be the second lower-stage-side failure pattern in the second control state, it is determined that the lower-stage-side arms of the first inverter are the failure-side arms, and when the failure pattern is determined to be the second failure pattern in the first control state, and none of the lower-stage-side failure patterns are determined in the second control state, it is determined that the upper-stage-side arms of the second inverter are the failure-side arms.

3. The rotating electrical machine control device according to claim 1, wherein when the current integrated value for one phase among a plurality of the current integrated values is negative and the current integrated values for other phases are positive, it is determined that the failure pattern is the first failure pattern, and when the current integrated value for one phase among a plurality of the current integrated values is positive and the current integrated values for other phases are negative, it is determined that the failure pattern is the second failure pattern.

4. The rotating electrical machine control device according to claim 1, wherein when the current integrated value for one phase among a plurality of the current integrated values is negative and the current integrated values for other phases are positive, it is determined that the lower-stage-side failure pattern is the first lower-stage-side failure pattern, and when the current integrated value for one phase among a plurality of the current integrated values is positive and the current integrated values for other phases are negative, it is determined that the lower-stage-side failure pattern is the second lower-stage-side failure pattern.

5. The rotating electrical machine control device according to claim 1, wherein the first control state is powering at a rotational speed of the rotating electrical machine that is higher than or equal to a first defined rotational speed, and the second control state is regeneration, the first defined rotational speed being defined in advance.

6. The rotating electrical machine control device according to claim 1, wherein the first control state is powering at a rotational speed of the rotating electrical machine that is higher than or equal to a first defined rotational speed, and the second control state is powering at a rotational speed of the rotating electrical machine that is lower than or equal to a second defined rotational speed lower than the first defined rotational speed, the first defined rotational speed being defined in advance.

7. The rotating electrical machine control device according to claim 1, wherein in the first control state, occurrence of the open-circuit failure is detected and the failure pattern is determined, and thereafter, in the second control state, the lower-stage-side failure pattern is determined, and thereafter, the failure-side arms are determined based on a result of the determination in the first control state and a result of the determination in the second control state, and when occurrence of the open-circuit failure has been detected in the first control state in a case in which both of the inverters, the first inverter and the second inverter, are controlled by pulse width modulation control in which a plurality of pulses with different patterns are outputted during the second period, too, by which a plurality of pulses with different patterns are outputted throughout one cycle of electrical angle, or by rectangular-wave control in which one pulse is outputted in one cycle of electrical angle, instead of by the mixed pulse width modulation control, the failure pattern is determined in the first control state, and thereafter, control schemes for both of the inverters, the first inverter and the second inverter, are changed to the mixed pulse width modulation control, and the lower-stage-side failure pattern is determined in the second control state, and thereafter, the failure-side arms are determined based on a result of the determination in the first control state and a result of the determination in the second control state.

8. A rotating electrical machine control device that controls, through a first inverter and a second inverter, drive of a rotating electrical machine having open-end windings of a plurality of phases that are independent of each other, wherein the first inverter is connected to a one-end side of the open-end windings of a plurality of phases to convert electric power between direct current and alternating currents of a plurality of phases, the second inverter is connected to another-end side of the open-end windings of a plurality of phases to convert electric power between direct current and alternating currents of a plurality of phases, in the first inverter and the second inverter, each arm for one alternating-current phase includes a series circuit of an upper-stage-side switching element and a lower-stage-side switching element, the first inverter and the second inverter can be controlled independently of each other, when an open-circuit failure in which one switching element is always in an open-circuit state has occurred in either one of inverters, either one of the first inverter and the second inverter, each of alternating currents of a plurality of phases is added up to compute current integrated values for the respective phases, and occurrence of the open-circuit failure is detected based on positive and negative polarities of each of the current integrated values, and a location where the open-circuit failure has occurred is determined, and when occurrence of the open-circuit failure has been detected, it is determined which one of a first failure pattern and a second failure pattern is a failure pattern, based on positive and negative polarities of each of the current integrated values, the first failure pattern being a pattern in which the open-circuit failure has occurred in one of a set of upper-stage-side arms of the first inverter and a set of lower-stage-side arms of the second inverter, and the second failure pattern being a pattern in which the open-circuit failure has occurred in one of a set of lower-stage-side arms of the first inverter and a set of upper-stage-side arms of the second inverter, and thereafter, either one of the first inverter or the second inverter, is assumed to be a failed inverter in which the open-circuit failure has occurred, and is determined to be an assumed failed inverter, and active short-circuit control is performed by bringing all of the switching elements in assumed failure-side arms that are assumed, based on the determined failure pattern, to be failure-side arms in which the open-circuit failure has occurred out of the upper-stage-side arms and the lower-stage-side arms of the assumed failed inverter into on state, and bringing all of the switching elements in assumed non-failure-side arms that are on another side into on state, and switching control is performed on one of the inverters that is different from the assumed failed inverter, and thereafter, when the open-circuit failure has not been detected based on positive and negative polarities of each of the current integrated values, the assumed failed inverter is determined to be the failed inverter, and the assumed failure-side arms are determined to be the failure-side arms, and when the open-circuit failure has been detected, the one of the inverters that is different from the assumed failed inverter is determined to be the failed inverter, and the failure-side arms of the failed inverter are determined based on the failure pattern.

* * * * *